US012651055B2

(12) United States Patent
Zizi et al.

(10) Patent No.: US 12,651,055 B2
(45) Date of Patent: Jun. 9, 2026

(54) ELECTRONIC DEVICES RELATED TO PHYSIOLOGICAL CERTIFICATE USING BIOMETRICS TECHNOLOGY AND METHODS FOR OPERATION THEREOF

(71) Applicant: Aerendir Mobile Inc., Mountain View, CA (US)

(72) Inventors: Martin Zizi, Mountain View, CA (US); Nicholas Sullivan, El Cerrito, CA (US); Luke Stork, Mountain View, CA (US); Doron Drusinsky, Mountain View, CA (US); Kitae Lee, Moutain View, CA (US)

(73) Assignee: Proprius Technolgies S.A.R.L, Luxembourg (LU)

( * ) Notice: Subject to any disclaimer, the term of this patent is extended or adjusted under 35 U.S.C. 154(b) by 516 days.

(21) Appl. No.: 17/924,680

(22) PCT Filed: May 11, 2021

(86) PCT No.: PCT/US2021/070535
§ 371 (c)(1),
(2) Date: Mar. 5, 2023

(87) PCT Pub. No.: WO2021/232051
PCT Pub. Date: Nov. 18, 2021

(65) Prior Publication Data
US 2025/0225230 A1      Jul. 10, 2025

Related U.S. Application Data

(60) Provisional application No. 63/023,856, filed on May 12, 2020.

(51) Int. Cl.
| | | |
|---|---|---|
| *G06F 21/45* | (2013.01) | |
| *G06F 21/32* | (2013.01) | |
| *H04W 12/069* | (2021.01) | |

(52) U.S. Cl.
CPC .............. *G06F 21/45* (2013.01); *G06F 21/32* (2013.01); *H04W 12/069* (2021.01)

(58) Field of Classification Search
None
See application file for complete search history.

(56) References Cited

U.S. PATENT DOCUMENTS

| | | | | |
|---|---|---|---|---|
| 2003/0140235 A1* | 7/2003 | Immega | ................. | G06F 21/32 713/186 |
| 2006/0143700 A1* | 6/2006 | Herrmann | ............. | H04L 63/166 726/14 |

(Continued)

OTHER PUBLICATIONS

Rodriquez, Kari; PCT/US2021/070535; "International Search Report"; Aug. 2, 2021; 2 pages.

(Continued)

*Primary Examiner* — William J. Goodchild
(74) *Attorney, Agent, or Firm* — Alford Law Group, Inc.

(57) ABSTRACT

A digital physiological certificate (P-cert) for securing data is disclosed. The certificate comprises a digital file including an identity-based chain of trust of an owner; and a physiological based chain of trust of the owner. The physiological based chain of trust includes an owner's name; an owner's physiological based public key; a publisher's name of the bioauthentication; and a publisher's signature. Other embodiments using the P-Cert are disclosed.

20 Claims, 38 Drawing Sheets

(56) References Cited

U.S. PATENT DOCUMENTS

| 2009/0132813 A1* | 5/2009 | Schibuk ............. | G06Q 20/4014 |
| | | | 726/9 |
| 2016/0300054 A1 | 10/2016 | Turgeman et al. | |
| 2017/0316390 A1 | 11/2017 | Smith et al. | |
| 2020/0067907 A1 | 2/2020 | Avetisov et al. | |

OTHER PUBLICATIONS

Rodriquez, Kari; PCT/US2021/070535; "Written Opinion of The International Searching Auhority"; Aug. 2, 2021; 11 pages.

\* cited by examiner

| Relevant to NFPs | Classification | Definition | timing | distance | voluntary /involuntary |
|---|---|---|---|---|---|
| | Behaviors | Something an individual does | inconsistent, | General | voluntary |
| | voluntary movements | Motion under individuals' control | inconsistent, | Varied | voluntary |
| | motion repertoires | Prescribed behavior or set of behaviors | unique prescribed | Varied, Limited Constrained for Authentication | voluntary |
| Unlikely | involuntary movements | Motion not under individuals' control | inconsistent momentary repetitive, | Varied | INvoluntary |
| | micro-motions as w Autism & TBI | Nearly invisible motions of a body part - actual motion | inconsistent, non-repetitive | minute, insensible | INvoluntary |

FIG. 2A

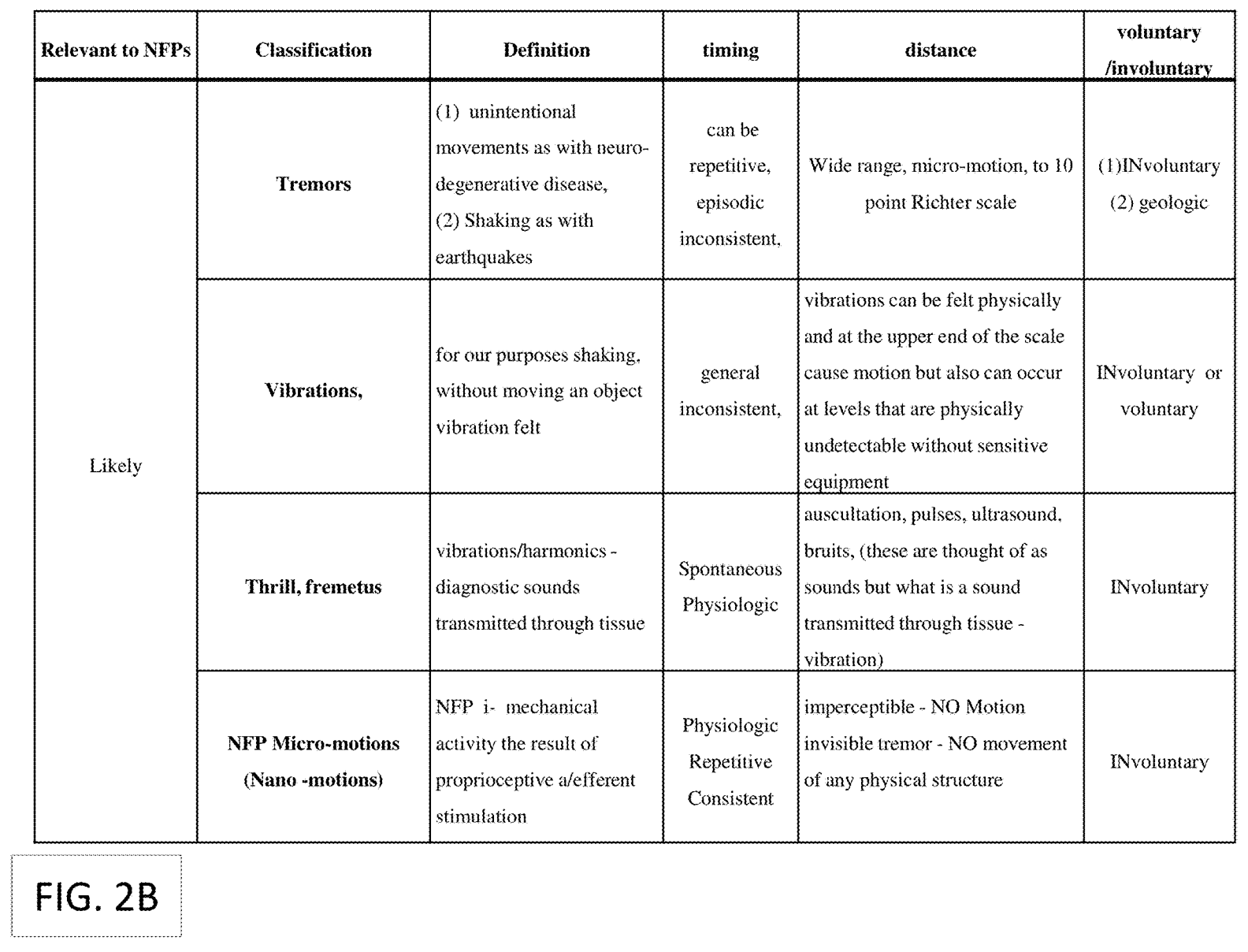

| Relevant to NFPs | Classification | Definition | timing | distance | voluntary /involuntary |
|---|---|---|---|---|---|
| | Tremors | (1) unintentional movements as with neuro-degenerative disease, (2) Shaking as with earthquakes | can be repetitive, episodic inconsistent, | Wide range, micro-motion, to 10 point Richter scale | (1)INvoluntary (2) geologic |
| | Vibrations, | for our purposes shaking. without moving an object vibration felt | general inconsistent, | vibrations can be felt physically and at the upper end of the scale cause motion but also can occur at levels that are physically undetectable without sensitive equipment | INvoluntary or voluntary |
| Likely | Thrill, fremetus | vibrations/harmonics - diagnostic sounds transmitted through tissue | Spontaneous Physiologic | auscultation, pulses, ultrasound, bruits, (these are thought of as sounds but what is a sound transmitted through tissue - vibration) | INvoluntary |
| | NFP Micro-motions (Nano -motions) | NFP i- mechanical activity the result of proprioceptive a/efferent stimulation | Physiologic Repetitive Consistent | imperceptible - NO Motion invisible tremor - NO movement of any physical structure | INvoluntary |

FIG. 2B

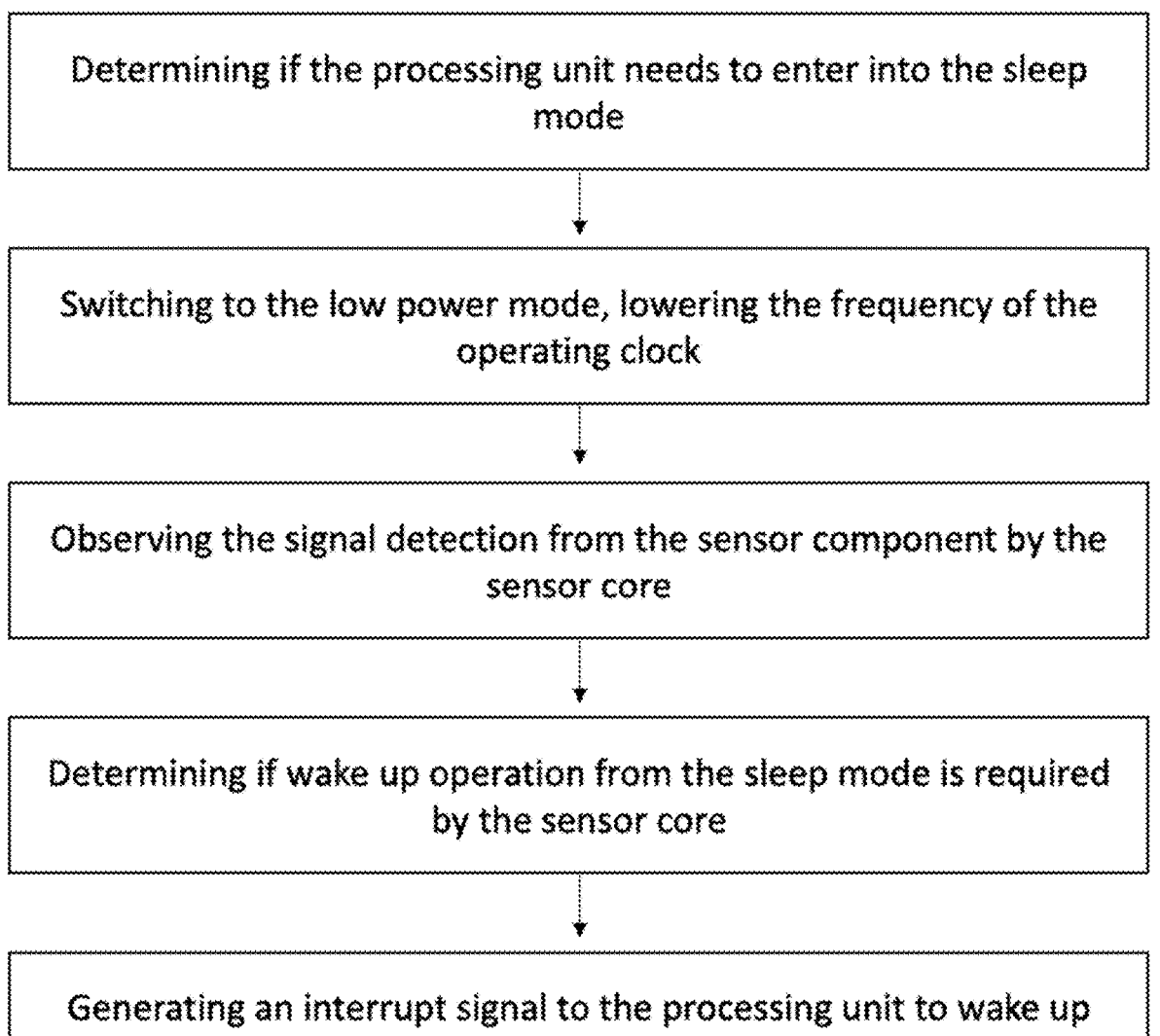

Determining if the processing unit needs to enter into the sleep mode

Switching to the low power mode, lowering the frequency of the operating clock

Observing the signal detection from the sensor component by the sensor core

Determining if wake up operation from the sleep mode is required by the sensor core Generating an interrupt signal to the processing unit to wake up from the sleep mode

FIG. 12

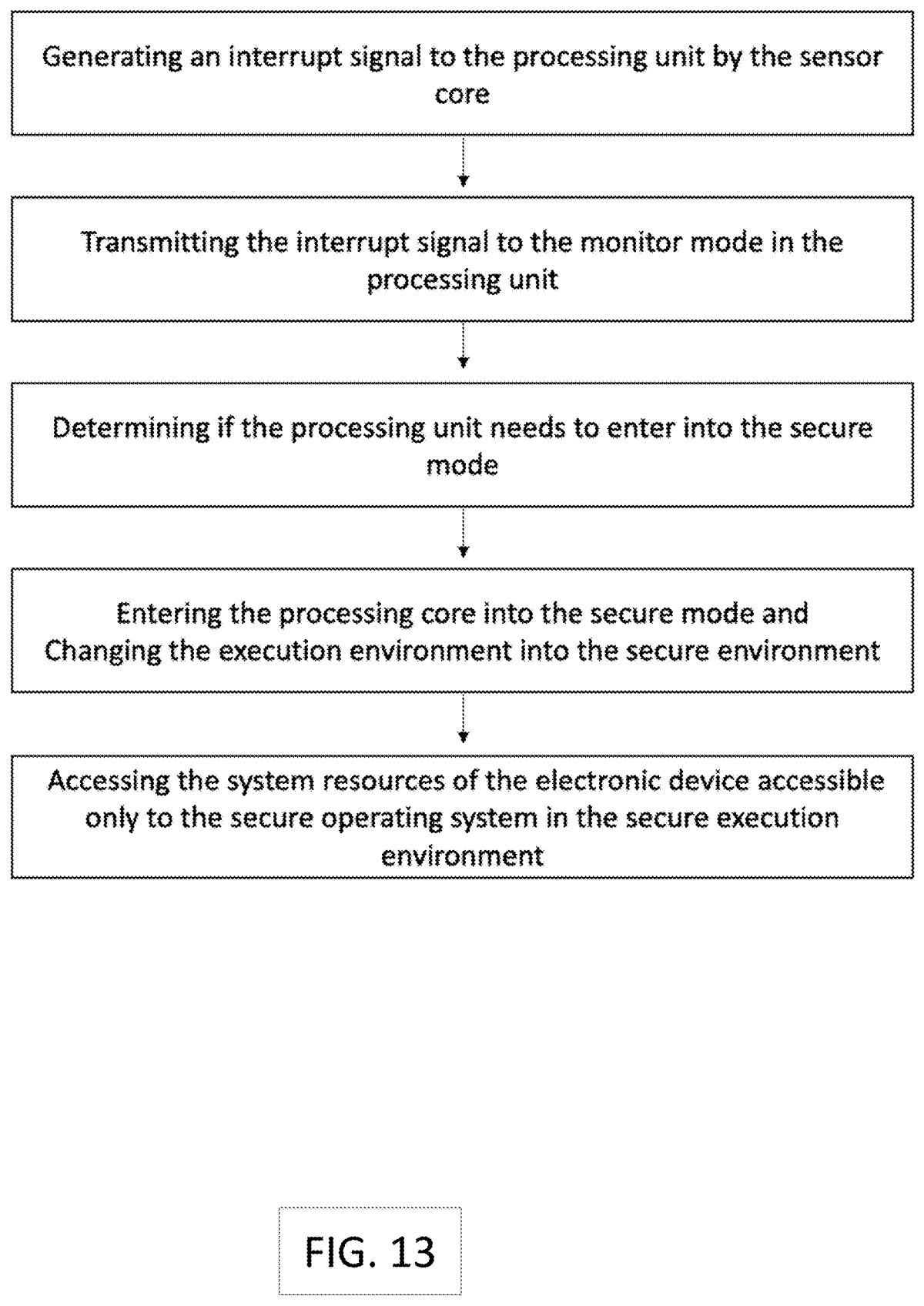

Generating an interrupt signal to the processing unit by the sensor core

Transmitting the interrupt signal to the monitor mode in the processing unit

Determining if the processing unit needs to enter into the secure mode

Entering the processing core into the secure mode and Changing the execution environment into the secure environment Accessing the system resources of the electronic device accessible only to the secure operating system in the secure execution environment

FIG. 13

| Sensor Data | 0ms | 5ms | 10ms | ... | 2950ms | 3000ms |
|---|---|---|---|---|---|---|
| Acceleration force along the X axis | 0.296881 | 0.330998 | 0.37589 | ... | -1.79625 | -1.723825 |
| Acceleration force along the Y axis | 7.091625 | 7.018602 | 6.948572 | ... | 6.925827 | 6.927024 |
| Acceleration force along the Z axis | 7.049727 | 7.075465 | 7.150882 | ... | 6.776189 | 6.700173 |
| Rate of rotation around the X axis | -0.135555 | -0.162719 | -0.193612 | ... | 0.026632 | 0.021572 |
| Rate of rotation around the Y axis | 0.3289 | 0.335558 | 0.317981 | ... | 0.003196 | 0.001065 |
| Rate of rotation around the Z axis | -0.082025 | -0.069775 | -0.059122 | ... | 0.010386 | 0.013848 |

FIG. 15

Receiving digital sensor data from the sensor through sensor core

Removing the signal at the beginning and last part of the signal acquisition time during a predetermined period among the receiving digital sensor data Suppressing signal components associated with a voluntary movement of the user, noise, sensor errors, gravity force, electronic power noise, and other noise-related signals Performing resampling procedure or interpolation on the sensor data and extracting micro motion data with associated with neuro muscular tone

FIG. 16

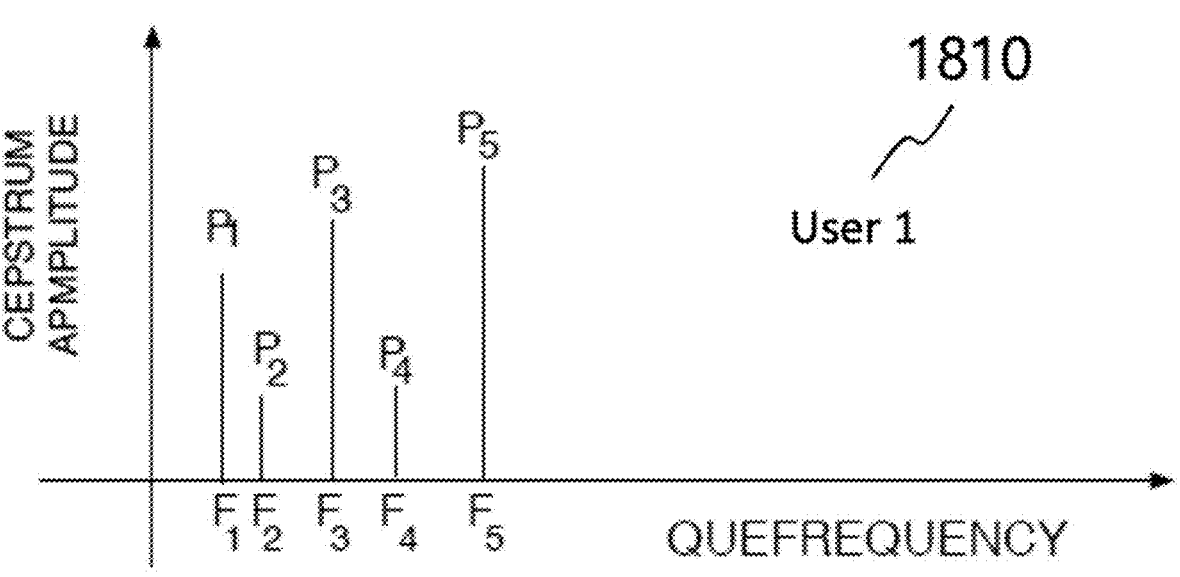
1810
User 1
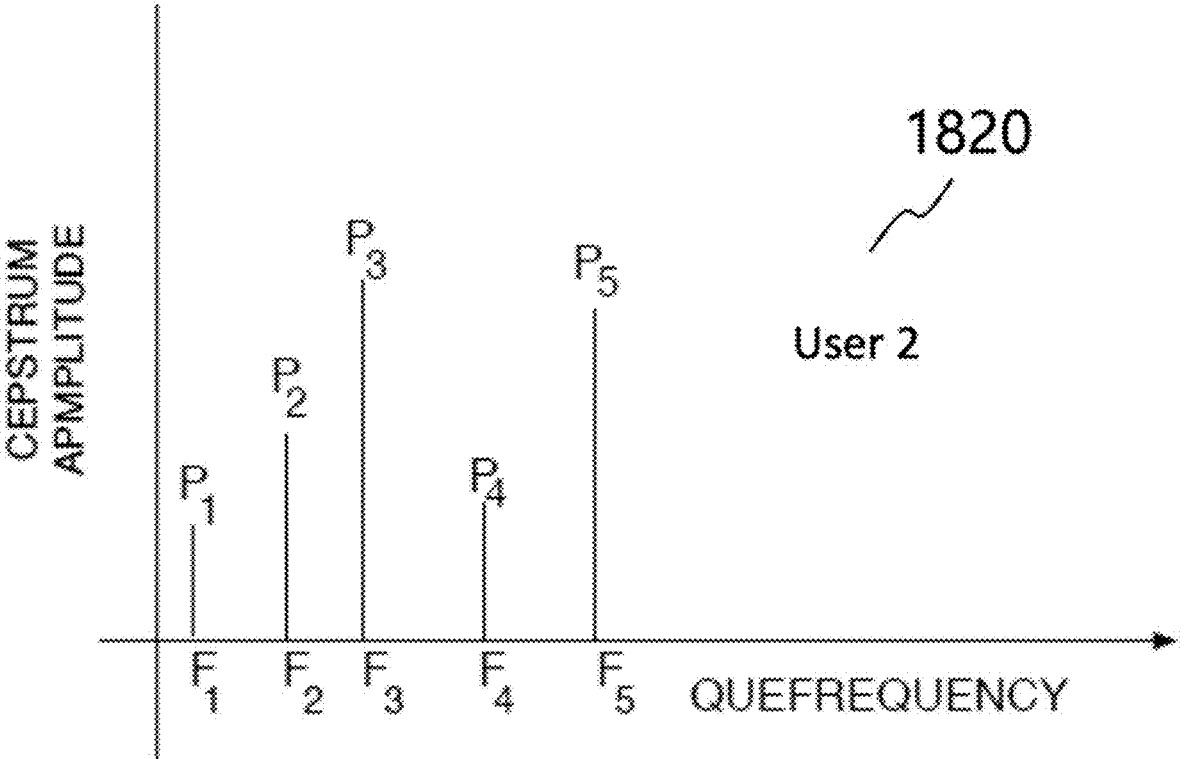
1820
User 2
FIG. 18

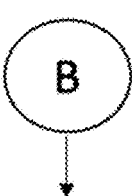

Processing a set of the extracted micro motion data associated with neuro muscular tone as a set of data having linearly uncorrelated characteristics Performing the multiple processing procedures that can generate data sets of mathematical representation regarding neuro muscular tone for the user based on the laboratory experimental results Constructing a feature vector table containing multiple sets of feature vectors generated by the multiple processing procedures Dividing feature vector sets into POI (Point of interest) feature vector 1850, validation feature vector 1852 and test feature vector 1854

| Time(10ms) Feature Vectors | 1 | 2 | 3 | ... | 299 | 300 |
|---|---|---|---|---|---|---|
| entropy 1 | 0.296881 | 0.330998 | 0.37589 | ... | -1.79625 | -1.723825 |
| entropy 2 | 7.091625 | 7.018602 | 6.948572 | ... | 6.925827 | 6.927024 |
| Amplitude 1 of quefrency | 7.049727 | 7.075465 | 7.15727 | ... | 6.776189 | 6.700173 |
| Amplitude 2 of quefrency | -0.135555 | -0.162719 | -0.193612 | ... | 0.026632 | 0.021572 |
| ... | ... | ... | ... | ... | ... | ... |
| Interval 1 of quefrency | 1.135727 | -0.162719 | 3.19727 | ... | 14.026189 | 0.189572 |
| Interval 2 of quefrency | -0.135555 | -1.5586519 | -0.193612 | ... | 0.0189632 | 0.021572 |
| ... | ... | ... | ... | ... | ... | ... |
| feature 299 | 3.082032 | -0.069775 | -0.059122 | ... | 3.012346 | 10.132345 |
| feature 300 | -0.234025 | -023634750 | -4.234623 | ... | 0.010386 | 0.013848 |

Figure 27A:
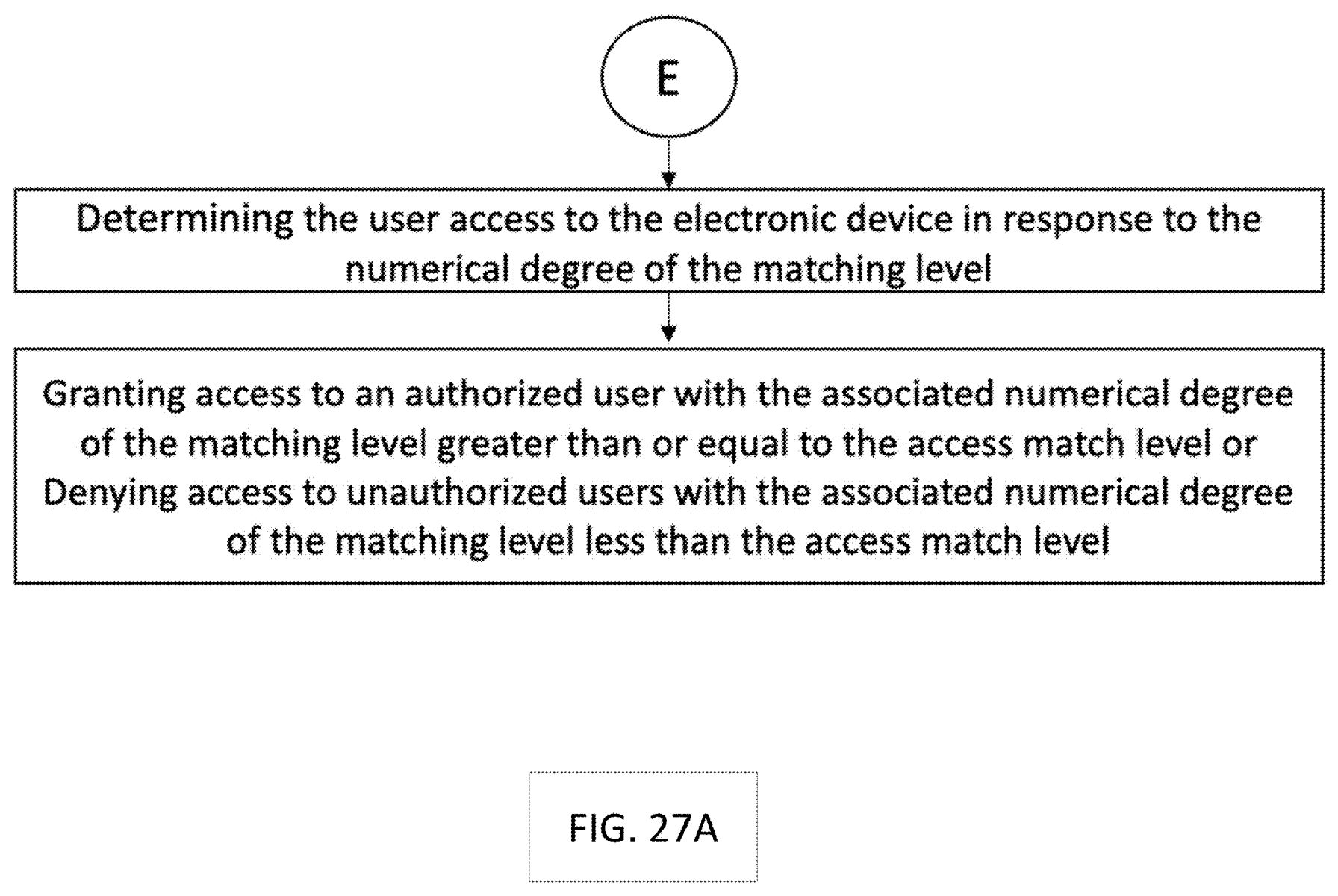

Determining the user access to the electronic device in response to the numerical degree of the matching level Granting access to an authorized user with the associated numerical degree of the matching level greater than or equal to the access match level or Denying access to unauthorized users with the associated numerical degree of the matching level less than the access match level

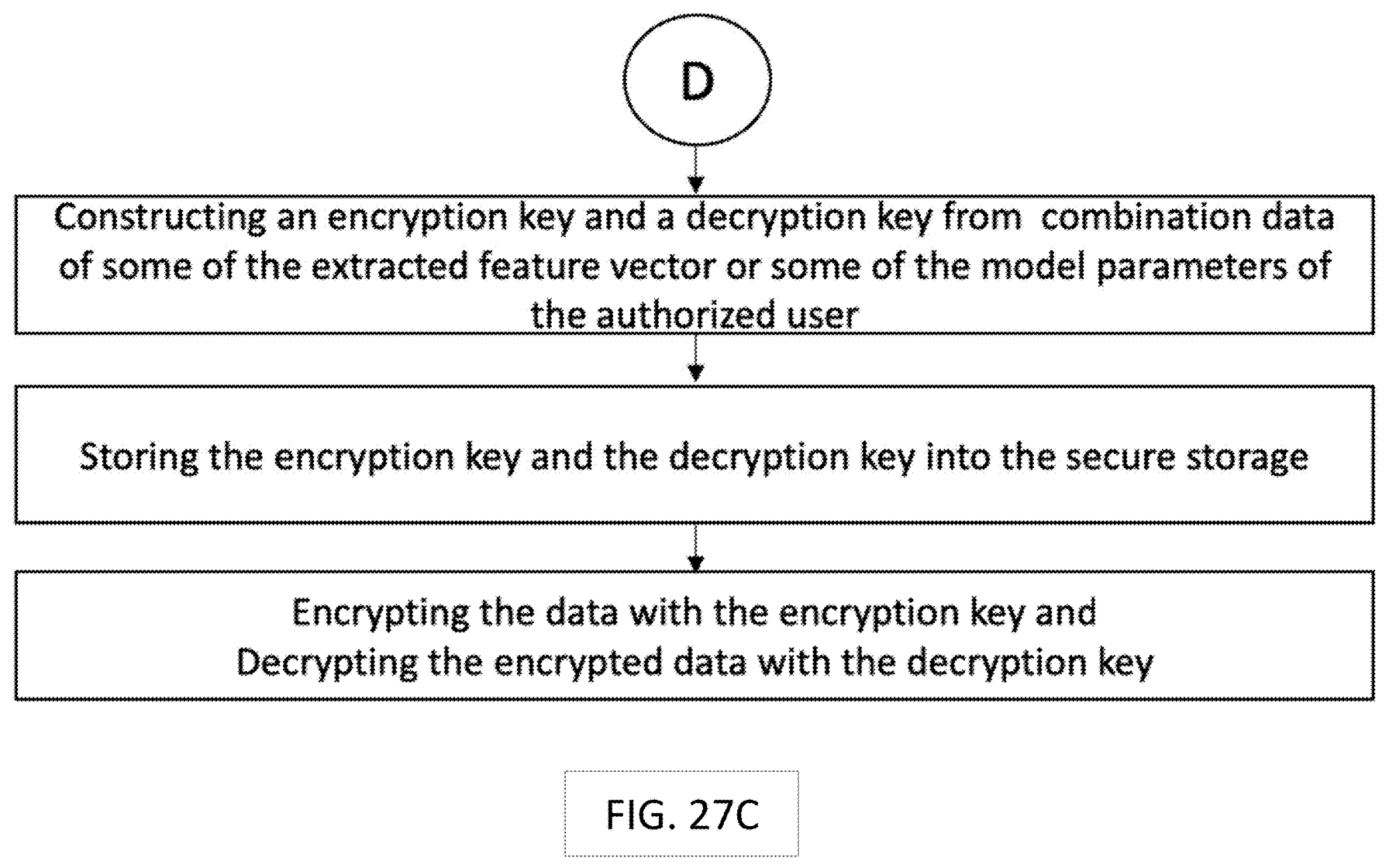

Constructing an encryption key and a decryption key from combination data of some of the extracted feature vector or some of the model parameters of the authorized user Storing the encryption key and the decryption key into the secure storage Encrypting the data with the encryption key and Decrypting the encrypted data with the decryption key

FIG. 27C

ELECTRONIC DEVICES RELATED TO PHYSIOLOGICAL CERTIFICATE USING BIOMETRICS TECHNOLOGY AND METHODS FOR OPERATION THEREOF

RELATED APPLICATIONS

This non-provisional patent application claims benefit of International Patent Application No. PCT/US2021/070535 entitled ELECTRONIC DEVICES RELATED TO PHYSI-OLOGICAL CERTIFICATE USING BIOMETRICS TECHNOLOGY AND METHODS FOR OPERATION THEREOF filed on May 11, 2021 by inventors Martin Zizi et al., incorporated herein by reference for all intents and purposes. International Patent Application No. PCT/US2021/070535 claims benefit of U.S. Provisional Patent Application No. 63/023,856 entitled ELECTRONIC DEVICES RELATED TO PHYSIOLOGICAL CERTIFI-CATE USING BIOMETRICS TECHNOLOGY AND METHODS FOR OPERATION THEREOF filed on May 12, 2020 by inventors Martin Zizi et al., incorporated herein for all intents and purposes. This patent application is related to U.S. patent application Ser. No. 16/449,466 titled "DATA ENCRYPTION AND DECRYPTION USING NEURO-LOGICAL FINGERPRINTS" filed on Jun. 24, 2019 by inventors Martin Zizi et al., incorporated herein for all intents and purposes. This patent application is also related to U.S. patent application Ser. No. 15/013,875 entitled LOCAL USER AUTHENTICATION WITH NEURO-ME-CHANICAL FINGERPRINTS filed on Feb. 2, 2016 by inventors Martin Zizi et al., incorporated herein for all intents and purposes.

FIELD

The embodiments described herein relate generally to user identification, authentication, and encryption using biometric technology and a digital cert.

BACKGROUND

Access by a user to some electronic devices and databases is often by a login name and password. As more portable electronic devices are used, such as laptop computers and mobile smartphones, in a highly mobile computing environment, correct authentication of people and devices becomes important to ascertain authorized use and lower risks linked to data misrouting. For example, as more mobile health electronic devices are introduced, the privacy of the captured health data by mobile health devices becomes important. As more banking and payments are made using mobile electronic devices, authorized use becomes important.

BRIEF DESCRIPTION OF DRAWINGS

FIG. 2A is a table illustrating various types of motion classification that are unrelated to NFP.

FIG. 2B is a table illustrating various types of motion classification that are related to NFP.

FIG. 12 is a flow chart of sleep mode operation of a device.

FIG. 13 is a flow chart of secure mode operation of a device.

FIG. 15 is table of various types of sensor data and formats over time.

FIG. 16 is a flow chart of a preprocessing operation.

FIG. 18 are plots of a CEPSTRUM analysis for two different users.

FIG. 19 is a flow chart of feature extracting operation.

FIG. 20 is table of an example of a feature vector set.

FIG. 27A is a flow chart for a user authentication.

FIG. 27C is a flow chart for data encryption and decryption.

DETAILED DESCRIPTION

Figure 1:
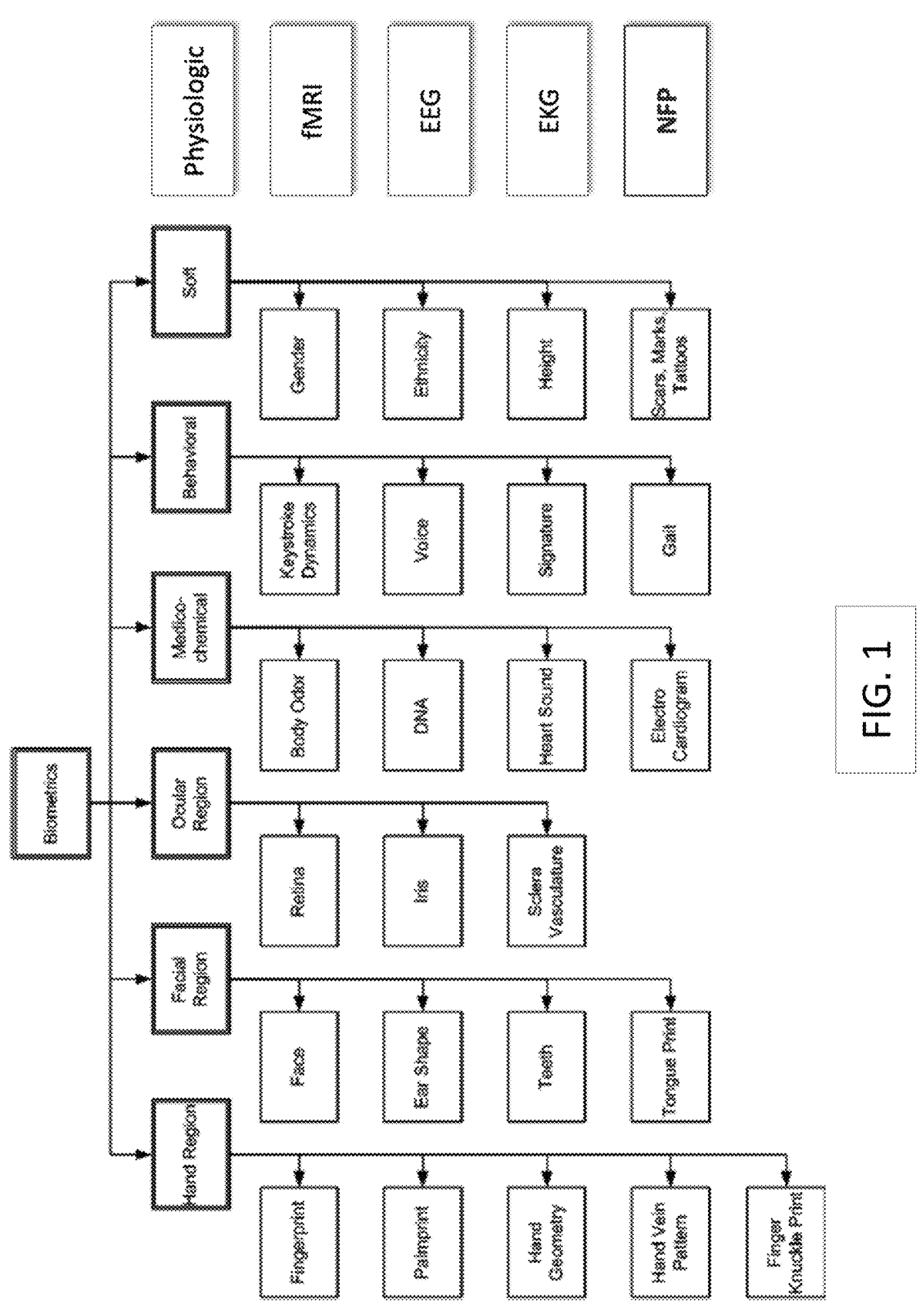
FIG. 1 is a chart indicating various classifications of biometric modalities.

In the following detailed description of the embodiments described in this disclosure, numerous specific details and various examples are set forth in order to provide a thorough understanding. However, it will be clear and apparent to a person having ordinary skill in the art that the embodiments can be practiced without these specific details and numerous changes or modifications of the embodiments can also be carried out within the scope of this disclosure. In certain instances, well-known methods, procedures, components, function, circuits and well known or conventional details have not been described in detail so as not to unnecessarily obscure aspects of the embodiments described in this disclosure.

The terms, words and expressions used herein are merely for the purpose of describing embodiments of this disclosure and are not intended to be limiting the scope of the embodiment described in this disclosure. Unless defined otherwise, all terms including technical and scientific terms, as used herein, can have the same or similar meanings in the context that can be understood generally by a person having ordinary skill in the art. In some instances, even though the terms are defined in this disclosure, it may not be construed to exclude or limit the scope of embodiments described in this disclosure.

Embodiments in accordance with this disclosure can be implemented as an apparatus, method, server-client apparatus and/or method, cooperation of apparatus and/or method, chipset, computer program or any combination thereof. Accordingly, the embodiments can take the form of an entirely hardware embodiment (including chipset), an entirely software embodiment (including firmware, any type of software, etc.) or an embodiment combining software and hardware. Software and hardware aspects that can all generally be referred to herein as a "module", "unit", "component", "block", "element", "member", "system", "subsystem" or etc. Furthermore, the embodiments described herein can take the form of a computer program product embodied in any tangible medium of expression (including a computer file) having computer-usable program code embodied in the medium.

It can be understood that the terms "one embodiment", "an embodiment", "one example" or "an example" can mean that a particular feature, structure or characteristic described in connection with the embodiment or example of the disclosure. Thus, the appearances of these terms used herein are not necessarily all referring to the same embodiment or example. In addition, a particular feature, structure or characteristic can be combined in any suitable combinations and/or sub-combinations in one or more embodiments or examples.

It can be understood that the singular forms "a", "an" or "the" can include plural forms as well unless the context clearly indicates otherwise. For example, "a sensor" can refer to one or more sensors.

It can be understood that, although the terms "first", "second" or etc. are, in some instances, used herein to describe various elements, these elements do not be limited by these terms. These terms can be used to distinguish one element from another and can be irrelevant to the order or importance of elements. For example, a first sensor could be termed a second sensor, and, similarly, a second sensor could be termed a first sensor. The first sensor and the second sensor are both sensors, but they may not be the same sensor.

It can be understood that the term "and/or" as used herein can cover any and all possible combinations of one or more of the associated listed items. For example, "A or B", "at least one of A and B", "at least one of A or B", "one or more of A or B", "one or more of A and B", "A and/or B", "at least one of A and/or B", or "one or more of A and/or B" can represent all of "including at least one A", "including at least one B", or "including both at least one A and at least one B".

It can be understood that the terms "have", "having", "can have", "include", "including", "may include", "comprise", "comprising" or "may comprise", or "comprising", used herein indicate the presence of elements, features, steps, operations, functions, numeric values, or components, members or combination thereof but do not exclude the presence or addition of one or more other elements, features, steps, operations, functions, numeric values, or components, members or combination thereof. For example, a method or apparatus that comprises a list of elements may not be necessarily limited to comprise only those elements but can include other elements that are not explicitly listed.

It can be understood that when a first element is "connected to", "coupled to" or "coupled with" a second element, the first element can be directly "connected to", directly "coupled to" or directly "coupled with" the second element or at least one or more of other elements can be interposed between the first element and the second element. On the other hand, it can be understood that when a first element is "directly connected" or "directly coupled" to a second element, another element is not interposed between the first element and the second element.

Digital certificates are electronic credentials that bind the real-life identity of the certificate owner to a pair of electronic keys used for subsequent signing and encrypting documents. Digital certificates are identity based, where certificates embed a chain of trust using signed certificates of higher authorities, eventually proving the end-entity's trust all the way from a well-known and trusted root Certificate Authority (CA). When using identity-based digital certificates, the issuer of the certificate is entrusted in keeping all transactions private. Nevertheless, some organizations, especially commercial entities, often abuse that trust. Moreover, security breaches ultimately reveal private transactional information as well.

With the advent of biometric authentication, physiological certificates are disclosed, which bind a key-pair to mobile-device owners biometrics while hiding that individual's identity. The physiological certificates enhance transactional privacy while being as trustable as identity-based certificates.

In this disclosure, embodiments of various types of electronic devices and associated operations related to user identification, authentication and data encryption are described.

In some embodiments, the electronic device can be a hand held type of portable device, a smart phone, a tablet computer, a mobile phone, a telephone, an e-book reader, navigation device, a desktop computer, a laptop computer, a workstation computer, a server computer, a single board computer, a camera, a camcorder, an electronic pen, wireless communication equipment, access point (AP), a drone, a projector, an electronic board, a photo copy machine, a watch, a glasses, a head-mounted device, a wireless headset/earphone, an electronic clothing, various type of wearable devices, a television, a DVD player, an audio player, a digital multimedia player, an electronic photo frame, a set top box, a TV box, a game player, remote controller, bank ATM, payment system device (including POS, card reader), a refrigerator, an oven, a microwave oven, an air conditioner, a vacuum cleaner, a washing machine, a dishwasher, an air cleaner, a home automation control device, a smart home device, various type of home appliances, a security control device, an electronic lock/unlock device (including door key or door lock), electronic signature receiving device, various type of security system devices, a blood pressure measuring device, a blood glucose monitoring device, a heart rate monitoring device, a body temperature measuring device, a Magnetic Resonance Imaging device, a Computed Tomography device, a Magnetic Resonance Angiography device, various portable medical measuring devices, various type of medical devices, a water meter, an electric meter, a gas meter, a radio wave meter, thermostat, various kinds of measuring devices, AI device, AI speaker, AI robot, various type of IoT devices or the like.

The electronic device can be a combination or a part of one or more of the aforementioned devices. In some embodiments, the electronic device can be a part of furniture, building, structure or machine (including vehicle, car, airplane or ship) or a type of an embedded board, a chipset, computer files or some type of sensors. The electronic device described in this disclosure is not limited to the aforementioned devices and can be a new form of an electronic device as technology development advances.

Classification of Biometric Modalities

FIG. 1 shows classification of biometric modalities that is adapted from A REVIEW OF BIOMETRIC TECHNOLOGY ALONG WITH TRENDS AND PROSPECTS; authored by Unar J A, Seng W C, and Abbasi A.; and published in Pattern Recognition, 2014, 47(8): 2673-2688". The idea of human identification based on physiological or behavioral attributes of individuals is often termed as "biometrics". Although these are several advantages over traditional methods when biometrics is used in the identification, authentication, liveliness or encryption, or the like, known biometrics is unlikely to offer a highly robust security solution in some aspects. A physiological biometric solution disclosed herein, called Neuro-Fingerprint (NFP) or Neuro-Print (NP), can offer better improved, effective, solid and heightened solutions for the identification, authentication, liveliness or encryption, or the like. The position of the NFP relative to the rest of biometrics is also illustrated in FIG. 1. Contrary to the rest of the field, the NFP is a live physiologic signal, never being exactly the same and yet allowing it to be recognized. It stands in a novel category, together with a functional MRI scan of the brain, the EEG (Electroencephalography), the ECG (Electrocardiogram), the EMG (Electromyography), the EKG (Electrocardiogram) from the heartbeats or external/internal electrode.

Behavioral identification methods are linked to what the user does or his/her habits. Known anatomical identification methods are linked to physical features of the user, such as fingerprints, iris eye scans, veins, facial scans, and DNA. Certain user motions are habitual or part of a user's motion repertoire. A user signing a document, for example, is a contextual motion that a user develops with behavioral habits. The motions usually analyzed of a signed signature are the macro-motions or large-scale motions that a user makes with a writing instrument. Most of these actions are voluntary movements because they are motions according to the consciousness or intention of the user. For example, from the large motions of a signed signature one can determine with one's eyes whether the writer was left-handed or right-handed.

While these large motions may be useful, there are also micro-motions (very small motions) that a user makes when signing, making other motions, or simply at rest making no motion. These micro-motions are neuro-derived or neuro-based and invisible to the eyes. Therefore, it belongs to involuntary movement rather than consciousness or intention of the user. These micro-motions of a user are due to the unique neuromuscular anatomy of each human being and can also be referred to herein as neuro-derived micro-motions. These micro-motions are also linked to the motor control processes from the motor cortex of an individual down to his/her hands. With one or more sensors, signal processing algorithms, and/or filters, electronic signals ("motion signals" and "micro-motions signals") can be captured that include the neuro-derived micro-motions of a user. Of specific interest are micro-motion electronic signals that represent the micro-motions of the user within the motion signals.

Therefore, when motion signals are analyzed appropriately for micro-motion signals representing micro-motions of users, the resulting data can yield unique and stable physiological identifiers, more specifically neurological identifiers, that can be used as unwritten signatures. These unique identifiers derived from the user's neuro-muscular tones are a user's neuro-mechanical fingerprints. Neuro-mechanical fingerprints can also be referred to herein as Neuro-Fingerprint (NFP) or Neuro-Print (NP).

Micro-motions of a user are linked to the cortical and subcortical control of the motor activities in the brain or elsewhere in the nervous system of a human body. Like a mechanical filter, the specific musculoskeletal anatomy of an individual can affect the micro-motions of a user and contribute to the motion signals, including micro-motions of a user and micro-motion signals. The signal thus contributed is a signal of movement of the muscles by the nerve signal, which can be referred to as neuro muscular tone. The motion signals captured from a user can also reflect part of the proprioceptive control loops that include the brain and proprioceptors that are present in a user's human body. By focusing on micro-motion signals and not macro-motion signals, an electronic device can be used with a neurological algorithm to better emulate a human cognitive interface in a machine.

Emulation of a human cognitive interface in a machine can improve man-machine interfaces. For example, consider a human cognitive interface between a husband and wife or closely-knit persons. When a husband touches his wife on the arm, the wife can often times recognize that it is her husband touching her just from the feel of that touch, because she is familiar with his touch. If the touch feels unique, a human can often recognize what it is that is touching him/her just from that unique feel.

The NFP or NP is generated in response to micro-motions that are related to a type or form of tremor. A tremor is an unintentional, rhythmic muscle movement that causes an oscillation in one or more parts of a human body. Tremors can be visible or invisible to the unaided eye. Visible tremors are more common in middle aged and older persons. Visible tremors are sometimes considered to be a disorder in a part of the brain that controls one or more muscles throughout the body, or in particular areas, such as the hands and/or fingers.

Most tremors occur in the hands. Thus, a tremor with micro-motions can be sensed when holding a device with an accelerometer or through a finger touching a touchpad sensor.

There are different types of tremors. The most common form or type of tremor occurs in healthy individuals. Much of the time, a healthy individual does not notice this type of tremor because the motion is so small and can occur when performing other motions. The micro-motions of interest that are related to a type of tremor are so small that they are not visible to the unaided eye.

A tremor can be activated under various conditions (resting, postural, kinetic) and can be often classified as a resting tremor, an action tremor, a postural tremor, or a kinetic or intention tremor. A resting tremor is one that occurs when the affected body part is not active but is supported against gravity. An action tremor is one that is due to voluntary muscle activation, and includes numerous tremor types including a postural tremor, a kinetic or intention tremor, and a task-specific tremor. A postural tremor is linked to support the body part against gravity (like extending an arm away from the body). A kinetic or intention tremor is linked to both goal-directed and non-goal-directed movements. An example of a kinetic tremor is the motion of a moving a finger to one's nose, often used for detecting a driver for driving under the influence of alcohol. Another example of a kinetic tremor is the motion of lifting a glass of water from a table. A task-specific tremor occurs during very specific motions such as when writing on paper with a pen or pencil.

Tremors, whether visible or not to the eyes, are thought to originate in some pool of oscillating neurons within the nervous system, some brain structures, some sensory reflex mechanisms, and/or some neuro-mechanical couplings and resonances.

While numerous tremors have been described as either physiologic (without any disease) or pathological, it is accepted that the amplitudes of tremors may not be very useful in their classification. However, the frequencies of tremors and other types of invariant features associated with involuntary signals including neuro muscular tone obtained from the user can be of interest. The frequencies of tremors and other types of invariant features allow them to be used in a useful manner to extract a signal of interest and generate a unique NFP for each user.

Numerous pathological conditions like Parkinson (3-7 Hertz), cerebellar diseases (3-5 Hertz), dystonias (4-7 Hertz), various neuropathies (4-7 Hertz) contribute motions/ signals to the lower frequencies, such as frequencies at 7 Hertz (Hz) and below. Because pathological conditions are not common to all users, these frequencies of motions/ signals are not useful for generating NFPs and are desirable to filter out. However, some of the embodiments disclosed herein are used to specifically focus on those pathological signals as a way to record, monitor, follow said pathologies to determine health wellness or degradation.

Other tremors, such as physiological, essential, orthostatic, and enhanced physiological tremors can occur under normal health conditions. These tremors are not pathologies per se. Accordingly, they are often present in the population as a whole. Physiological tremors, as well as others that are common to all users, are of interest because they generate micro-motions at frequencies over a range between 3 to 30 Hz, or 4 to 30 Hz. They can be activated when muscles are used to support body parts against the force of gravity. Accordingly, holding an electronic device in one's hand to support the hand and arm against gravity can generate physiological tremors that can be sensed by an accelerometer. Touching a touchpad of an electronic device with the finger of a hand and supporting it against gravity, can generate physiological tremors that can be readily sensed by a finger touchpad sensor.

Essential tremors of a kinetic type, can occur and be sensed when a user has to enter a PIN or login ID to gain access to a device or a phone. The frequency range of essential tremors can be between 4 to 12 Hz that could be reduced to a frequency range of 8 to 12 Hz to avoid sensing for tremors that are due to uncommon pathological conditions.

For the physiological tremor (or the enhanced physiological tremor, idem with larger amplitudes), the coherence of different body sides is low. That is, a physiological tremor on the left body side is not very coherent to a physiological tremor on the right body side. Accordingly, it is expected that tremors in the left hand or finger will differ from tremors in the right hand or right finger of a user. Accordingly, the NFP authentication system will require a user to be consistent in using the same side hand or finger for authentication; or alternatively, multiple authorized user calibration parameter sets, one for each hand or one for each finger that will be used to extract an NFP.

Motions with a higher frequency of interest can be considered to be noise. Accordingly, signals with a frequency higher than the maximum in the desired range (e.g., 12 Hz or 30 Hz) in the raw motion signal are desirous to be filtered out. Thus, a frequency signal ranges from 8 Hz to 12 Hz, and/or 8 Hz to 30 Hz contains useful information regarding micro-motions that can be used to generate NFPs.

The raw signal, captured by a finger touchpad sensor in an electronic device or by an accelerometer of a hand-held electronic device, can have a number of unwanted signal frequencies in it. Accordingly, a type of filtration having a response to filter out signals outside the desired frequency range can be used to obtain a micro-motions signal from the raw electronic signal. Alternatively, an isolation/extraction means for signals in the desired frequency range can be used to obtain a micro-motions signal from the raw electronic signal. For example, a finite impulse response band-pass filter (e.g., the passband of 8 to 30 HZ) can be used to select the low signal frequency range of interest in a raw electronic signal sensed by a touchpad or accelerometer. Alternatively, a low-pass filter (e.g., 30 Hz cutoff) and a high-pass filter (e.g., 8 Hz cutoff) or a high-pass filter (e.g., 8 Hz cutoff) and a low-pass filter (e.g., 30 Hz cutoff) can be combined in series to achieve a similar result.

Various Types of Motion Classification

FIGS. 2A-2B shows tables of various types of motion classifications. FIG. 2A illustrates motion classifications that are not used or unlikely used. FIG. 2B illustrates motion classifications that are used or likely used by the disclosed embodiments. FIG. 2A is a classification table that provides a better understanding of what kinds of characteristics that should be filtered out from the user's acquired motion signal. FIG. 2B is a classification table that provides a better understanding of what kinds of characteristics should be considered and measured from the user's acquired motion signal to obtain feature data related to an NFP or an NP.

Operating Environment of Electronic Devices Using NP Security Features

Figure 3:
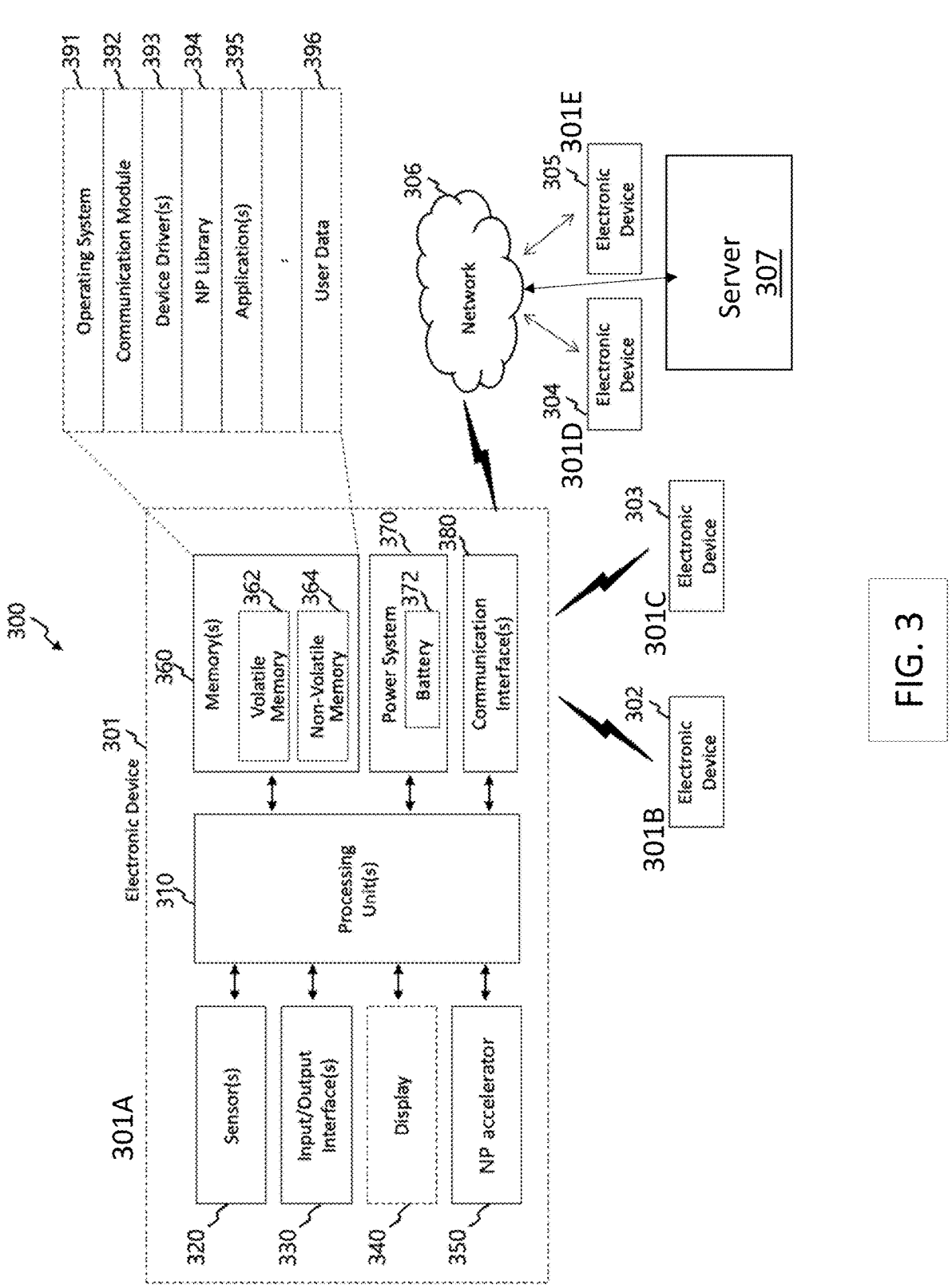
FIG. 3 is a block diagram of operating environment of electronic devices.

FIG. 3 is a block diagram of a system 300 illustrating exemplary operating environment of a plurality of electronic devices 301A-301D that use and implement NP security features in accordance with some embodiments.

The electronic device 301, an instance of the electronic devices 301A-301D, can include a processing unit 310, a sensor 320, an input/output interface 330, a display 340, a Neuro-Print (NP) accelerator 350, a memory 360, a power system 370, a communication interface 280 and so on. The electronic devices 301A-301E can communicate with each other and be connected through a network 306 or the communication interface 380.

It is appreciated that this is merely an example of some embodiments described in this disclosure. The electronic devices 301A-301E can include more or fewer components than shown in FIG. 3, two or more components can be combined together, or a certain part of components can be mixed together differently in FIG. 3. The various components shown in FIG. 3 can be implemented in hardware, software, or a combination of hardware and software.

The processing unit 310 can include at least one central processing unit and the central processing unit can include at least one processing cores. The processing unit 310 can further include at least one or more of co-processors, communication processors, digital signal processing cores, graphics processing cores, low-power sensor control processors, special purpose controller and so on. In addition, various hierarchical internal volatile and nonvolatile memories can be included to perform functions such as an initial booting procedure, an operation for communicating with an external electronic device, an operation for downloading an initial booting or loader related program from an external electronic device, an interrupt operation, an operation for improving performance of an electronic device in a runtime operation of program and so on. The processing unit can load program instructions from a memory, a communication module or external sources, can decode the instructions, can execute an operation, a data processing, can store result according to the decoded instructions, or can perform identification, authentication, liveliness, encryption or various operations associated with the Neuro-Print (NP). The term processing unit can be often called, by those of ordinary skill in the art, as a processor, an application processor (AP), a central processing unit (CPU), an MCU (Micro Controller Unit), a controller and so on.

The sensor 320 can sense or measure the state or physical quantity of the electronic device and convert it into an electric signal. The sensor 320 can include an optical sensor, an RGB sensor, an IR sensor, a UV sensor, a fingerprint sensor, a proximity sensor, a compass, an accelerometer sensor, a gyro sensor, a barometer, a grip sensor, a magnetic sensor, an iris sensor, a GSR (Galvanic Skin Response) sensor, an EEG (Electroencephalography) sensor, an ECG (Electrocardiogram) sensor, an EMG (Electromyography) sensor, an EKG (Electrocardiogram) sensor, external/internal electrode and so on. The sensor 320 can collect signals (e.g., motion signals, neuro-muscular tone, etc.) from a part of the user's body and transmit them to at least one component of the electronic device 301 including the processing unit 310 or the neural-print (NP) accelerator 350 and then can perform identification, authentication, liveliness, encryption or various operations associated with the Neuro-Print (NP).

The input/output interface 330 can include an input interface and an output interface. The input interface receives input from a user or an external device of the electronic device 301 in the form of input including signals and/or instructions and transfers the input to the component of the electronic device. The output interface transfers an output signal through the components of the electronic device 301 or to the user. For example, the input/output interface can include an input button, an LED, a vibration motor, various serial interfaces (e.g., USB (Universal Serial Bus), UART (Universal asynchronous receiver/transmitter), HDMI (High Definition Multimedia Interface), MHL (Mobile High-definition Link), IrDA (Infra-red Data Association), or etc.) and so on.

The display 340 can display various contents such as images, texts, or videos to the user. The display 340 can be a liquid crystal display (LCD), an organic light emitting diode (OLED) display, a hologram output device and so on. The display 340 can include a display driver IC (DDI) or a display panel. The display driver IC can transmit an image driving signal corresponding to the image information received from the processing unit 310 to a display panel, the image can be displayed according to the predetermined frame rate. The display driver IC can be implemented in an IC type and can include components such as a video memory capable of storing image information, an image processing unit, a display timing controller, a multiplexer and so on. The display 340 can include an input device such as a touch recognition panel, an electronic pen input panel, a fingerprint sensor, a pressure sensor and so on, or an output device such as a haptic feedback component. According to the specification of the electronic device 301, the display 340 may not be selectively included or may include at least one light emitting diode in a very simple form factor. The display 340 can display a position at which the user contacts a part of the user's body, a status indicator that describes acquisition start status, processing status, or completion status of gathering signals (e.g., motion signals, neuro-muscular tone, etc.) and by doing this, it makes the electronic device perform identification, authentication, liveliness, encryption or various operations associated with the Neuro-Print (NP).

The memory 360 can include at least one of volatile memory 362 (e.g., DRAM (Dynamic RAM), SRAM (Static RAM), SDRAM (Synchronous Dynamic RAM)) and non-volatile memory 364 (e.g., NOR flash memory, NAND flash memory, EPROM (Erasable and Programmable ROM), EEPROM (Electrically Erasable and Programmable ROM), HDD (Hard Disk Drive), SSD (Solid State Drive), SD (Secure Digital) Card memory, Micro SD Card memory, MMC (Multimedia Card)). At least one or more of boot loaders, an operating system 391, a communication function 392 library, a device driver 393, a Neuro-Print (NP) library 394, an application 395, or user data 396 can be stored in the non-volatile memory 364. When the electronic device is supplied with power the volatile memory 362 starts operating. The processing unit 310 can load programs or data stored in the nonvolatile memory into the volatile memory 362. By interfacing with the processing unit 310 during operation of the electronic device, the volatile memory 362 can play a role of main memory in the electronic device.

The power system 370 can serve to supply, control and manage power to the electronic device 301. The power system can include a PMIC (Power Management Integrated Circuit), a battery 372, a charging IC, a fuel gauge and so on. The power system can receive AC or DC power as a power source. The power system 370 can provide wired and wireless charging functions to charge the supplied power to the battery 372.

Figure 4:
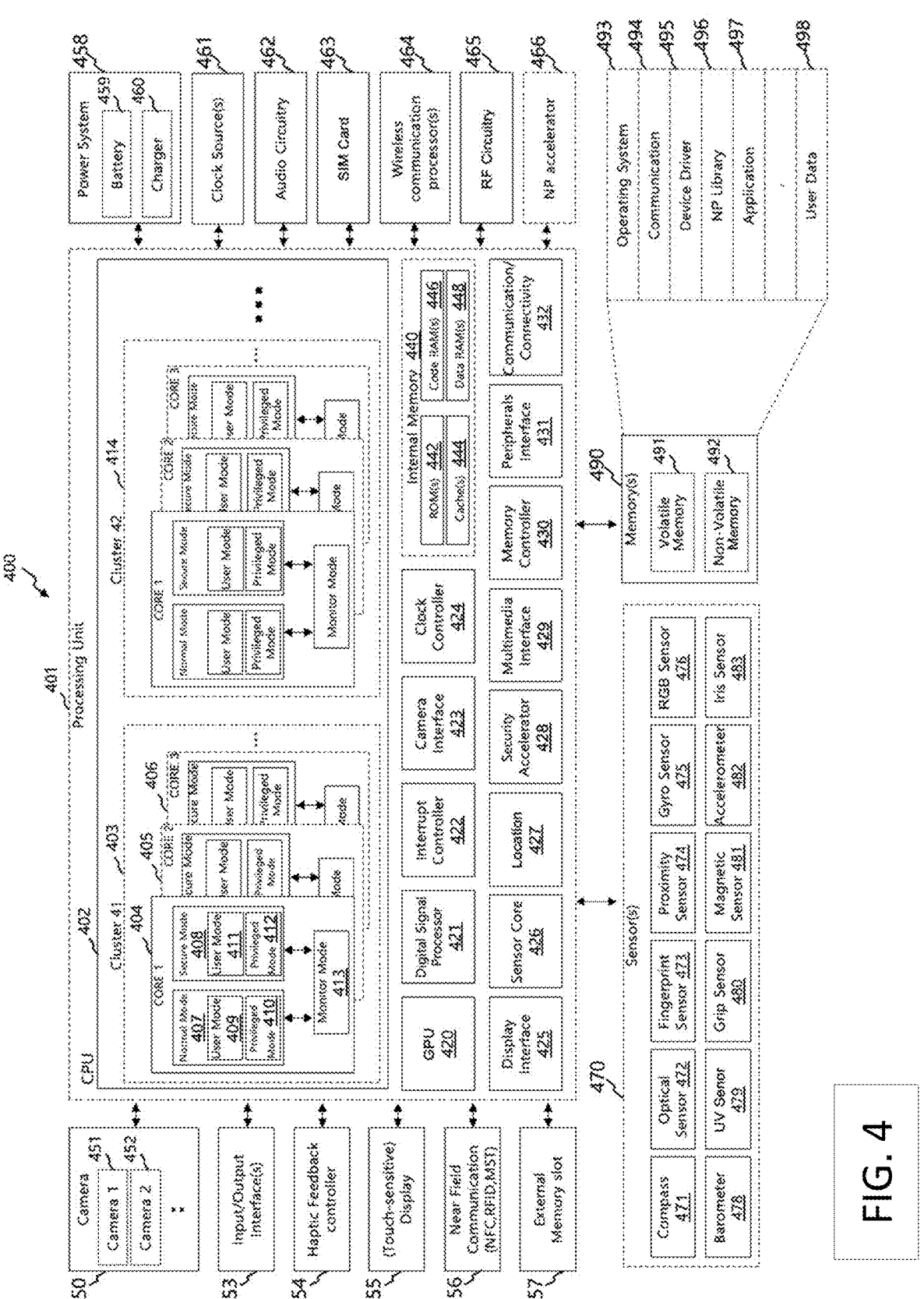
FIG. 4 is a block diagram of an electronic device to execute various disclosed functions of the embodiments.

The wireless communication interface 380 can include, for example, cellular communication, Wi-Fi communication, Bluetooth, GPS, RFID, NFC and so on and can further include an RF circuitry unit for wireless communication. The RF circuitry unit can include an RF transceiver, a PAM (Power Amp Module), a frequency filter, an LNA (Low Noise Amplifier), an antenna and so on. Detailed Block Diagram of electronic device implementing NP Security Features FIG. 4 is a detailed block diagram of an exemplary electronic device 400 implementing NP security features in accordance with some embodiments. The electronic device 400 can include a processing unit 401, a camera 450, an input/output interface 453, a haptic feedback controller 454, a display 455, a near field communication 456, an external memory slot 457, a sensor 470, a memory 490, a power system 458, a clock source 461, an audio circuitry 462, a SIM card 463, a wireless communication processor 464, a RF circuitry 465, and a Neuro-Print (NP) accelerator 466. The electronic device 400 can include further elements as shown in FIG. 4 and described herein.

It may be appreciated that the electronic device is merely one example of an embodiment. The electronic device optionally can have more or fewer components than shown, optionally can combine two or more components, or optionally can have a different arrangement or configuration of the components. The various components shown in FIG. 4 can be implemented in hardware, software or a combination of both hardware and software.

The processing unit 401 can include at least one central processing unit 402 and the central processing unit can include at least one processing core. The processing unit 401 can further include at least one or more of co-processors, communication processors, digital signal processing cores, graphics processing cores, low-power sensor control processors, special purpose controller and so on. The processing unit 401 can be implemented as an SoC (System On Chip) including various components in the form of a semiconductor chip. In one embodiment, the processing unit 401 can comprise a graphics processing unit (GPU) 420, a digital signal processor (DSP) 421, an interrupt controller 422, a camera interface 423, a clock controller 424, a display interface 425, a sensor core 426, a location controller 427, a security accelerator 428, a multimedia interface 429, a memory controller 430, a peripherals interface 431, a communication/connectivity 432, an internal memory 440 and so on. In addition, various hierarchical internal volatile and nonvolatile memories can be included to perform functions such as an initial booting procedure, an operation for communicating with an external electronic device, an operation for downloading an initial booting or loader related program from an external electronic device, an interrupt operation, or an operation for improving performance of an electronic device in a runtime operation of program and so on. The processing unit can load program instructions from a memory 490, a communication/connectivity 432, or wireless communication processor 464, can decode the instructions, can execute an operation, a data processing, can store result according to the decoded instructions, or can perform identification, authentication, liveliness, encryption or various operations associated with the Neuro-Print (NP). The term processing unit can be often called, by a person having ordinary skill in the art, as a processor, an application processor (AP), a central processing unit (CPU), an MCU (Micro Controller Unit), a controller and so on.

The central processing unit 402 can include at least one processor core 404, 405, 406. The central processing unit 402 can include a processor core having relatively low power consumption, a processor core having high power consumption with high performance, and one or more core clusters including multiple processor cores. For example, a first cluster 403 or a second cluster 414 includes multiple processor cores. This structure is a technique that is used to improve the performance of the electronic device and the power consumption gain by allocating the core dynamically in consideration of the calculation amount and the consumed current in the multi core environment. Processor cores can be equipped with circuits and techniques to enhance security. ARM® processors, a well-known low power mobile processor, have implemented enhanced security technology in their processors, that is referred to as a TRUSTZONE®. For example, the first core 404 can be one physical processor core that can operate both in a normal mode 407 and a security mode 408. According to the mode, the processor's registers and interrupt processing mechanism can be operated separately so that access to resources (e.g., peripherals or memory areas) requiring security is allowed to access only in a secure mode. The monitor mode 413 can enable the mode switching between the normal mode 407 and the security mode 408. In the normal mode 407, the mode can be switched to the security mode 408 through a certain instruction or interrupt. The applications executed in the normal mode 407 and the security mode 408 are isolated between each other so that they cannot affect the applications executed in the respective modes, thereby allowing applications requiring high reliability to be executed in the security mode 408, consequently, the reliability of the system can be enhanced. It is possible to increase security by making it possible to execute a part of the operations in performing identification, authentication, liveliness, encryption or various operations associated with the Neuro-Print (NP) in the security mode 408.

The camera 450 can include a lens for acquiring an image, an optical sensor, an image signal processor (ISP) and so on and can acquire still images and moving images. And the camera 450 can include a plurality of cameras (e.g., the first camera 451, the second camera 452) to provide various functions associated with enhanced camera function.

The input/output interface 453 can include an input interface and an output interface. The input interface receives input from a user or an external device of the electronic device 400 in the form of input including signals and/or instructions and transfers the input to the component of the electronic device. The output interface transfers an output signal through the components of the electronic device 400 or to the user. For example, the input/output interface can include an input button, an LED, a vibration motor, various serial interfaces (e.g., USB (Universal Serial Bus), UART (Universal asynchronous receiver/transmitter), HDMI (High Definition Multimedia Interface), MHL (Mobile High-definition Link), IrDA (Infra-red Data Association), or etc.) and so on.

The haptic feedback controller 454 can include a vibration motor, which is usually called as an actuator, in order to provide the user with the ability to feel a certain sensation through a tactile sense.

The display (touch sensitive display) 455 can display various contents such as images, texts, and videos to the user. The display 455 can be a liquid crystal display (LCD), an organic light emitting diode (OLED) display, a hologram output device and so on. The display 455 can include a display driver IC (DDI) or a display panel. The display driver IC can transmit an image driving signal corresponding to the image information received from the processing unit 401 to a display panel, the image can be displayed according to the predetermined frame rate. The display driver IC can be implemented in an IC type and can include components such as a video memory capable of storing image information, an image processing unit, a display timing controller, a multiplexer and so on. The display 455 can include an input device such as a touch recognition panel, an electronic pen input panel, a fingerprint sensor, a pressure sensor and so on, or an output device such as a haptic feedback component. According to the specification of the electronic device 400, the display 455 may not be selectively included or may include at least one light emitting diode in a very simple form factor. The display 455 can display a position at which the user contacts a part of the user's body, a status indicator that describes acquisition start status, processing status, or completion status of gathering motion signals and by doing this, it makes the electronic device perform identification, authentication, liveliness, encryption or various operations associated with the Neuro-Print (NP).

The near field wireless communication 456 can be implemented in a wireless communication system in order to perform communication with other electronic devices in close proximity such as Near Field Communication (NFC), Radio Frequency Identification (RFID), MST (Magnetic Secure Transmission) and so on.

The external memory slot 457 can include an interface capable of mounting a memory card (e.g., an SD card, a Micro SD card and so on) so as to expand the storage space of the electronic device 400.

The power system 458 can serve to supply, control and manage power to the electronic device 400. The power system can include a PMIC (Power Management Integrated Circuit), a battery 459, a charging IC 460, a fuel gauge and so on. The power system can receive AC or DC power as a power source. The power system 458 can provide wired and wireless charging functions to charge the supplied power to the battery 459.

The clock source 461 can include at least one of the system clock oscillators serving as a reference for the operation of the electronic device 400 and a frequency oscillator for transmitting and receiving an RF signal.

The audio circuit 462 can include an audio input unit (e.g., a microphone), an audio output unit (receiver, speaker, etc.) and/or a codec that performs a conversion between the audio signal and the electrical signal, thereby providing an interface between the user and the electronic devices. The audio signal can be obtained through the audio input unit can be converted into an analog electric signal and then can be sampled or digitized to be transmitted to another component (e.g., a processing unit) in the electronic device 400 to perform audio signal processing. The digital audio data transmitted from other components in the electronic device 400 can be converted into analog electric signals to generate audio signals through the audio output unit.

The SIM card 463 is an IC card that implements a subscriber identification module for identifying a subscriber in cellular communication. In most cases, a SIM card is mounted in a slot provided in the electronic device 410 and can be implemented in the form of an embedded SIM coupled to an electronic device, depending on the type of the electronic device. Each SIM card can have its own unique number and the unique number can include a fixed number ICCI (Integrated Circuit Identifier) and IMSI (International Mobile Subscriber Identity) information that varies from one subscriber line to another.

Wireless communication processor 464 can include, for example, cellular communication, Wi-Fi communication, Bluetooth, GPS and so on. Through the wireless communication processor 464, identification, authentication, liveliness, encryption or various operations associated with the Neuro-Print (NP) can be performed over the network in cooperation with at least one or more other electronic devices (including the server).

The RF circuit 465 can include a transceiver, a PAM (power amp module), a frequency filter, an LNA (low noise amplifier), an antenna and so on. It is possible to exchange control information and user data with the wireless communication processor and the processing unit to perform transmission and reception through a radio frequency in a wireless environment.

The Neuro-Print accelerator 466 can be used to increase the speed of performing computations that process signals obtained from a part of the user's body, or to increase the performance of the entire system by performing computations or some part of computations that are required to execute identification, authentication, liveliness, encryption or various operations associated with the Neuro-Print (NP).

One or more sensors 470 can sense or measure the state, physical quantity, etc. of the electronic device and convert it into an electric signal. The sensor 470 can include a compass 471, an optical sensor 472, a fingerprint sensor 473, a proximity sensor 474, a gyro sensor 475, an RGB sensor

476, a barometer 478, a UV sensor 479, a grip sensor 480, a magnetic sensor 481, an accelerometer 482, an iris sensor 483 and so on. The sensor 470 can collect motion signals from portions of the user's body and transmits them to at least one component of the electronic device 400, including the processing unit 401, the Neuro-Print (NP) accelerator 466 and can perform identification, authentication, liveliness, encryption or various operations associated with the Neuro-Print (NP).

The memory 490 can include at least one of volatile memories 491 (e.g., DRAM (dynamic random access memory), SRAM (Static RAM), SDRAM (Synchronous Dynamic RAM) and non-volatile memory 492 (e.g., NOR flash memory, NAND flash memory, EPROM (Erasable and Programmable ROM), EEPROM (Electrically Erasable and Programmable ROM), HDD (Hard Disk Drive), SSD (Solid State Drive), SD (Secure Digital) Card memory, Micro SD Card memory, MMC (Multimedia Card)). At least one or more of boot loaders, an operating system 493, a communication function 494 library, a device driver 495, a Neuro-Print (NP) library 496, an application 497, or user data 498 can be stored in the non-volatile memory 492. When the electronic device is supplied with power, the volatile memory 491 starts operating. The processing unit 401 can load programs or data stored in the non-volatile memory into the volatile memory 491. By interfacing with the processing unit 401 during operation of the electronic device, the volatile memory 491 can play a role of main memory in the electronic device.

The electronic device 400 can acquire a signal from the portion of the user's body via the sensor 470 and provide the acquired signal to at least one of the processing unit 401, Neuro-Print accelerator 466 and/or memory 490, through the interaction between these components, it is possible to perform identification, authentication, liveliness, encryption or various operations associated with the Neuro-Print (NP). The identification, authentication, liveliness, encryption or various operations associated with the Neuro-Print (NP) can be performed independently by the electronic device 400 and can be performed over the network in cooperation with at least one or more other electronic devices.

Neuro-Print (NP) Applications

Figure 5:
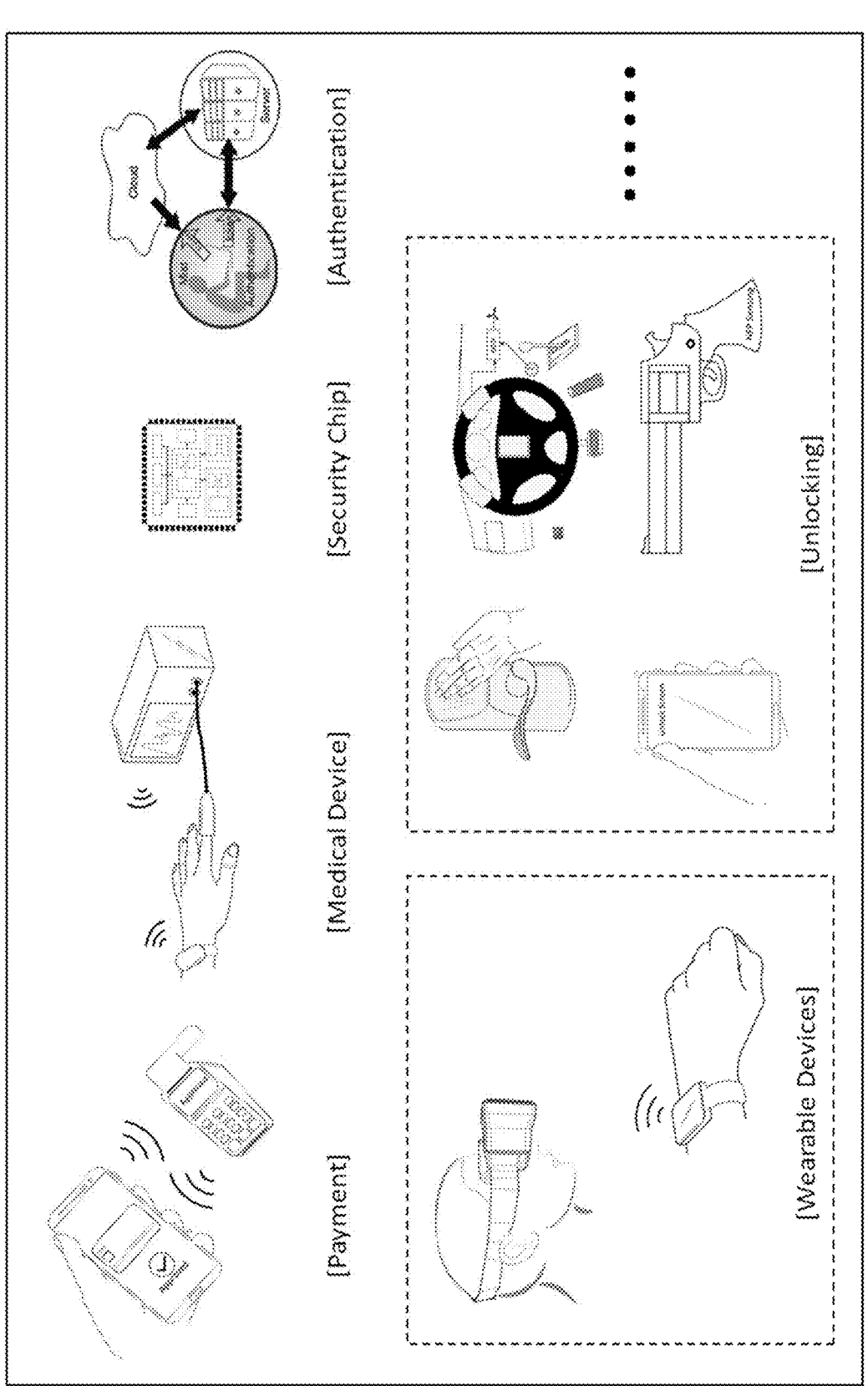
FIG. 5 is a chart illustrating various applications of a neuro-print (NP).

FIG. 5 illustrates example applications of a Neuro-Print (NP) associated with a user. When a user holds an electronic device with NP security features by hand or a part of user body contacts the electronic device with NP, a motion signal for the movement of a human body can be acquired by a sensor of the electronic device. The motion signal can be converted into an electric (electronic) signal. From the electric signal, neuro-derived micro motion signals or neuro muscular tones can be extracted.

When the neuro muscular tones are analyzed appropriately, it can yield unique and stable physiological identifiers, more specifically neurological identifiers. These unique identifiers are a user's neuro-mechanical fingerprints and can also be referred to herein frequently as Neuro-Print (NP). That is, the Neuro-Print can be recognized by the user's gripping, holding or contacting of the electronic device, and the comparison with the Neuro-Print of the user stored in the security area of the electronic device is performed to determine whether or not the user is an authorized user.

In particular, it relates to a method and apparatus for collecting motion signals from the user's body part by a motion sensor, filtering undesired signals and extracting neuro-muscular micro-motion data from the motion signals, extracting unique characteristics by performing signal processing and feature extraction from the neuro-muscular micro-motion data, and generating neuro-mechanical identifier based on the unique characteristics.

In addition, in order to locally authenticate the authenticated user and to control access to the electronic device, the electronic device can generate a neuro-mechanical identifier for the user in response to the micro-motion signal sensed from the user's body part, calculate a match rate of the neuro-mechanical identifier in response to the authenticated user calibration parameter, and determine user access control on the electronic device in response to the match rate. These operations can be utilized in various fields such as credit card payment, medical information collection and processing of medical devices, authentication, liveliness or encryption for user login in a cloud environment, authentication, liveliness or encryption of wearable device, unlocking of various locking devices (e.g., door lock, screen unlock, car key, etc.).

Feature Processing System

Figure 6:
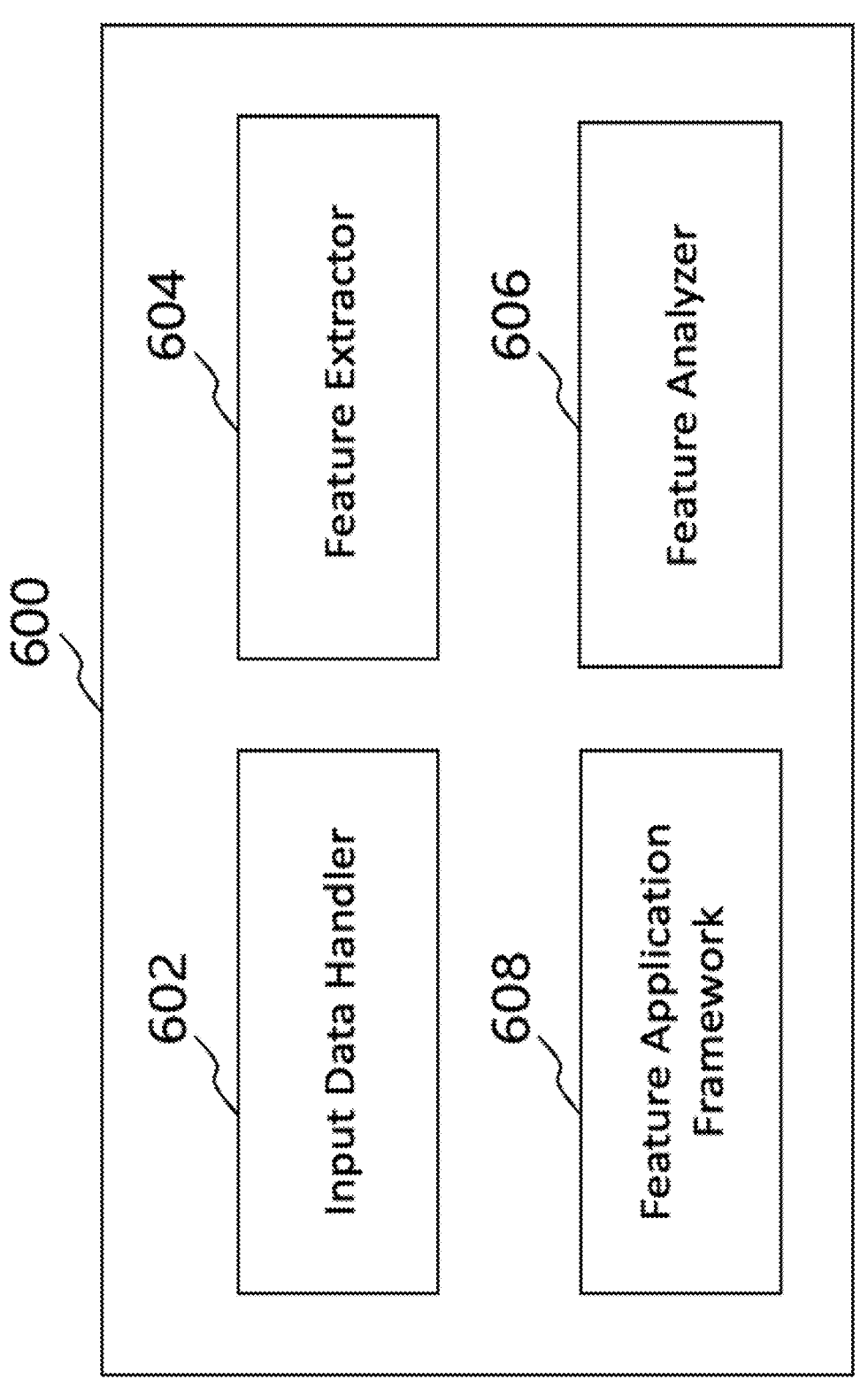
FIG. 6 is a block diagram of a feature processing system.

FIG. 6 depicts a block diagram of an embodiment of a Feature processing system 600. The Feature processing system 600 can be implemented in the electronic device 400 in FIG. 4 or the electronic device 301 in FIG. 3 and additional hardware components or software modules can be used. The Feature processing system 600 can be configured in combination with at least one or more examples of the various embodiments described herein of each of the functions of FIG. 6. The Feature processing system 600 can include an Input Data Handler 602, a Feature Extractor 604, a Feature Analyzer 606, and a Feature Application Framework 608. The Feature processing system 600 can be implemented in hardware, implemented in software, or implemented in a combination of hardware and software.

In some embodiments, the Input Data Handler 602 can include various types of sensors including an acceleration sensor, a gyro sensor, a geomagnetic sensor, an optical sensor, an electroencephalography (EGE), an electrocardiogram (ECG), an electromyography (EMG), a galvanic skin response (GSR), and the like. Image information data can be obtained from a camera, and data can be collected and processed in the form of a computer file. The Feature Extractor 604 receives certain data from the Input Data Handler 602, performs preprocessing to remove unwanted signals or performs a specific process for processing efficiency, and perform extraction of numerical feature data representing a characteristic of the observed data. The Feature Analyzer 606 analyzes the feature data based on the characteristic feature data extracted by the Feature Extractor 604. When analyzing feature data, the feature data acquired from the Feature Extractor can be used, data in the form of computer files already collected through other paths can be analyzed, and the combination of these data can be analyzed. The Feature Analyzer 606 can derive information associated with the analyzed feature data and store this derived information. By using the information associated with the previously stored feature data, it is possible to derive an analysis result for the new input feature data. The Feature Application Framework 608 can utilize the result information of the Feature Analyzer 606 to perform identification, authentication, liveliness, encryption, or a function using the same.

Neuro-Print Processing System

Figure 7:
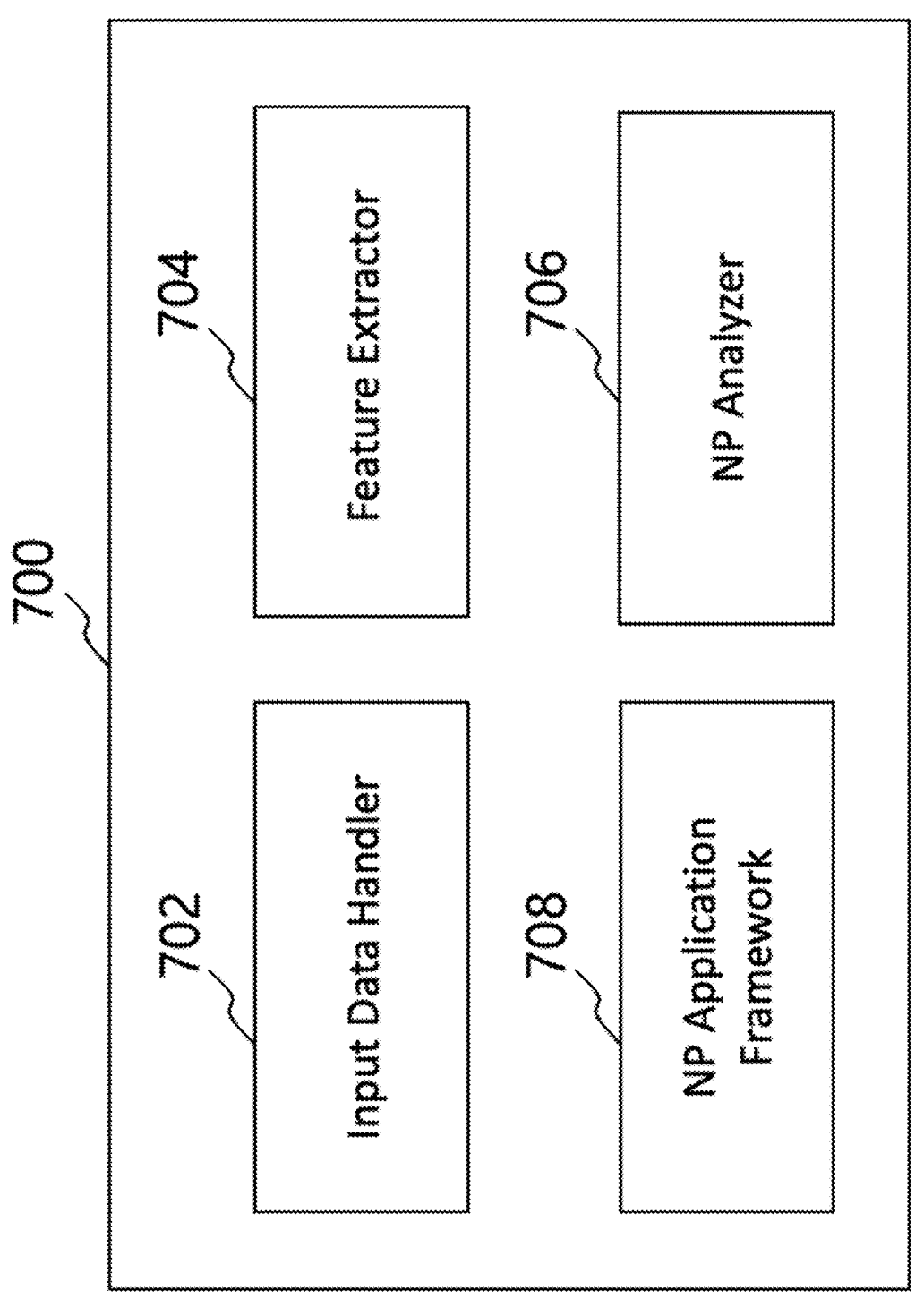
FIG. 7 is a block diagram of a neuro-print processing system.

FIG. 7 depicts a block diagram of an embodiment of a Neuro-Print processing system 700. In some embodiments, The Neuro-Print processing system 700 can be implemented in the electronic device 400 in FIG. 4 or the electronic device 301 in FIG. 3 and additional hardware components or software modules can be used. The Feature processing system 600 of FIG. 6 can also be implemented in the form of the Neuro-Print processing system 700 that processes neural fingerprint data such as FIG. 7. The Neuro-Print processing system 700 can be configured in combination with at least one or more examples of the various embodiments described herein. The Neuro-Print processing system 700 can include an NP Input Data Handler 702, an NP Feature Extractor 704, an NP Feature Analyzer 706, and an NP Feature Application Framework 708. The Neuro-Print processing system 700 can be implemented in hardware, implemented in software, or implemented in a combination of hardware and software. The Neuro-Print processing system 700 can be in the form of software that is executed in the electronic device 301 of FIG. 3 or the electronic device 400 of FIG. 3. Some components of the Neuro-Print processing system 700 can be implemented in the electronic device 301 or the electronic device 400 in the form of software associated with a special purpose hardware accelerator.

In some embodiments, the NP Input Data Handler 702 can collect data from various types of sensors including an acceleration sensor, a gyro sensor, a geomagnetic sensor, an optical sensor, an electroencephalography (EEG), an electrocardiogram (ECG), an electromyography (EMG), an electrocardiogram (EKG), an external/internal electrode, a galvanic skin response (GSR), and the like. Image information data can be obtained from a camera, and data can be collected and processed in the form of a computer file. The NP Feature Extractor 704 receives certain data from the Input Data Handler 502, performs preprocessing to remove unwanted signals or performs a specific process for processing efficiency, and perform extraction of numerical feature data representing a characteristic of the observed data. The NP Feature Analyzer 706 analyzes the feature data based on the characteristic feature data extracted by the NP Feature Extractor 704. When analyzing feature data, the feature data acquired from the NP Feature Extractor can be used, data in the form of computer files already collected through other paths can be analyzed, and the combination of these data can be analyzed. The NP Feature Analyzer 706 can derive information associated with the analyzed feature data and store this derived information. By using the information associated with the previously stored feature data, it is possible to derive an analysis result for the new input feature data. The NP application framework 708 can utilize the result information of the NP analyzer 706 to perform identification, authentication, liveliness, encryption, or a function using the same.

NP Input Data Handler

In some embodiments, the NP Input Data Handler 702 can collect data from various types of sensors including an acceleration sensor, a gyro sensor, a geomagnetic sensor, an optical sensor, an electroencephalography (EEG), an electrocardiogram (ECG), an electromyography (EMG), an electrocardiogram (EKG), an external/internal electrode, a galvanic skin response (GSR), and the like. Image information data can be obtained from a camera, and data can be collected and processed in the form of a computer file.

In some embodiments, the NP Input Data Handler 702 can collect a movement signal data from a body part of the user's body that can be obtained by the sensor of electronic device 400. The sensor can include a sensor capable of detecting a user's movement or vibration. For example, the sensor can include a compass 471, a gyro sensor 475, an acceleration sensor 482, a geomagnetic sensor, a camera 450, an optical sensor, a touch sensor of the touch sensitive display 455, an electroencephalography (EEG), an electrocardiogram (ECG), an electromyography (EMG), an electrocardiogram (EKG), an external/internal electrode, a galvanic skin response (GSR), or a combination thereof.

The sensor can sense motions, vibrations, movement associated with neuro muscular derived signals and the like that are generated in a portion of the user's body that is in contact with the electronic devices. Movements or micro movements associated with neuromuscular derived signals can be sensed in the form of analog electrical signals in the sensor. For example, in the case of a sensor made using MEMS technology, the physical quantity that is changed by the force of movement generated in contact with a part of the user's body can be measured as an electrical analog signal using a method such as capacitance, piezoelectric, piezo resistive or thermal sensing.

Sensing Structure

Figure 8:
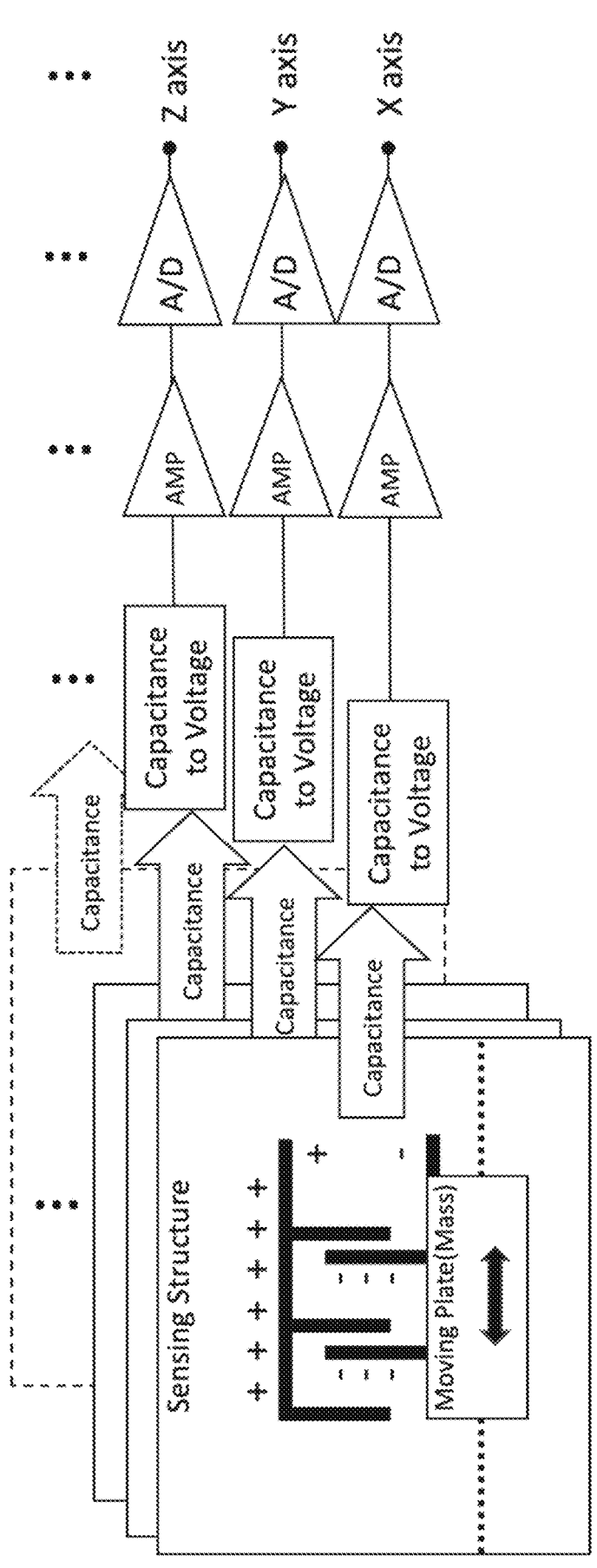
FIG. 8 is a block diagram of a sensing structure.

FIG. 8 shows an example of the sensing structure in the sensor on the electronic device 301 or the electronic device 400. Acceleration or angular velocity actually measures the force exerted on a substance and indirectly measures the acceleration or angular velocity through forces applied from the outside of the substance. Therefore, the micro motion or micro movement of the muscle caused by the neuro-derived mechanism is transmitted as a force applied to the electronic device, and the measured force can be indirectly calculated in the form of acceleration or angular velocity. An external force is applied from the outside of the electronic device to which the sensor is attached, and the moving plate (MASS) of FIG. 8 moves and the change of capacitance occurs because the distance of the electrode in the sensing structure changes. The changed capacitance is converted into the form of analog voltage and an analog voltage signal is applied to the input of the A/D converter via an amplifier. Multiple of the sensing structure can make it possible to measure multiple axes' values of the acceleration and angular velocity and these values can be used for more sophisticated applications. The measured electrical analog signal can be sampled by a predefined sampling frequency for a pre-defined period (e.g., 3, 5, 10, 20, 30 seconds, etc.) in the A/D converter.

Sensor

Figure 9:
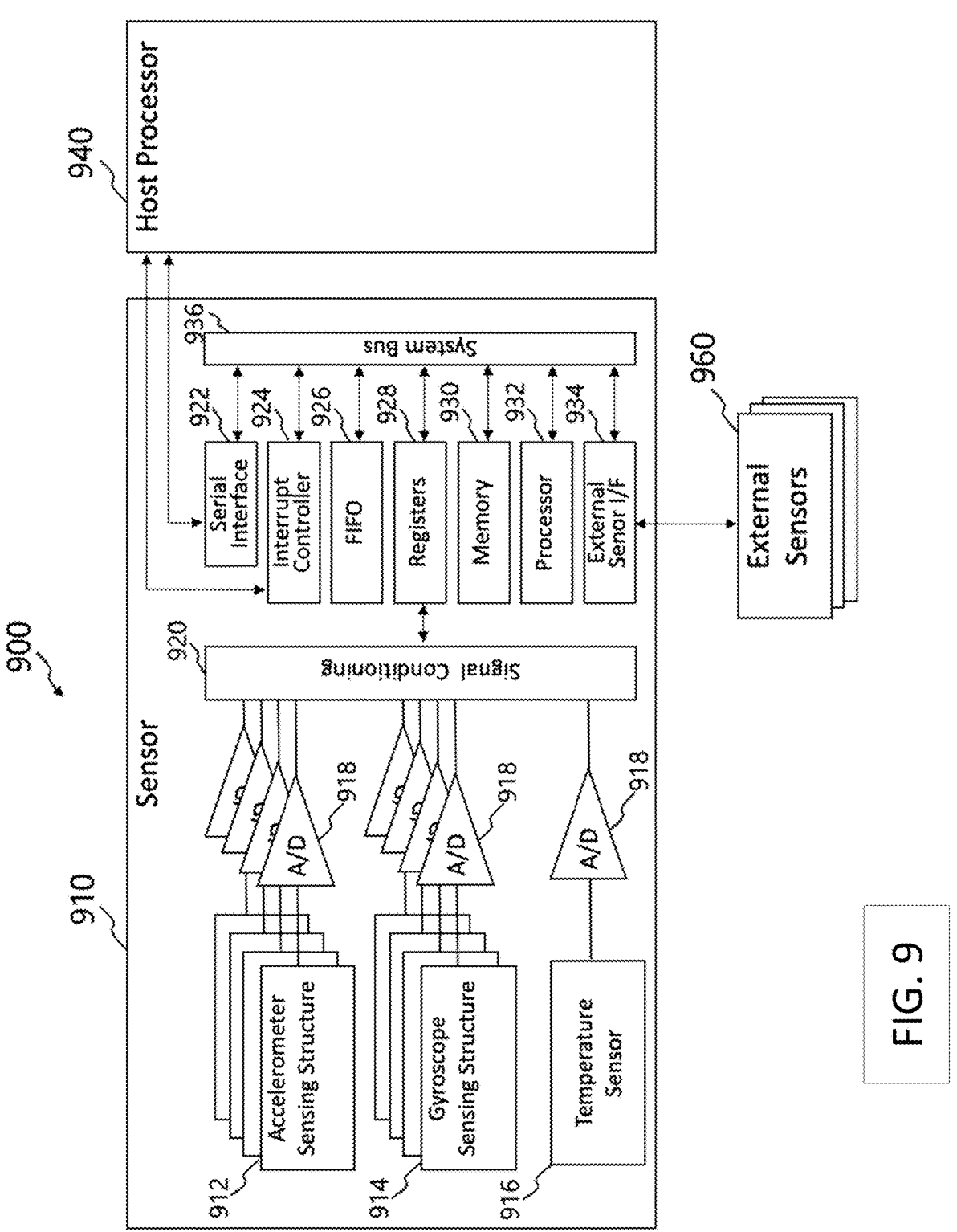
FIG. 9 is a block diagram of a sensing system.

FIG. 9 shows the block diagram of the sensor on the electronic device 301 or the electronic device 400. The Sensor 910 can include an Acceleration Sensing Structure 912, a Gyroscope Sensing Structure 914, a Temperature Sensor 916, an A/D converter 918, a Signal Conditioning 920, a Serial interface 922, an Interrupt Controller 924, a FIFO 926, a Registers 928, a Memory 930, a Processor 932, an External Sensor Interface 934 and a System bus 936.

The Acceleration Sensing Structure 912 can include a plurality of sensing structures to measure the acceleration of a plurality of axes. The acceleration measured in the acceleration sensing structure can be analog output in the form of analog voltage and it can be converted into digital data through an A/D converter. Measured acceleration from the Acceleration Sensing Structure 912 can drift due to the temperature change and the characteristic of the material forming the sensing structure. The drift in the sensing value can be compensated with the help of the temperature sensor 916. The Signal Conditioning 920 can include a signal processing filter required for signal processing to improve signal quality. The processor 932 can control the configuration of the signal processing filter. Acceleration values measured can be stored in the Registers 923 through Signal Conditioning 920. The acceleration values stored in the Registers 923 can be recorded in the range of ±2 g, ±4 g, ±8 g, ±16 g depending on the predefined configuration.

The Gyroscope Sensing Structure 914 can include a plurality of sensing structures to measure the rotation of a plurality of axes. The rotation measured in the Gyroscope Sensing Structure 914 can be analog output in the form of analog voltage and it can be converted into digital data through an A/D converter. Measured rotation from the Gyroscope Sensing Structure 914 can drift due to the temperature change and a characteristic of the material forming the sensing structure. The drift of sensing value can be compensated with the help of the temperature sensor 916. The Signal Conditioning 920 can include a signal processing filter required for signal processing to improve signal quality. The processor 932 can control the configuration of the signal processing filter. Rotation values measured can be stored in the Registers 923 through the Signal Conditioning 920. The rotation values stored in the Registers 923 can be recorded in the range of ±125, ±250, ±500, ±1000, ±2000 degrees/sec depending on the predefined configuration.

By implementing the FIFO 926 structure in the Sensor 910, the Host Processor 940 does not need to constantly monitor the sensor data, thereby reducing the current consumption of the electronic device. The host processor 940 can be a processing unit 210 of the electronic device 301 and a processing unit 401 of the electronic device 400. Data sensed by the sensor can be delivered to the Host Processor 940 through the Serial Interface 922. The Serial Interface 922 also allows the Host Processor 940 to set the sensor's control registers. The Serial interface 922 can include SPI, 12C, and the like. The Interrupt Controller 922 can configure an external interrupt pin connected to the Host Processor 940, interrupt latching and clearing method, and send an interrupt trigger signal to the host processor 940. An interrupt signal can be triggered when the sensor data is ready, or when the data is ready in the FIFO to be read by the host processor 940. In addition, when an additional sensor is connected through the external sensor interface 934 to reduce power consumption of the entire electronic device system, an interrupt can be triggered even when the host processor 940 reads data from an external predecessor. In order to reduce the power consumption of the electronic device, the Host Processor 940 can enter a sleep mode, and if the data is not prepared from the external sensor 960 connected to the sensor 910, the Host Processor 940 can remain in the sleep mode continuously. When the sensor data is ready, the sensor 910 can also act as a sensor core or sensor hub by waking the host processor through the sensor's interrupt and enabling the necessary data processing for the Host Processor 940.

Figure 10:
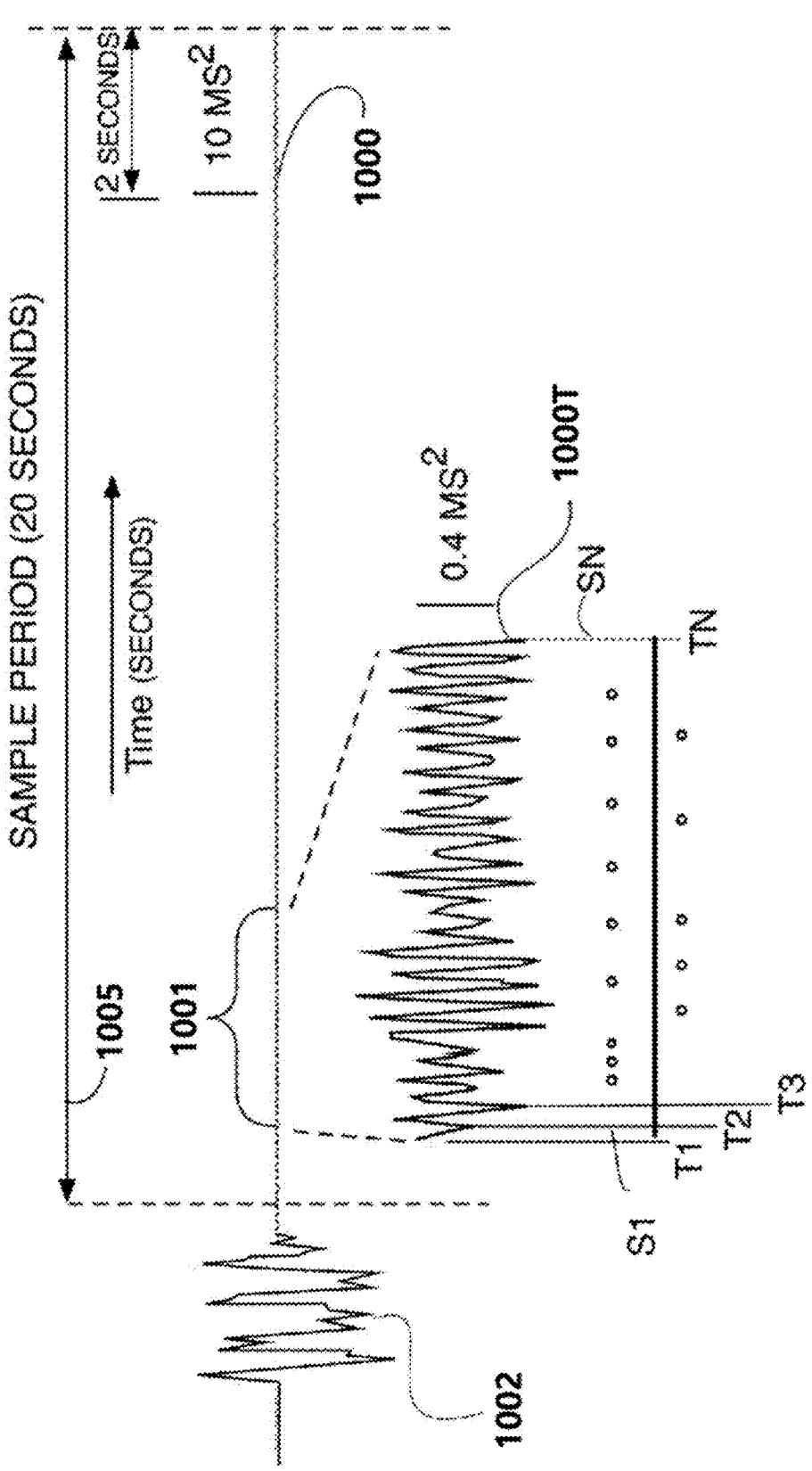
FIG. 10 is a waveform diagram of acceleration measured at a user's hand to show the difference between macro-motions and micro-motions.

Referring now to FIG. 10, a waveform diagram of acceleration measured at a user's hand is illustrated to show the difference between macro-motions and micro-motions. A hand acceleration waveform 1000 of a hand acceleration signal for a single axis (X, Y, or Z) is shown over time. A portion 1001 of the hand acceleration waveform 1000 is magnified as waveform 1000T as shown. While analog signal waveforms may be shown in the drawings, it is understood that analog signal waveforms can be sampled over time and represented by a sequence of digital numbers at discrete periodic timestamps (a "digital waveform"). While an accelerometer senses acceleration over time, if a sensor senses displacement over time instead, it can be converted into acceleration by twice differentiating the displacement signal with time.

The hand acceleration for each axis is sampled over a predetermined sample time period 1005, such as 5, 10, 20 or 30 second time spans for example. The sampling frequency is selected so that it is compatible with the filtering that follows. For example, the sampling frequency can be at 250 Hz (4 milliseconds between samples). Alternatively, the sampling frequency can be 330 Hz or 200 Hz, for example. The sampling can be performed on an analog signal by a sampling analog to digital converter to generate the samples S1-SN represented by a digital number over the time stamps T1-TN during the given predetermined sample time period. Assuming a 20 second sample time period and a sampling frequency of 250 Hz, a dataset for acceleration would include 3 (3 axes) times 5000 samples over the time period for a total of 15 k samples.

In some embodiments, since the intrinsic neuromuscular tone of the human can be observed mainly in the range of 3 Hz to 30 Hz, sampling frequency of the NP input data hander 702 can be, for example, 60 Hz, 200 Hz, 250 Hz, 330 Hz, 400 Hz and so on, which is more than twice the 30 Hz frequency. The collected data of the NP Input Data Handler 702 can further perform an operation of removing noise or improving signal quality to improve signal quality. The analog value sampled by the predefined sampling frequency can be converted into a digital signal through a quantization process in the A/D converter 918. In the quantization process, quantization can be performed according to a pre-defined bit rate. When performing quantization, linear quantization can be performed with a constant quantization width, and nonlinear quantization, which expands or compresses the quantization width according to a predefined value in a certain range, can be used to obtain a high-quality signal-to-noise ratio for an application.

Collecting A Movement Signal Data

Figure 11:
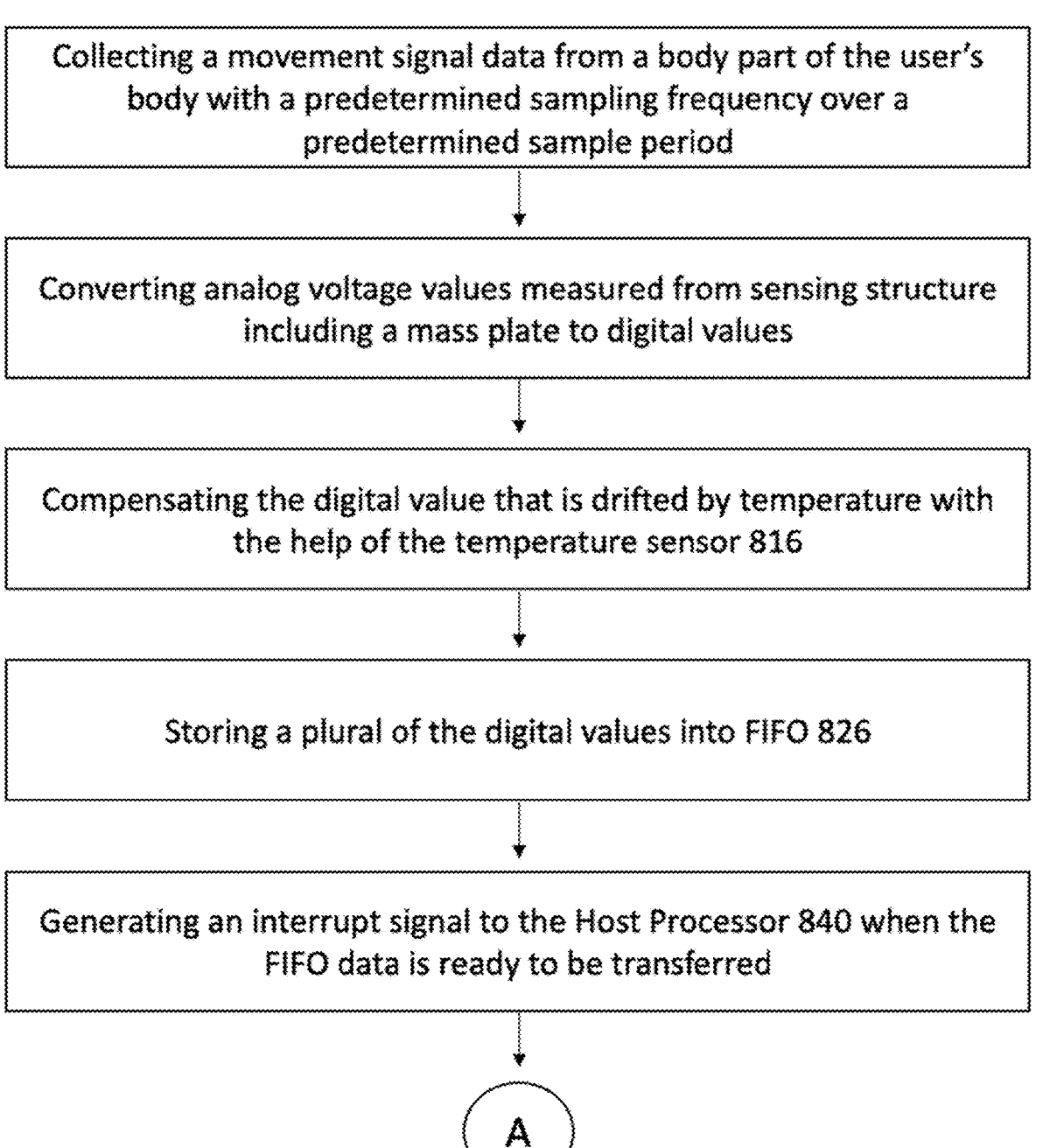
FIG. 11 is a flow chart of collecting a movement signal data.

FIG. 11 is an example of a flow chart of a method of collecting a movement signal data of NP Input Data Handler 702 on the electronic device 301 or the electronic device 400. With a sensing structure (including a mass plate), at step 1102, the electronic device can collect a movement signal data from a body part of the user's body with a predetermined sampling frequency over a predetermined sample period. The initial movement signal can be an analog signal. At step 1104, the electronic device can include one or more analog to digital converters that convert analog voltage values measured from sensing structure with the mass plate into digital values. For a more accurate measurement, at step 1106, the digital values can be compensated for temperature drift based on the information from the temperature sensor 916. With the steps being repeated, at step 1108, a plurality of digital values representing movement are stored into a FIFO memory device 926. After a plurality of data has been accumulated into the FIFO memory device, at step 1110, the electronic device generates an interrupt signal that is sent to the Host Processor 940, when the FIFO data in the FIFO memory device 926 is ready to be transferred out to the Host processor.

Sleep Mode Operation

FIG. 12 is an example of a flow chart of sleep mode operation of the Neuro-Print processing system 700 on the electronic device 301 or the electronic device 400.

In some embodiments, when the electronic device 400 is implemented as a portable device, the power consumption may become important issues. The electronic device 301, 400 can operate in a sleep mode. When the electronic device operates in the sleep mode, various methods can be applied such as shutting down the power of some components in the electronic device 301, 400, switching to the low power mode, lowering the frequency of the operation clock for the minimum power consumption and so on. The power consumption efficiency can be increased when the processing unit 401 enters the sleep mode. However, since the delay can occur in terms of the mutual response of the user and the electromagnetic in sleep mode, a coprocessor such as the sensor core 426 can be included inside the processing unit or in the electronic device. Even when the processing unit 401 enters the sleep mode, the sensor core 426 can continuously observe the signal detection from the sensors 470. When it is determined, by the sensor core 426, that processing of the processing unit 401 is required, the sensor core 426 can generate interrupt signal to the processing unit 401 and the processing unit 401 gets out of the sleep mode. At this time, the power can be supplied again to some of the components that were into sleep mode and the processing unit 401 exits from the low power mode and changes the frequency of the operation clock to be operated at the fast clock in order to wake up from the sleep mode.

Secure Mode Operation

FIG. 13 is an example of a flow chart of secure mode operation of Neuro-Print processing system 700 on the electronic device 301 or the electronic device 400. Identification, authentication, liveliness, encryption, or a function using them associated with Neuro-Print can be considered an operation requiring security. In this case, the operation of handling data collection from the sensor can be operated by switching the first core 404 in the processor unit 401 to the secure mode 408.

A processor unit can be initially operating in a monitor mode. In step 1301, an interrupt signal can be generated by a sensor or the sensor core 426. In step 1302, the interrupt signal is transmitted by the sensor or the sensor core 426 via a bus or an interrupt line to switch the first core 404 from the monitor mode 413 into the secure mode 408. In step 1303, a determination is made if the processing unit needs to enter the secure mode. No need to enter the secure mode if the interrupt is false or for a different purpose. After validation, the processing core enters the sure mode in step 1304. When the execution mode of the first core 404 is switched to the secure mode, the execution environment for security runs isolated from the normal execution environment. The execution environment is a secure execution environment in the secure mode. The core entering the secure mode 408 can access or control the system resources of the electronic device accessible only to the secure operating system in the secure execution environment. In step 1305, system resources are accessed by the electronic device that are only accessible to the secure operating system in the secure execution environment.

In some embodiments, the NP Input Data Handler 702 shown in FIG. 7 can identify data collection mode or data acquisition mode from user behavior. The data acquisition mode can include a data acquisition mode for learning and a data acquisition mode for inference. The data acquisition mode for learning is to better train the NP for the electronic device to the authorized user. In the data acquisition mode for inference, the NP of the electronic device is to be used to authenticate the user to a function of the electronic device. The data acquisition for training can be performed simultaneously when the NP input data handler in the electronic device is being used with the function in the data acquisition mode for inference. The data acquisition for training mode is to improve the performance of the previously trained model. When collecting data, a UI-related component can be displayed on the electronic device screen to collect data in a sitting posture, a standing posture, a walking posture, or the like. In addition, the UI-related components can be displayed so that the user can input by distinguishing the activity state such as whether the user is running, riding a bicycle, or riding in a car. In another embodiment, the collected data can be analyzed to determine a posture or an activity state of the user to process the corresponding information.

In performing identification, authentication, liveliness, encryption or a function associated with a Neuro-Print, the electronic device 301, 400 can assign such function to a cluster of high-performance processor cores. For example, if the first cluster 403 is a cluster of high-performance cores, the first cluster 403 can be assigned to perform the function associated with a neuro-print.

NP Feature Extractor

Figure 14:
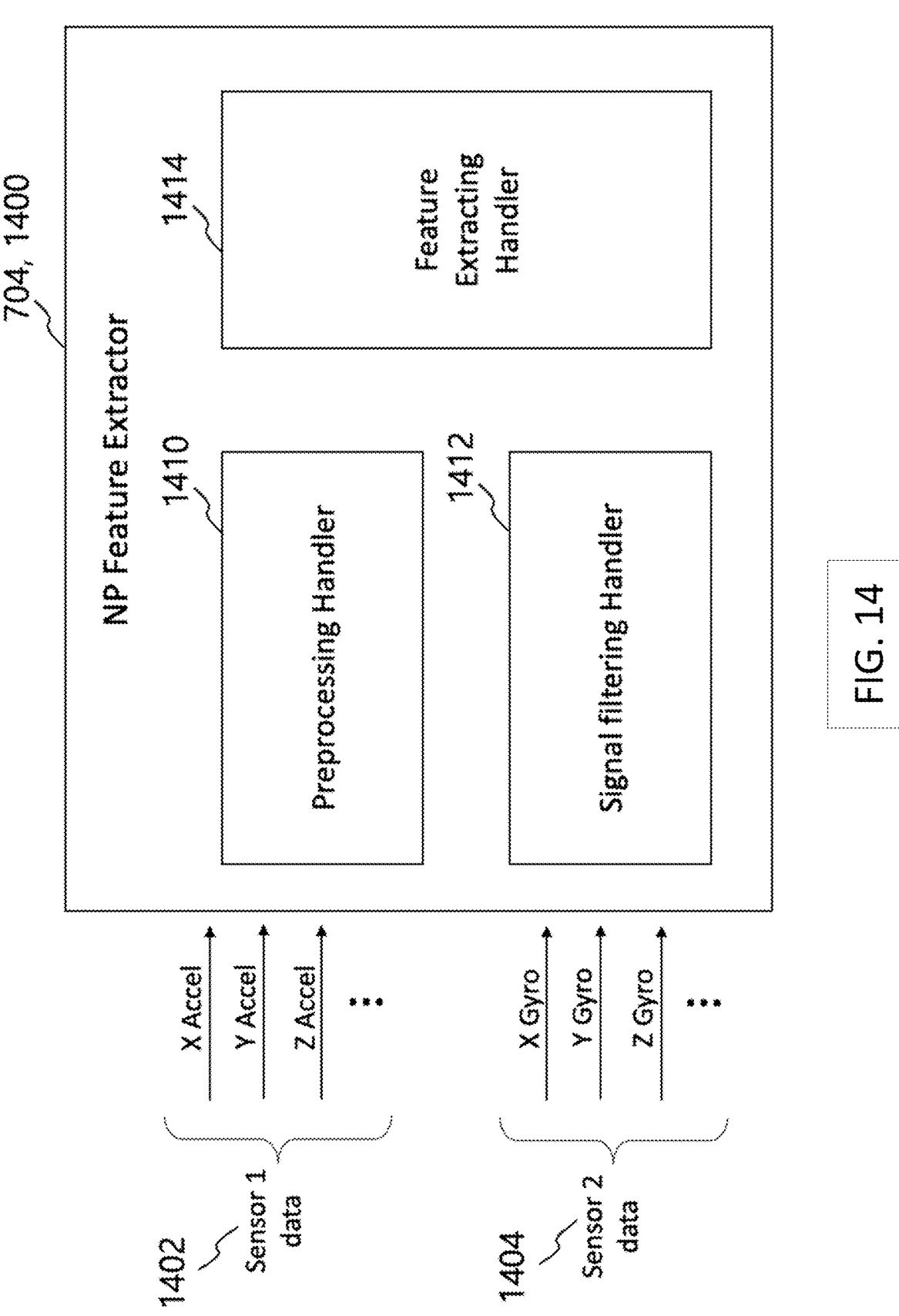
FIG. 14 is a block diagram of the NP feature extractor.

FIG. 14 shows a block diagram of an NP Feature Extractor 1400. The NP Feature Extractor 1400 can include a Preprocessing Handler 1410, a Signal Filtering Handler 1412 and a Feature Extracting Handler 1414.

In some embodiments, the NP Feature Extractor 704 can be configured as the NP Feature Extractor 1400 of FIG. 14. The NP Feature Extractor 704, 1400 can get numerical data such as the first sensor data 1402 and the second sensor data 1404 from the NP Input Data Handler 702. If the input data is received from the acceleration sensor or the gyroscope sensor, the numerical data can be collected as shown in FIG. 15. FIG. 15 is an example of various types of sensor data and format can be used herein.

Sensor Data Types And Format

The multidimensional sensor data can be referred to as raw data. Signal processing such as preprocessing, filtering, etc. can be performed on the raw data to achieve optimal performance in the next step.

Preprocessing Operation of NP Feature Extractor

FIG. 16 is an example of a flow chart of preprocessing operation of the NP Feature Extractor 704, 1400 on the electronic device 301 or the electronic device 400.

In some embodiments, methods for performing preprocessing can be determined according to the use of the collected signal. For example, the collected signals can be used for authentication, posture estimation, and activity information estimation. The preprocessing method can be processed differently depending on the usage and partially overlapped. The preprocessing handler 1010, can check and detect various unacceptable input data conditions. It can process unacceptable input data conditions as an error, or determine the quality of the input data. The unacceptable input data conditions and possible cause of error are as follows:

sensor errors (such as spiked, saturated, or flat input data signal);

user errors (such as from shaking, or squeezing phone); and static data (or D.C. signal data that does not contain a dynamic range of "human" signal).

An input state machine operation can be performed according to the quality of the input data. Initially, at step 1601, digital sensor data is received from one or more sensors through the sensor core of the sensors in the electronic device.

When it is determined that the quality of the input data is very low, an operation of collecting the input data can be performed again, or a user interface can be generated that requires a user to perform an additional operation in order to collect more input data. In the pre-processing process, in the signal obtained from the motion sensor for about 1 to 2 seconds at the beginning of the signal acquisition can include a large amount of the signal of the macro motion of the user and can be affected a lot by the shaking of the electronic device. Accordingly, at step 1602, the signal can be discarded at the beginning of the signal acquisition and/or at a certain interval immediately before the acquisition is completed (e.g., the last part of the signal acquisition time).

In some embodiments, at step 1604, the Preprocessing Handler 1410 can perform a resampling procedure or interpolation of the input data. The resampling function can uniform or nonuniform data to new fixed rate data. The input data derived from sensors that are sampled at a high level of hardware abstraction and are subject to many variations depends on hardware components manufactured by a certain company or sampling configuration on the sensor component. As a result, input data from sensors written in the raw data format can be non-uniformly sampled. Input data can be corrected by a resampling procedure of the Preprocessing Handler 1410 to a new uniform rate before further analysis. The resample procedure can correct the small deviations in non-uniform samples through linear or cubic interpolation and provides a constant time between samples. For example, the resample procedure can use a cubic 'spline' to correct deviations in the sampling rate. As part of the resampling procedure, the Preprocessing Handler 1410 can also extract micro-motion data that is associated with the neuro muscular tone of a user's body.

An example of software pseudo code for the resampling procedure can be written as follows:

```
[Ax, T] = resample( Axyz(:, 1), time, 'spline');
[Ay, T] = resample( Axyz(:, 2), time, 'spline');
[Az, T] = resample( Axyz(:, 3), time, 'spline');.
```

In some embodiments, at step 1603 prior to the resampling/extraction step 1604, the Signal Filtering Handler 1412 performs filter processing on the input data to suppress undesirable signal components. The following are some forms of filter processing that can be performed:

Variety of band-pass filters to band pass desired ranges of frequencies;

Reduce gravitational effects and behavioral effects in very low frequencies; and/or Focus on a wide range of information in harmonics of a signal.

The Signal Filtering Handler 1412 can perform filtering to remove unnecessary signals from the micro motion data extracted from the collected signal. Unnecessary signals can include, for example, noise, macro motion signals, distortion due to gravity, and the like. Since the power noise can be often generated in the collected signal when the electronic device is being charged, the signal can be filtered in consideration of characteristics due to power noise. The frequency of neuromuscular micromotions, derived from nerves or due to the inherent neuromuscular anatomy of a human based nerve, can be observed mainly in the range of 3 Hz to 30 Hz. A signal in the range of 3 Hz to 30 Hz or 4 Hz to 30 Hz from the collected input motion data can be extracted by using a signal processing algorithm. Depending on the characteristics of the unwanted signal to be removed, it is possible to change the cutoff frequency of the bandpass filter of the signal processing algorithm. For example, in one embodiment, a signal in a range of 4 Hz to 30 Hz can be extracted, and in another embodiment, a signal in a range of 8 Hz to 30 Hz can be extracted. In another embodiment, signals in the range of 4 Hz to 12 Hz or 8 Hz to 12 Hz can be extracted.

The Signal Filtering Handler 1412 can use a signal processor that performs signal processing to analyze input data, classifies/identifies input data as small signals and large signals, and separate out the large signal amplitudes from the small signal amplitudes of the micro-motions. Signal Filtering Handler 1412 can also suppress/filter macro motion (large movements of the user's body, large movements of the arm or walking, running, jogging, hand gestures, etc.) from the collected input data. The example analysis can be of the form described in "Time Series Classification Using Gaussian Mixture Models of Reconstructed Phase Spaces" by Richard J. Povinelli et al., IEEE Transactions on Knowledge and Data Engineering, Vol. 16, No. 6, June 2004. Alternatively, a separation of the large signals due to voluntary motion can be made by using a BMFLC-Kalman filter as is described in "Estimation of Physiological Tremor from Accelerometers for Real-Time Applications" by Kalyana C. Veluvolu et al., Sensors 2011, vol. 11, pages 3020-3036.

Three-Dimensional Poincare' Phase Plot Diagrams for Different Users

Figure 17:
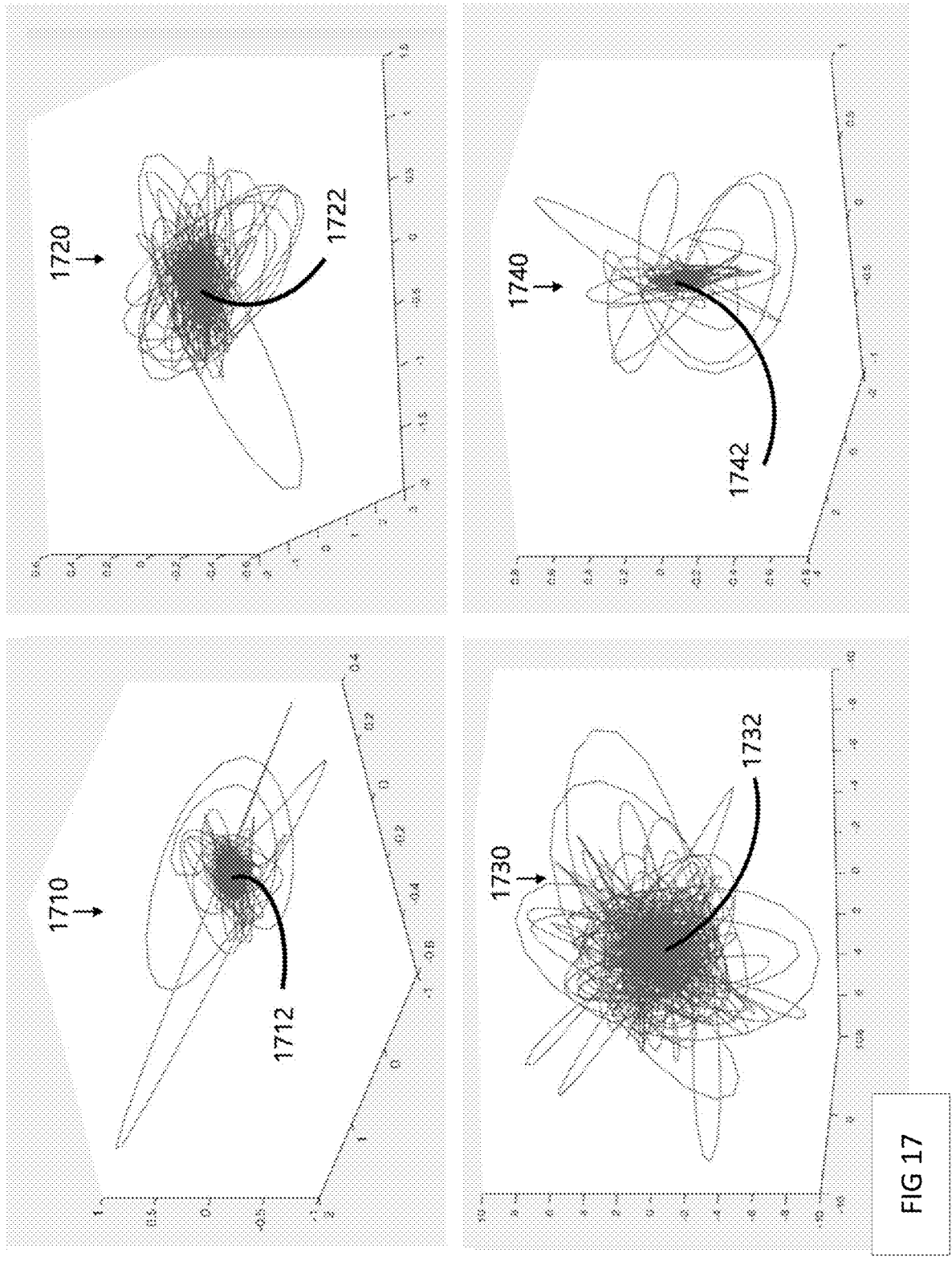
FIG. 17 are three-dimensional Poincare' phase plot diagrams for four different users.

In some embodiments, the Feature Extraction Handler 1414 can extract unique characteristics from the extracted neuromuscular micro motion data. FIG. 17 shows examples of three-dimensional Poincare' phase plot diagrams for four different users based on the extracted neuromuscular micro motion data generated and processed by the Preprocessing Handler 1410 and the Signal Filtering Hander 1412. As can be readily seen in FIG. 17, the patterns 1710, 1720, 1730, 1740 in each of the Poincare' phase plot diagrams generated from the neuro-derived motion of the users are substantially different. For example, a center of mass 1712, 1722, 1732, 1742 of each pattern 1710, 1720, 1730, 1740 differs. Other characteristics of each pattern 1710, 1720, 1730, 1740 also differ for each user. Thus, the pattern of neuro-derived motion is unique to each user and can be used to uniquely identify a user. The unique patterns 1710, 1720, 1730, 1740 in the generated Poincare phase plots are normally stable. Thus, normally they can be repeatedly sensed over sample periods of time each time a user touches or moves the sensor and then compared with an initial manipulated data using an algorithm to authenticate the identity of a user. To be able to do this, it is necessary to extract user-specific characteristics from the micro-motion data into a type of numerical data, statistical data or in the form of signal data in signal processing. These data also can be represented in the form of data structures such as vectors, matrix or multi-dimensional arrays and be referred to as feature vectors, feature matrix, or feature data. Extracting a feature vector here can be referred to as a feature extraction operation. In some cases, a number of kinds of feature vectors for neuro fingerprint can be several hundred kinds of feature vectors, for example, three hundred feature vectors.

In some embodiments, the scale of the signal data or the extracted feature data can differ according to the type and structure of the electronic device, the variation of the sensor component, the sampling frequency of the signal, the contact type between the user and the electronic device, and the like. For example, the signal data or the first feature data can be measured on a scale of 1 to 10, and the second feature data can be measured on a scale of 1 to 1000. In this case, standardization can be performed on the signal data or the feature data. In other words, the signal data or the feature data can be made into normal distribution by centering the data such that the standard deviation is one and the average is zero. A simple mathematical expression for standardization is as follows:

$$X_{standard}^{(i)} = \frac{X^{(i)} - \mu_X}{\sigma_X}$$

where $\mu_x$: the sample mean of a particular feature data, $\sigma_x$: the standard deviation.

In some embodiments, normalization can be performed instead of standardization as needed for processing components of the NP Feature Analyzer, and both normalization and standardization can be used. In addition, normalization or standardization can be performed on the sensor data, can be performed on the feature data, or can be performed on all or part of the sensor data or the feature data. The normalization or standardization process can be skipped depending on the characteristics of the sensor data or the feature data.

In some embodiments, it might be necessary to reduce the number of large numbers of data to improve the overall performance of the system. The initial step can include a step of subtracting each data value from the mean of measured data so that its empirical mean is zero and each variance of data is equal to one. After this initial step, based on the correlation between data, the direction of maximal variance in high-dimensional data can be found and the number of data can be reduced by projecting them into new subspaces with the same or smaller dimensions than the original. A simple procedure can be to standardize on n-dimensional data, create a covariance matrix, decompose it into eigenvectors and eigenvalues, and select the eigenvector that corresponds to the largest eigenvalue to produce a projection matrix. After creating the projection matrix, in order to reduce the dimension of the n-dimensional data, a transformation through the projection matrix can be performed to the signal data or the feature data. These above processes can convert a set of the extracted micro motion data associated with neuro muscular tones to a set of data having linearly uncorrelated characteristics.

In order to extract the hidden patterns in each user's micro-motion into measurable numerical data on computer technology, they can be processed through appropriate signal processing analysis or mathematical method. For example, through CEPSTRUM analysis, the pattern and frequency interval of repeated cycles can be expressed as numerical data.

Plots of CEPSTRUM Analysis for Different Users.

In FIG. 18, it shows the results of the CEPSTRUM analysis of different users. It can be seen that the values between CEPSTRUM AMPLITUDE peaks values (P1, P2, P3, P4, P5) extracted from User 1 1810 and CEPSTRUM AMPLITUDE peaks values 1820 (P1, P2, P3, P4, P5) extracted from User 2 1820 are different and distinct between users. In addition, the intervals between the five frequencies' (F1, F2, F3, F4, F5) values extracted from the user 1 1810 and the five frequencies (F1, F2, F3, F4, F5) extracted from the user 2 1820 are also different from each other. Since the values of amplitude and intervals of them are different from each other, these values can show unique characteristics for each user, and these results can be used as unique feature data for each user.

Feature Extracting Operations

FIG. 19 is a flow chart of an example feature extracting operation of the NP Feature Extractor 704 in the electronic device 400 or the electronic device 301. At step 1901, the NP feature extractor 704, processes a set of the extracted micro motion data associated with neuro muscular tone as a set of data having linearly uncorrelated characteristics. At step 1902, the NP feature extractor 704, can perform multiple processing procedures that can generate data sets of mathematical representation regarding neuro muscular tone for the user based, on laboratory experimental results. At step 1903, the NP feature extractor can construct a feature vector table containing multiple sets of feature vectors based on the data sets generated by the multiple processing procedures. At step 1904, the NP feature extractor can divide up the feature vector sets into and select a point of interest (POI) feature vector, a validation feature vector, and a test feature vector.

In some embodiments, the following values of output data can be obtained with some processing from the preprocessed output data and used as feature vectors. In some embodiments, the following values of output data can be directly used, partially modified, or used in some combination as feature vectors:

Mathematical max, min, median, difference values

Statistical mean, variance, standard variance, energy, entropy

Correlation, zero-crossing rate

DC component, spectral peak, spectral centroid, spectral bands, spectral energy, spectral entropy in frequency domain analysis Wavelet coefficients of wavelet transformation Multiple types of features to focus extract physiologically relevant information Hurst, entropy, Lyapunov divergence with a reduction of sampling for efficiency, Hjorth, Barlow.

Features above commonly used in ECG and EEG analysis, and/or

Combinatorial impact of filters with features.

In some embodiments, micro-motion data can be collected from various people and analyzed in a laboratory. By collecting and analyzing data from various sources such as age, gender, region, body physique and etc., features can be selected with a low correlation between features.

Feature Vector Sets

FIG. 20 shows an example of a feature vector set according to some embodiments. The features can also be selected in the laboratory, based on an analysis of the various types of motion classification characteristics shown in FIG. 2. The feature vector set can be configured differently according to the usage of the collected signal. For example, a set of features used for authentication and a set of features for posture estimation or activity information estimation can partially overlap but can be configured differently.

NP Analyzer

Figure 21:
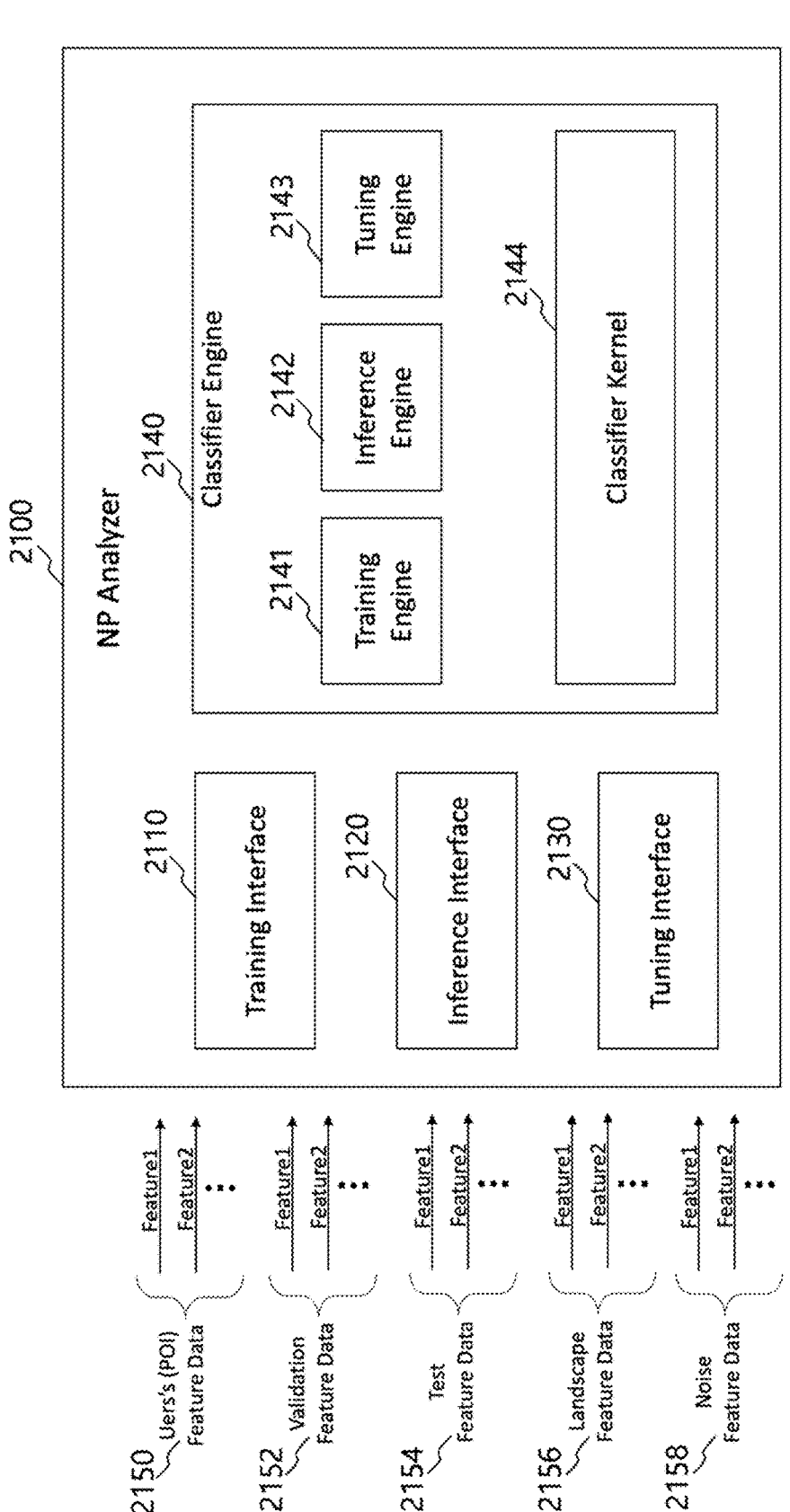
FIG. 21 is a block diagram of the NP analyzer.

FIG. 21 is a block diagram of an NP Analyzer 2100 according to one embodiment, such as that of NP Analyzer 706 shown in FIG. 7. The NP Analyzer 2100 can include a Classifier Engine 2140, a Training Interface 2110, an Inference Interface 2120, and a Tuning Interface 2130. The Classifier Engine 2140 can include a Training Engine 2141, an Inference Engine 2142, a Tuning engine 2143, and a Classifier Kernel 2144.

Training Mode Operation

Figure 22:
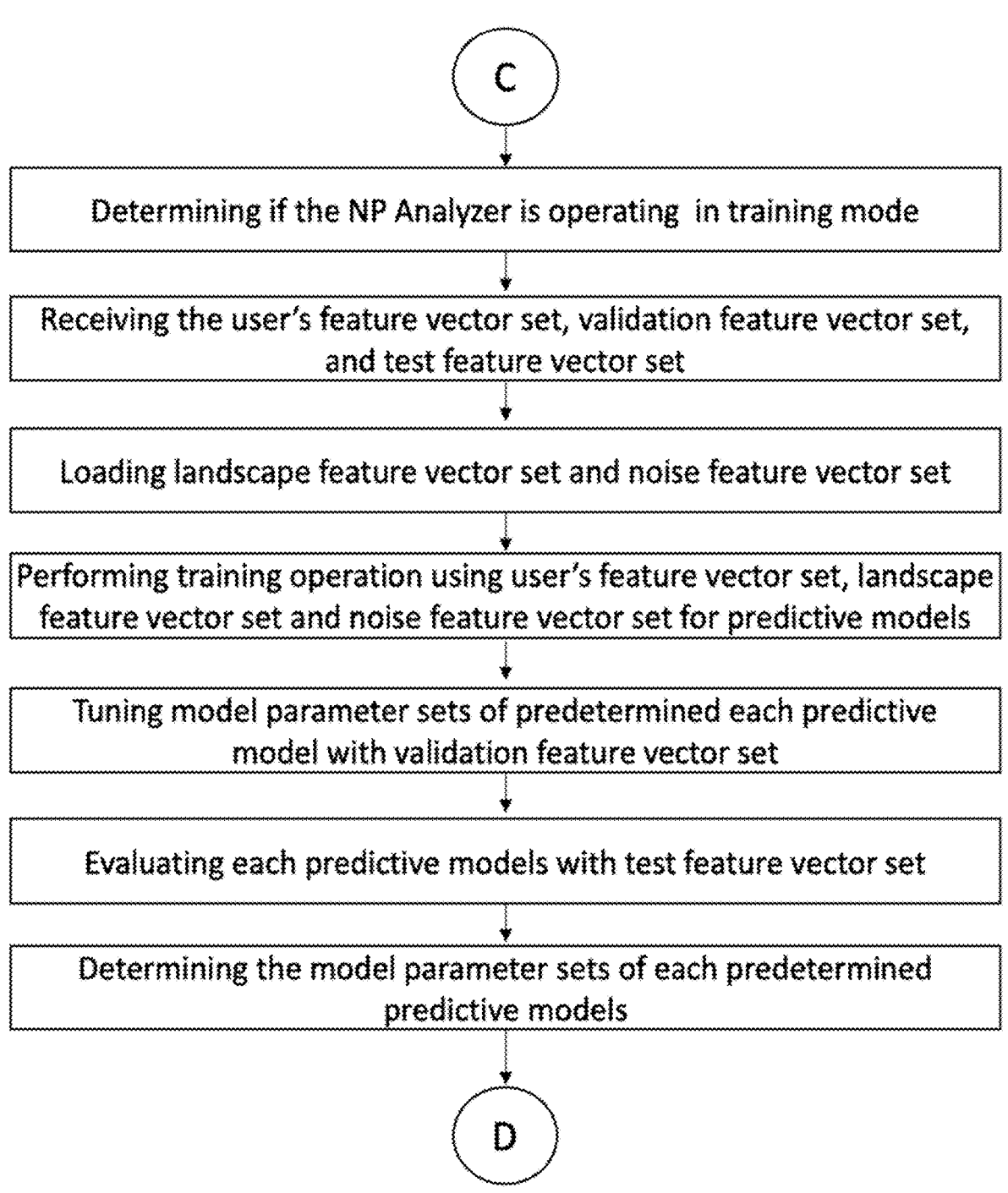
FIG. 22 is a flow chart of a training mode operation.

FIG. 22 is an example of a flow chart of training mode operation of the NP Analyzer 705, 2100 on the electronic device 301 or the electronic device 400. The NP Analyzer 2100 can be operated in training mode for authorized users when setting up an electronic device and periodically thereafter. At step 2201, a determination is made if the NP analyzer is operating in the training mode in contrast to an operational (inference) mode. At step 2202, when operating in the training mode, the feature data (user's feature vector set) 2150 of the authorized user extracted by the NP Feature Extractors 704, 1400 can be collected (received). The collected feature data can be transferred to the Training Engine 2141 of the Classifier Engine 2140 through to the Training Interface 2101 for processing. The validation feature vector set and the test feature vector set can be received. At step 2203, the landscape feature vector set and the noise feature vector set can be loaded. At step 2204, the user's feature data 2150 can be processed by various data processing algorithms or machine learning algorithms through cooperative operations of the Training Engine 2141 and the Classifier Kernel 2144 to determine the parameters of the predictive model.

Optionally, the user's feature vector set, the landscape feature vector set and the noise feature vector set can be used in the performance of the training operation to determine parameters for predictive models. The Noise Feature Data (noise feature vector set) 2158 can be a type of feature data that is generated through a noise collection process. For example, the Noise Feature Data 2158 can be extracted from a signal collected in an environment in which a large number of components other than micromotion associated with neuro muscular tone such as the existence of large movements or large vibrations around the electronic device. The Landscape Feature Data (landscape feature vector set) 2158 can be a feature data collected from various people and feature extraction performed in a laboratory. Extracted landscape feature data can be stored in the storage of the electronic device in some sets and used to improve the performance of the model.

In order to increase the accuracy or performance of the predictive model, the extracted feature data can be divided and processed into User's Feature Data (user's feature vector set) 2150, Verification Feature Data (validation feature vector set) 2152 and Test Feature Data (test feature vector set) 2154. As mentioned previously, at step 2204, the User's Feature Data 2150 can be used for training to determine the parameters of the predictive model.

At step 2205, the Validation Feature Data 2152 can be used to improve (tune) the model's performance or accuracy during training mode prior to evaluating the predicted model to select an optimal model. That is, the model parameter sets of each predictive model are tuned with the Validation Feature Data (validation feature vector set) 2152. For example, at step 2205, the Validation Feature Data (validation feature vector set) 2152 can be used to tune the learning rate or perform validation while evaluating the performance of the model during the training mode.

At step 2206, the Test Feature Data (test feature vector set) 2154 can be used to evaluate the final model instead of being used to select the model. Each predictive model is evaluated using the test feature vector set. If a predictive model is evaluated to be poor, one or more prior steps may be repeated. If all the predictive models are evaluated to be good or acceptable, at step 2207, the model parameter sets of each predetermined predictive model can be determined.

Inference Mode Operation

Figure 23:
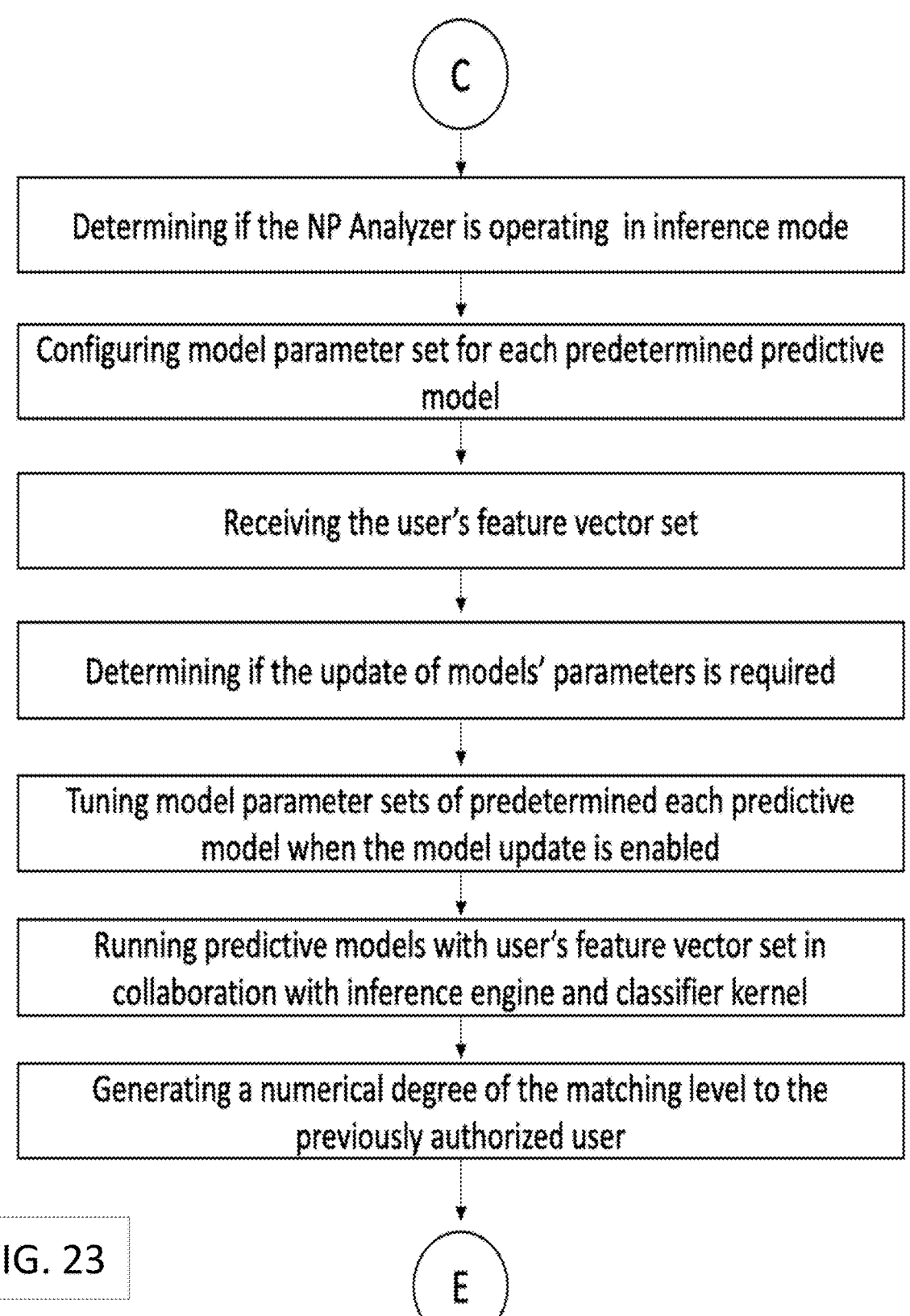
FIG. 23 is a flow chart of inference mode operation.

FIG. 23 is an example of a flow chart of inference mode operation of the NP Analyzer 705, 2100 on the electronic device 301 or the electronic device 400.

The NP Analyzer 706, 2100 can be operated in an inference (operational) mode instead of the training (learning) mode. As discussed with referenced to FIG. 22, the electronic device 301, 400 can be operated in the training mode before the electronic device 301, 400 operates in the inference mode so that parameters for the model for the feature data set of the authorized user are already acquired. At step 2301, a determination is made whether the NP analyzer is in the inference (operational) mode. If not already, at step 2302, the model parameter set can be configured for each predetermined predictive model. At step 2303, the user's feature vector set is received by the NP Analyzer 706, 2100. At step 2304, a determination is made if updates to the parameters of the predictive model (model update) are required. If at step 2304 that it is determined that a model update is required or enabled, at step 2305, the parameters of each predetermined predictive model can be tuned.

At step 2306, when the information (parameters) for each predictive model has been generated and/or tuned, the Inference Engine 2142 of the Classifier 2140 can be operated in an inference (operational) mode. The Inference Engine 2142 of the Classifier 2140 operates in collaboration with the Classifier Kernel 2144 through the Inference Interface 2120 with the user's new feature data 2150. At step 2307, the Classifier Kernel 2144, based on the previously generated predictive model, can perform an operation on the newly extracted feature data to generate a numerical degree (e.g., probability percentage) of matching level to the previously authorized user.

In some embodiments, a multi-iteration training (MIT) can be used in the training mode of the model. Multi-iteration training came about to solve the problem of assuring protection for the user against any other person. The electronic device 301, 400 can collect data from the user (referred to as positive observations), this satisfies the positive part of the requirements of a training set, a set of negative observations is also needed. The set of negative observations (referred to as the landscape) is considerably large (for example, over 27,000), if a model were created using the entire landscape then it could be biased towards rejection and be unusable. MIT can solve this problem through a process of failure selection that creates a custom set of negative observations that is unique to each user.

Figure 24:
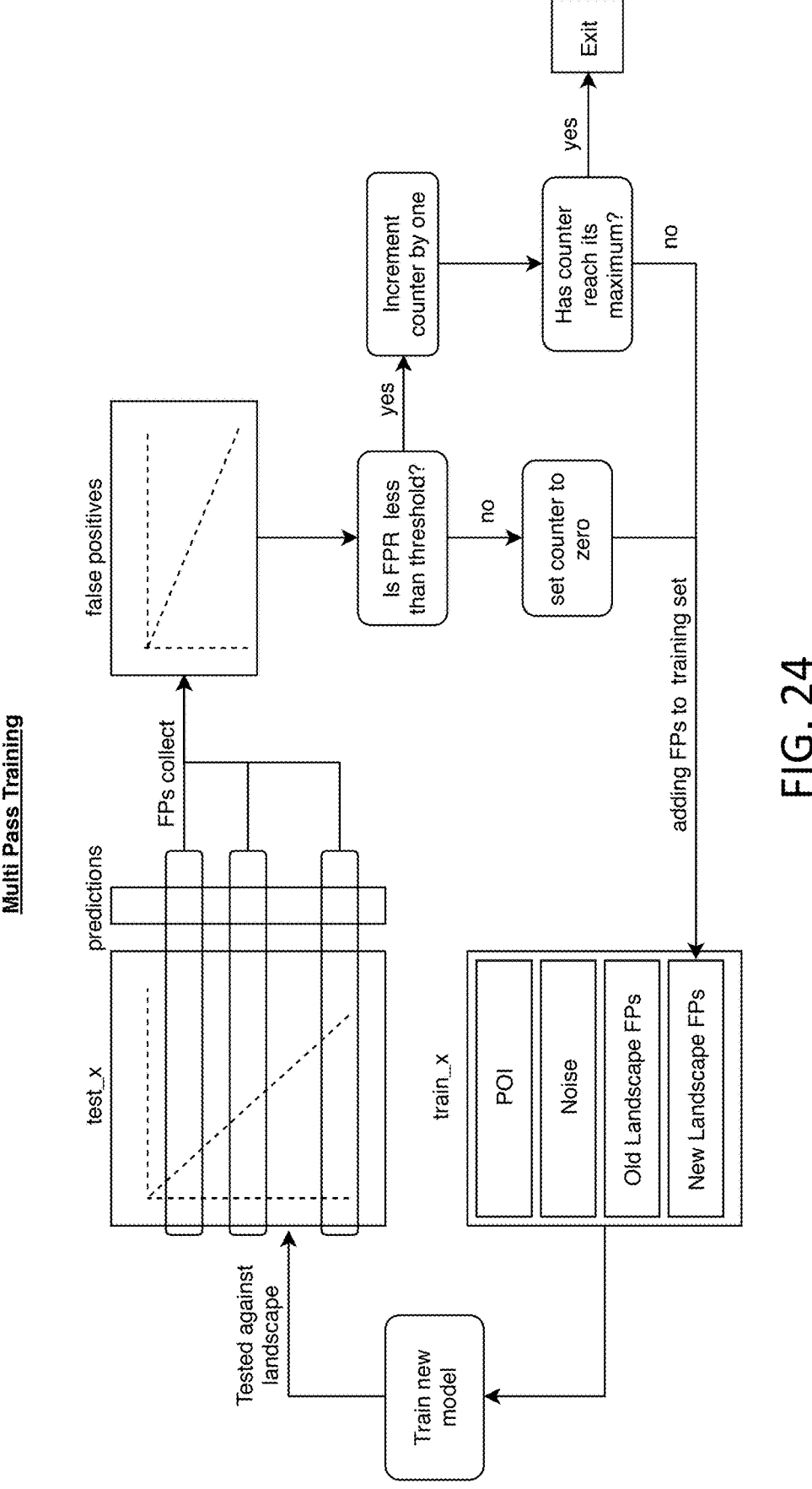
FIG. 24 is flow chart of multi pass training operations for a model.
Figure 25:
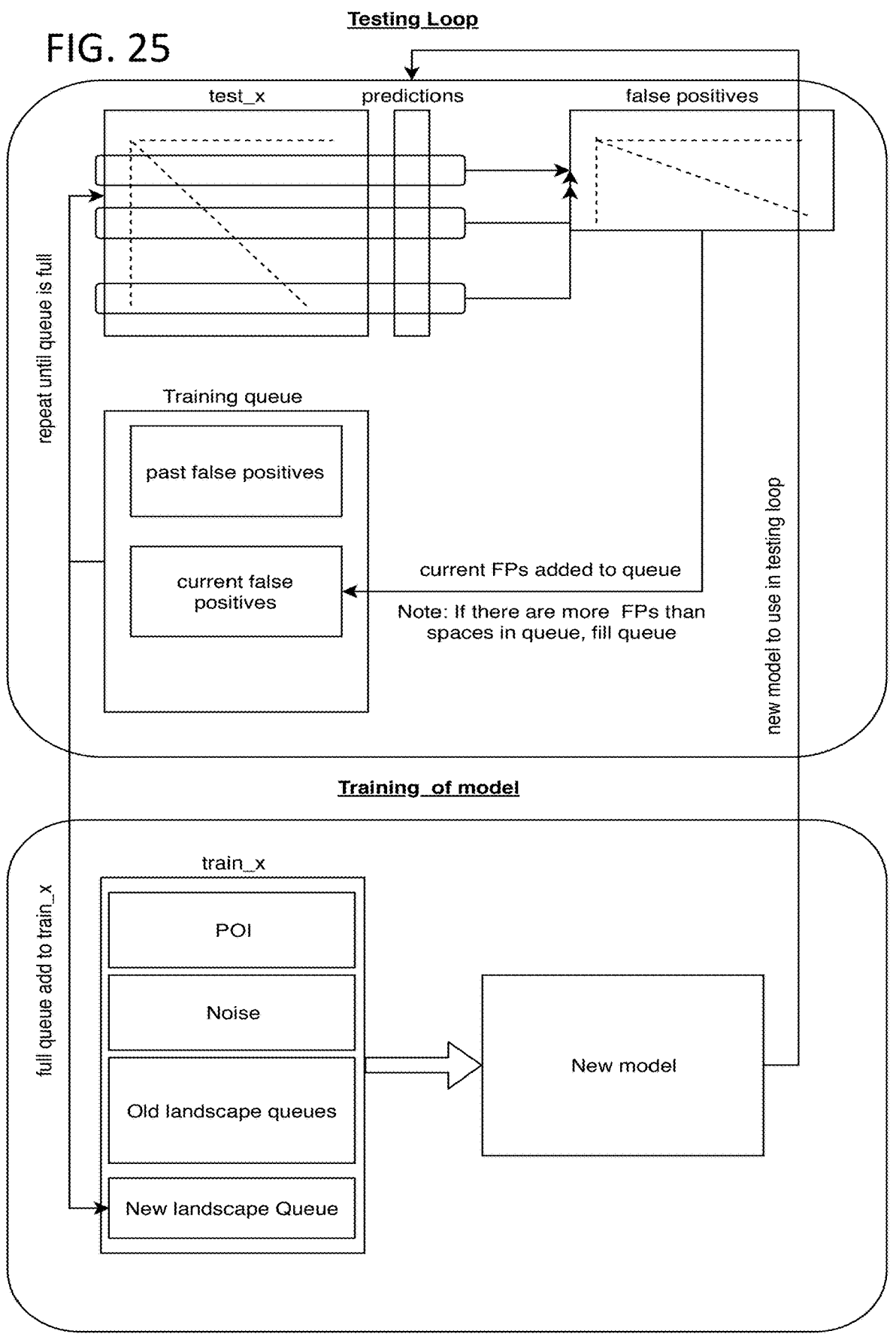
FIG. 25 is a flow chart of a multi queue training operation for a model.

Two methods of MIT can be developed, referred to herein as Multi Pass Training (MPT), an example shown by FIG. 24, and Multi Queue Training (MQT), an example shown by FIG. 25. The algorithm for both methods has the same starting point of training an initial model comprised of positive observations from the user and negative observations from a noise source. Both methods work on the concept that a successful selection of training observations can be achieved through an iterative process of creating a candidate model, testing the candidate against a selection of the landscape and adding the false positive observations into the training set and retraining. MPT solves this problem through a naive approach of a loop of training and testing. MQT can approach the problem in a far more efficient method (reduction of computational time by about six times-one-sixth the computational time). A queue of false positives is filled through repeated exposure of the candidate model to views from the landscape.

Multi Pass Training operation

FIG. 24 is an example of Multi Pass Training (MPT) operation of the Neuro-Print processing system 700 on the electronic device 301 or the electronic device 400 according to some embodiments. At step 2410 of the MPT method, a new model is to be trained. At step 2402 of the MPT method, a randomly selected test set (test_x) is selected from the landscape for testing the model. Compared against the predictions 2403, the false positives are noted and collected together at step 2404. At step 2405, the false positives can be organized together over time to determine a false positive rate (FPR).

At step 2408, the false positive rate is compared against a threshold value (e.g., FPR maximum). If the false positive rate (FPR) is below the threshold (e.g., FPR maximum), then the process goes to step 2410 and a counter is incremented. The counter may count up to a maximum count value or count down from the maximum count value. Assuming counting up, a comparison is made with the maximum count of the counter at step 2412. At step 2412, if the counter hits its maximum (yes), then the process goes to step 2499 and stops. In this case, the MPT training of the model is finished. At step 2412, if the counter has not reached its maximum count, then at step 2416 the false positives are added to the old landscape generating a new landscape of false positives for a new training set train_x 2420. The MPT of the model continues.

At step 2408, if the FPR is greater than or equal to the threshold (e.g., FPR maximum), then the count in the counter is set to zero. The false positive rate is too great for the present model and the number of passes is reset. The process continues to step 2416, the false positives are added to the old landscape generating a new landscape of false positives for a new training set train_x 2420. A new model is to be trained up with the new training set. The MPT training process repeats to train the model until reaching the exit 2499.

While MPT can produce viable models, it does have some drawbacks. Every time a negative set from the landscape is seen, a new model is trained. The observed FPR in a single iteration can be thought of as a random decreasing variable, the subsystem of the counter helps protect against getting lucky and finding a low FPR set. This comes with a tradeoff. In order to exit the MPT process, several iterations under the FPR maximum should occur.

Multi Queue Training Operation

FIG. 25 is an example of Multi Queue Training (MQT) operation of the Neuro-Print processing system 700 (and its model 2500) in the electronic device 301 or in the electronic device 400 according to some embodiments.

In most traditional algorithms of models, one important part is to adequately collect a bunch of training data in order to improve system performance. However, in the case of a learning mechanism held by young children as humans, the learning process itself for them is actually performed through making many mistakes. When this concept is applied to the learning system by imitating that of humans, it can be possible to improve the learning process by updating the system configuration when mistakes or errors are made by the system. It can be said that this approach has not yet been tried in the technical field. The concept of 'learning by mistake' is one of the motivations behind the MQT method.

The MQT method differs from MPT in its structure. MQT consists of a testing loop 2501 inside of a training loop 2520. Importantly, the MQT uses one or more training queues 2515 and one or more landscape sets (queues) as part of the training set 2522. A queue 2515P of past false positives may be kept and a queue 2515C of current false positives may be kept. A history of landscape sets (queues) 2522P and the current or new landscape set (queue) 2522N can be used as part of the training set 2522.

Initially, a new candidate model 2500 is shown a series of randomly selected sets from the landscape as a first training set 2522 as a test 2506. The predictions 2503 of the model 2500 are added to the test loop. The false positives 2504 are noted and a false positive rate 2511 is determined. At step 2513, the current false positives are added to the current false positive queue 2515C. Past false positives, if any, are saved into the past false positive queue 2525P. At step 2509, the test loop is repeated with another random selected set from the landscape set as a test set.

The past false positive queue 2525P gets filled up over several test loop iterations of several test sets 2506 from the landscape of possible test sets. At step 2521, once the queue 2515P is filled with false positives, it is added to the training set 2522, a new model 2500 is trained with the training set 2522 at step 2523, and the MQT testing process 2501 repeats.

The MQT testing process 2501 is repeated over and over again with the new model and its parameters. The MQT training process exits when the average of the false positive rate (FPR) 2511 of the landscape testing sets reaches a threshold (e.g., FPR maximum).

MQT offers advantages over MPT. MQT is computationally more efficient compared to MPT. Training of the model is the most computationally expensive part of both processes. The MQT algorithm only trains a new model once the past false positive queue 2515P is filled. Only if a model is slow in the prediction phase, is MQT's execution time greater than that of MPT.

MQT offers a more precise setting for determining an FPR rate of a model. With MQT, the FPR is calculated as an average over the testing of the model over many different random testing sets. MQT does not use consecutive testing sets as is used in MPT to determine the FPR. Accordingly, MQT methods offer the ability to create a model that is robust in the rejection of the landscape of attacker data trying to break into encrypted data.

Both MQT and MPT methods use a selection of training set based on the failure of the current model. However, the failure selection process can be thought of as a Darwinian process where the model evolves to find a minimal defensive collection of observations from the landscape. MQT offers increased speed and precision compared to MPT, even though both methods consider the false positive rate when iterating models.

NP Application Framework

In some embodiments, the NP Application Framework 708 of the Neuro-Print processing system 700, shown in FIG. 7, can be provided to enable various applications using the output of the NP Analyzer 706. In FIG. 32B, the NP Application Framework 3200 can include an output state machine 3204 for user authentication, an encryption/decryption function, an obfuscation/runtime security (key-on-the-fly) function, a non-interactive zero-knowledge protocol (NIZK) and the like. Serially coupled in communication together, the output state machine 3204 includes a bound check engine 3206, an ensemble engine 3208, and a state decision generator 3209. The NP Application Framework 3200 further includes the NP analyzer interface 3210 coupled in communication with the bound check engine 3206.

The bound check engine 3206 receives prediction scores from each classifier of the NP analyzer interface 3203. The bound check engine 3206 checks to be sure the input values are valid, that they input values are within the range of expended bound values (e.g., between expected minimum and expected maximum values). The ensemble engine receives the valid prediction scores and combines the valid prediction scores with weighted values to determine a resultant output value. The resultant output value is coupled into the state decision generator 3210. The state decision generator 3209 generates an output decision based on the resultant output value from the ensemble engine 3208. The possible output states include access granted, access rejected, enter password, and/or retry, as well as others.

The operations that can be performed by the output state machine 3204 of the NP Application Framework 708,3200 are as follows:

Output state machine takes votes from classifier ensemble

Applies context to votes.

Output states include granted, rejected, password, and/or retry.

Based on the numeric output from classifier set, it can compensate for one weak classifier Improves results over simple majority vote Can be tailored to use case (security versus convenience)

Decision of Identification, Authentication, liveliness or encryption

Obfuscation/runtime security ("key-on-the-fly")

Non-interactive zero-knowledge (NIZK) protocol; and/or

The application program interface using Neuro-Print related function.

In some embodiments, the NP Application Framework 708 of the Neuro-Print processing system 700 can use the user's extracted feature data associated with neuro muscular tone as a Neuro-Print. The user's feature data can be acquired by the NP Feature Extractor 704 and it can be stored in secure storage of the electronic device. To achieve a higher level of security, the NP Application Framework 708 can use other methods, instead of directly using feature data as an authentication means. The NP Application Framework 708 can further process the feature data (e.g., digitally signal process) to generate a Neuro-Print and store it in secure storage. In this case, a Neuro-Print can include a collection of parameters from several mathematical models and decision methods, to work with the output state machine 3204. The output state machine 3204 determines an authentication output response to give a matching level with an authorized user. Therefore, with a securely stored Neuro-Print, the electronic device doesn't have to directly store the user's feature data or biometric information into storage.

Figure 26:
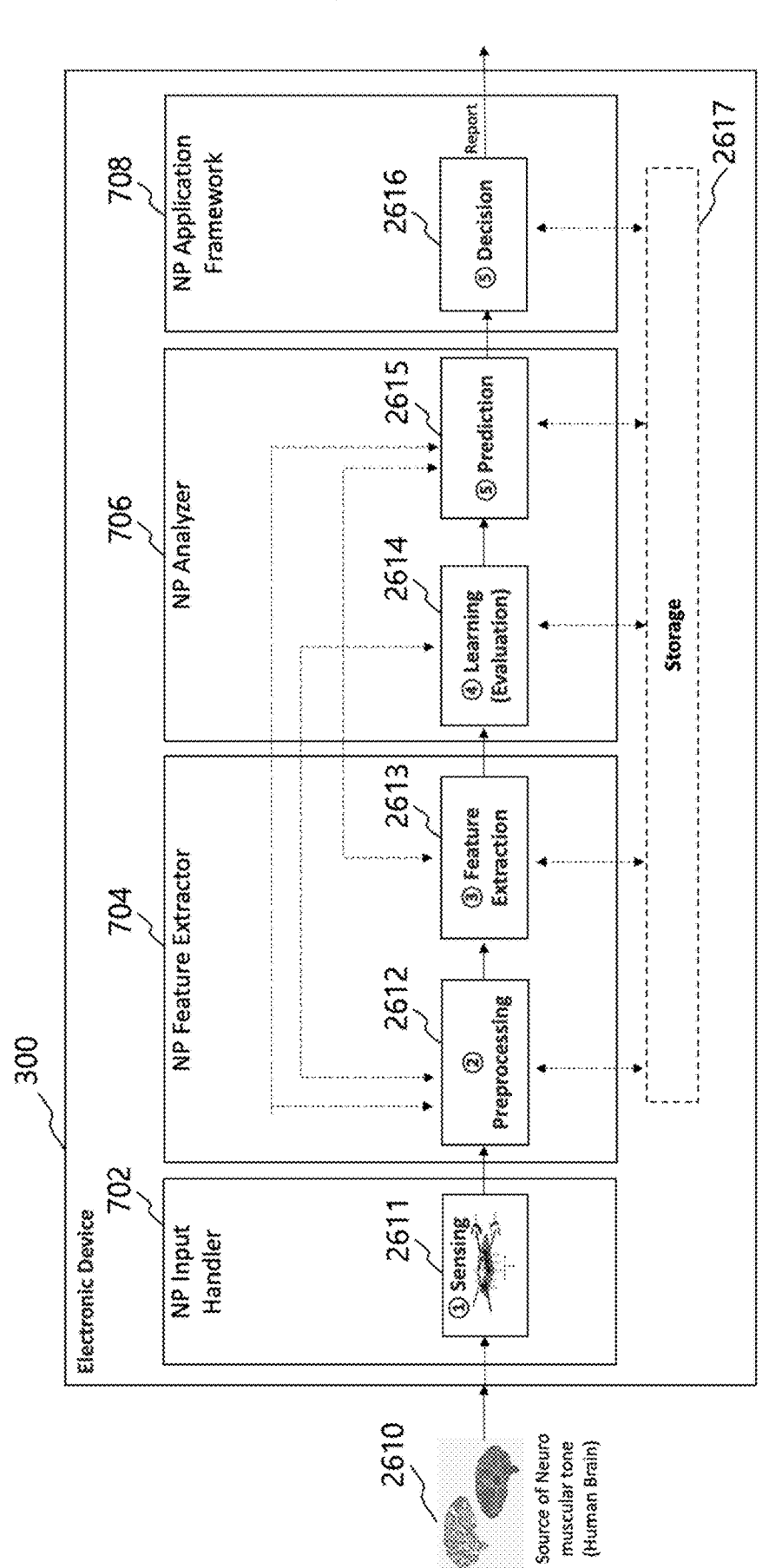
FIG. 26 is a block diagram of an electronic device and system for identification, authentication, liveliness or encryption.

Application Example of a System for Identification, Authentication, Liveliness or Encryption FIG. 26 depicts a system for identification, authentication, liveliness or encryption on the electronic device 301,400 according to some embodiments. Using the NP input handler 702, the electronic device can sense signals in a sensing 2611 step outside of the electronic device. For example, movement signal data from a body part of the user's body can be sensed in the sensing step 2611 that is associated with the human brain. The movement signal data is representative of neuro-muscular tone under control of one's brain and altered by body parts.

Using the NP Feature Extractor 704, the electronic device can perform a preprocessing step 2612 on the signals collected from the NP Input Handler 702. For example, the pre-processing step 2612 can include suppressing signal components associated with a voluntary movement of the user, noise, sensor errors, gravity force, electronic power noise, and other noise-related signal. Using the NP Feature Extractor 704, the electronic device can further perform a feature extraction step 2613 to extract micro motion data associated with neuro muscular tone from the preprocessed signals. In this step, feature vector sets (the NP) are created by generating data sets of mathematical representation based on the neuro muscular tone of the user. A storage device 2617 of the electronic device can be use to accumulate data associated with each step. In particular, model parameters and training sets can be stored in the storage device that are associated with an authorized user.

Using the NP analyzer 706, the electronic device can perform training operations using the feature vector set in a learning step 2614. Parameters are calculated for predictive models. Each predictive model is evaluated in the learning 2614 step by the NP Analyzer 706. With the NP analyzer 706, the electronic device can perform a prediction step 2615 where actual non-training operations can be performed. The electronic device can perform inference operations (non-training, operational mode) by configuring the model parameter set for each predetermined predictive model. Then the NP analyzer can generate a numerical degree of matching level for the previously authorized user whose body part is being sensed.

In the NP application framework, the decision step 2616 can be performed by the electronic device. The electronic device can determine user access to the electronic device based on a numerical degree (e.g., percentage level) of the matching level in the decision step 2616 of the NP application framework.

User Authentication

FIG. 27A shows an example flow chart for a user authentication with the NP application framework. At step 2701, the electronic device can determine the user access to the electronic device based on the numerical degree of the matching level provided by the application framework 708.

At step 2702, a decision can be made to grant access to an authorized user or deny access to an unauthorized user. The authorized user should have an associated numerical degree of the matching level greater than or equal to the access match level in order to grant access. An unauthorized user would have an associated numerical degree of access match level less than the authorized access match level in order to deny access by unauthorized users to the electronic device or an application. Based on access grant, the electronic device can further generate a signal for an application, such as vehicle engine start or unlocking the door in an automobile system.

Keyless Access Control

Figure 27B:
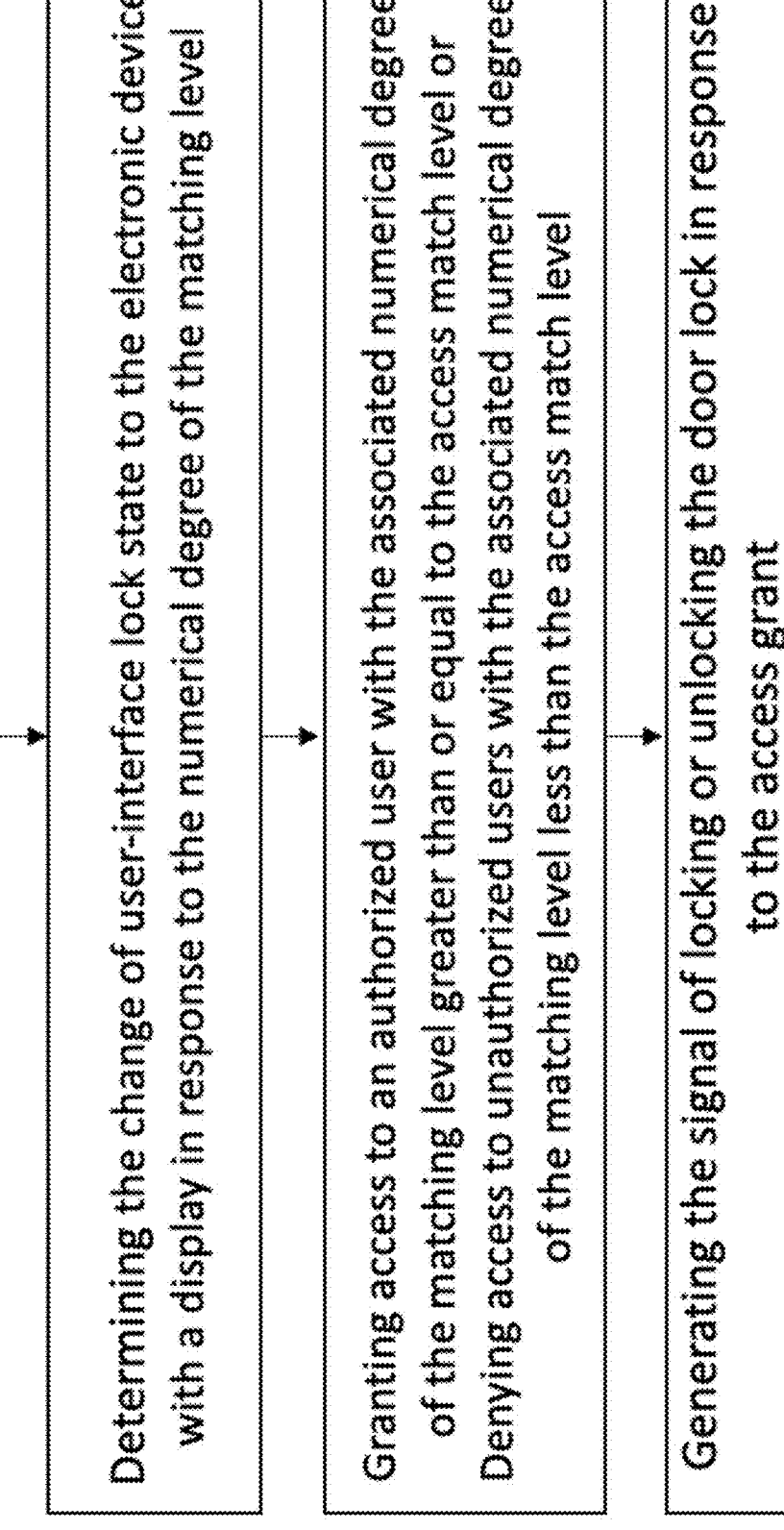
FIG. 27B is a flow chart for keyless access control.

FIG. 27B shows an example flow chart for keyless access control with the NP application framework. At step 2711, the electronic device can determine whether or not to grant a user access to the electronic device based on the numerical degree of the matching level of his/her NP recomputed using stored (encrypted) parameters associated with the authorized user. At step 2712, the NP application framework can grant access to an authorized user with the associated numerical degree of the matching level greater than or equal to the authorized access match level. Alternatively, the NP application framework can deny access to unauthorized users with the associated numerical degree of the matching level less than the authorized access match level. At step 2713, in accordance with some embodiments, a signal can be generated indicating a locking of a door lock or an unlocking of the door lock based on the access grant.

Data Encryption And Decryption

FIG. 27C shows an example flow chart for data encryption and decryption. At step 2721, an encryption key and a decryption key are constructed/generated. The electronic device can use a combination of data, some of which is the extracted feature vector and/or some of which is the model parameters of the authorized user as an encryption and decryption key in some embodiments. At step 2722, the electronic device can store the encryption key and decryption key into a secure storage. At step 2723, the electronic device can encrypt data with an encryption algorithm using the encryption key. The electronic device can decrypt the encrypted data with the decryption key.

Unlocking A Device

Figure 27D:
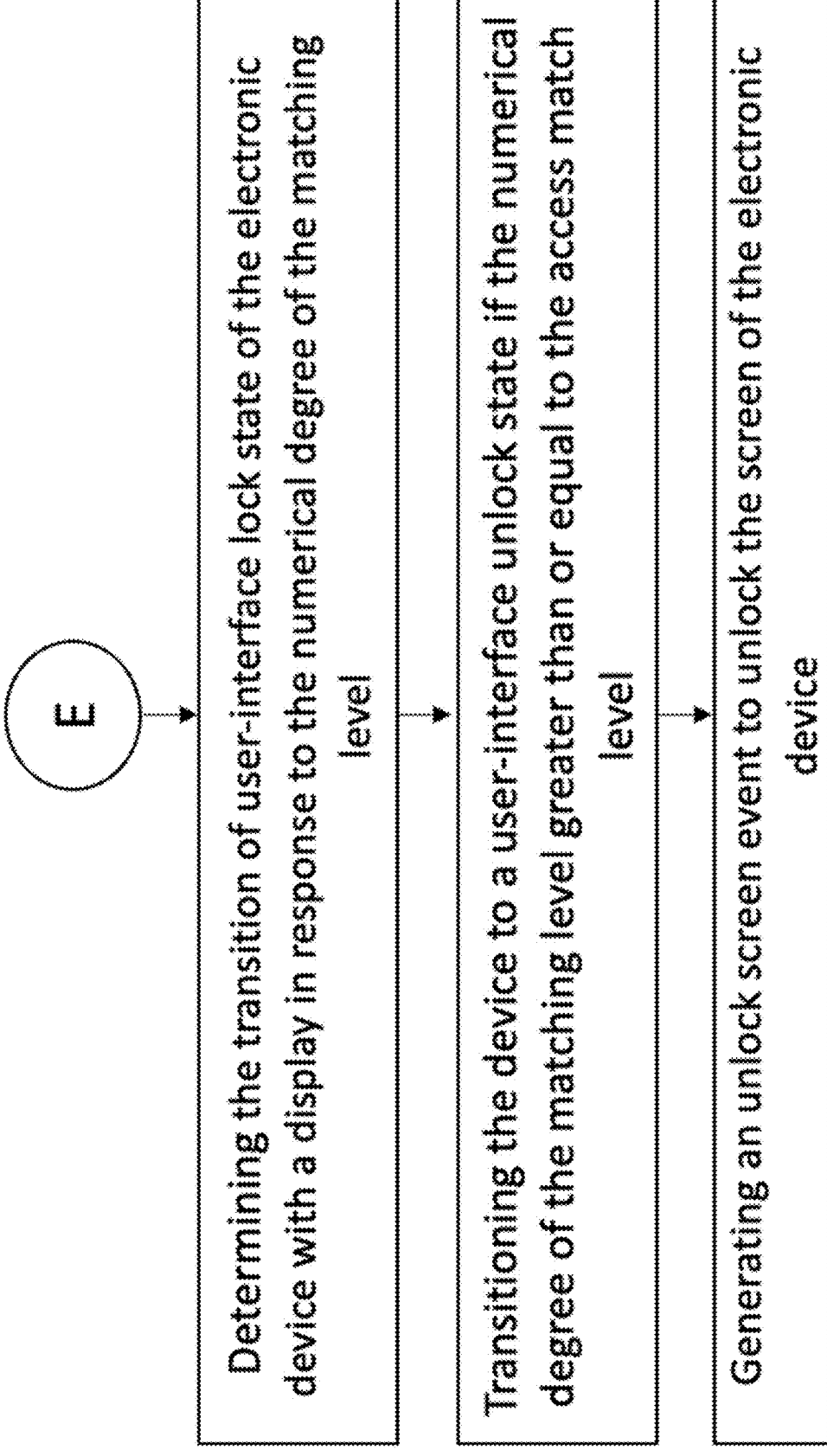
FIG. 27D is a flow chart for unlocking a device.

FIG. 27D shows an example flow chart for unlocking a device. At step 2731, the electronic device can determine the transition of user-interface unlock state of the electronic device with the display based on the numerical degree of the matching level. At 2732, the electronic device can transition the electronic device to a user-interface unlock state if the numerical degree of the matching level is greater than or equal to the access match level. At step 2733, the electronic device can generate an unlock screen event to unlock the screen of the electronic device so that an authorized user can use the electronic device.

Physiological Certificate System

Digital certificates are electronic credentials that bind a certificate owner's real-life identity to a pair of electronic keys, public and private (secret), that thereafter can be used to digitally encrypt and sign information. When electronically signing a document, the signer applies his or her secret private-key to create a non-refutable electronic watermark of the underlying document to be signed, one that can be validated using the signer's public-key. When encrypting a document to be seen by a specific target identity, the public-key of the target is used for encryption, and the target's private-key is subsequently used for decryption. In both cases, digital certificates assure that a key-pair is associated with a known and trustable identity. In the case of digital signatures for example, absent certificates, one could send a document signed with a private key, with the corresponding public key used to verify the signature, but there will be no assurance that the document was signed by anyone in particular. A trustable certificate identity for an end-user is established using a chain of trust. This chain of trust consists of a chain of signatures, from trustable entities, that attest to the truth of the declared relationship between the end-user's public-key and his or her real-world identity. Clearly, by linking a public-key to an identity, the corresponding-mathematically unique, private key is anchored to that identity as well.

Fast ID Online (FIDO™) is a set of open standards that enable more secure user authentication experiences than the old-fashion username/password experience. Its protocol is an authentication protocol based on a user-assigned cryptographic key-pair. With FIDO, an end-user has a plurality of vendor key-pairs, such as one for Amazon, one for Walmart, and one for PayPal. Each FIDO key-pair is anchored to an identity-based certificate that establishes trust in the key-pair holder's identity.

Contemporary electronic devices, such as smart phones, are routinely equipped with biometric authentication capabilities. These subsystems are often based on fingerprint, facial, or retina recognition systems, and recently also based on neuro-sensing. Nevertheless, such biometrics are only used to convince the device that the person holding the device is a legitimate device owner; once authenticated, any subsequent passwordless authentication with a third party (e.g., using FIDO™), is managed using identity based keypairs and corresponding certificates.

Clearly, identity-based transactions are inherently non-private. Although vendors often have effective privacy protection policies, a connection can be deduced between an individual's identity and a transaction; this is obviously done by the vendor, but also can be deduced as a result of certain security breaches. In other words, it is by the mere virtue of using identity-based certificates, transactions using such certificates cannot be guaranteed to be private.

The present disclosure introduces the concept of biometric, or physiological-certificates, denoted as P-certs. A P-cert matches a key-pair with a person's physiology, such as facial features or neuro-sensed features, rather than his or her identity, such as name, address, credit-card number or social security number. A P-certs is nevertheless linked to one's identity, but in a way that hides the identity. The primary perceived use-case for P-certs is private entry, where individuals can enter certain venues without being trackable, yet while being trusted.

The present disclosure hereafter describes P-certs and their relationship with identity-certificates, as well as some necessary properties of P-certs and some of applications of physiological certificates: private entry systems and community on-line sites.

Physiological Certificate Framework

In some embodiments, NP Application Framework 708 can be implemented for Physiological Certificate System. A Physiology-based Digital Certificate is a biometric, or physi-ological-certificate, that binds a dedicated key-pair to a person's physiology, such as facial features or neuro-sensed features, while hiding the individual's identity. The Physi-ology-based Digital Certificate can be referred to herein as P-cert.

Figure 28:
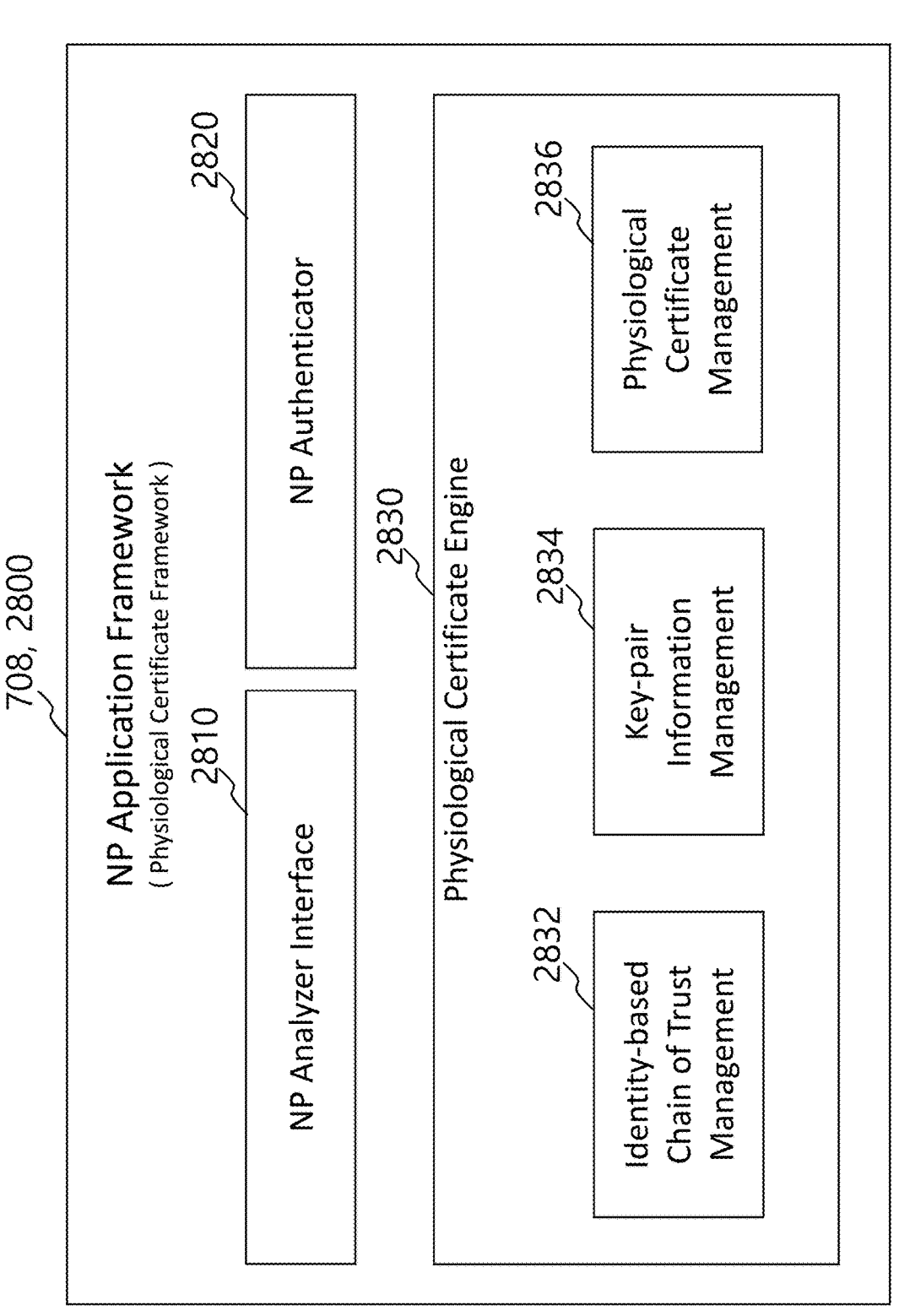
FIG. 28 shows an example of a Physiological Certificate System according to some embodiments.

FIG. 28 shows an example of Physiological Certificate System 2800 according to some embodiments. The Physi-ological Certificate System 2800 can include an NP Ana-lyzer Interface 2810, NP Authenticator 2820 and a Physi-ological Certificate Engine 2830. A Physiological Certificate Engine 2830 can include an Identity-based Chain of Trust Management 2832, a Key-pair information management 2834 and a Physiological Certificate Management 2836.

In some embodiments, the Physiological Certificate Sys-tem 2800 of electronic device 400 or the electronic device 301 can act as a user-device or client of the digital certificate system. In some embodiments, the Physiological Certificate System 2800 of electronic device 400 or the electronic device 301 can act as a server system, certificate authority or intermediate certificate authority of the digital certificate system.

Figure 29:
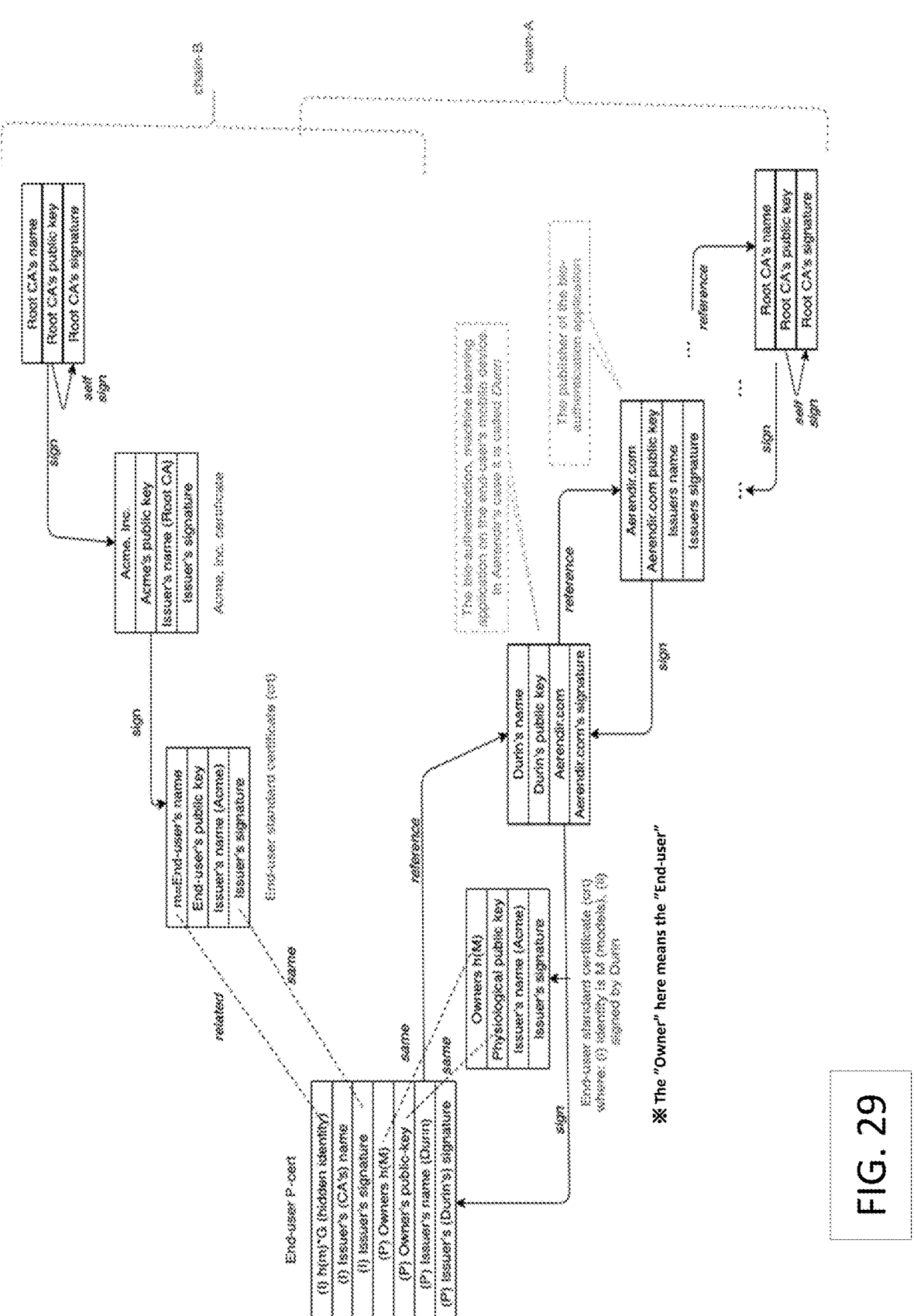
FIG. 29 illustrates an example of Physiological Chain of Trust (PCoT) in the Physiological Certificate System.

FIG. 29 illustrates an example of Physiological Chain of Trust (PCOT) in the Physiological Certificate System 2800. A Physiological Chain of Trust can be a form of a binary tree with two chain branches, whose (tree) root is the P-cert.

The tree-root node herein should not be confused with the root CA node; in fact, they are on opposite sides of the chain. The two branches are two chains of trust, both being Identity-based Chain of Trust's on their own merit, except for their end-entity certificate (the P-cert), which is different than a typical end-entity node. This special end-entity P-cert node is a special node and the two chains within the Physiological Chain of Trust can be a biometric classifica-tion chain of trust (Chain-A) and an identity chain of trust. (Chain-B).

Chain-A, the biometric classification chain of trust, can include the trusted user-device's bio-authentication applica-tion. The bio-authentication application can be a Neuro-Print (NP) based authentication application referred to herein as a Durin. The Chain-A of trust can establish trust in the bio-authentication process by using models of a Neuro-Print processing system. The Chain-A of trust is associated with a special, physiologically associated key-pair. Chain-A binds the key-pair to the device owner's physiology. This key pair is the one used for the private and incognito authentication and transactions.

Chain-B, the identity chain of trust, can be similar to the Identity-based Chain of Trust's on the electronic device (e.g., one created for PayPal using FIDO), referred to as the co-ICOT (Identity-based Chain of Trust). The difference between Chain B and a co-ICOT is that chain B's end-entity node is a P-cert node, rather than an ordinary End-entity Certificate (EeC). The P-cert node hides information that can reveal the identity of the certificate owner. Note that the term P-cert is used to describe the Physiological Chain of Trust (PCOT) tree root node rather than the entire Physiological Chain of Trust (PCOT).

An Example of P-Cert Fields in the Physiological Certificate System 2800

The P-cert can contain two parts, one for each of the two abovementioned chains. In FIG. 29, P-cert entries marked as (P) pertain to the physiology via the biometrics chain (chain-A), while entries marked (I) pertain to (hidden) identity via the identity chain (chain-B). P-marked (I-marked) entries of the P-cert are the usual end-entity fields except for identity revealing fields (i.e., subject name).

According to some embodiments, P-cert can include a P-marked (I-marked) Issuer's name field, a P-marked (I-marked) signature field, and a P-marked (but no I-marked) public key field.

The P-marked subject field can contain h(M), the cryp-tographic hash h of the biometric machine learning models (or NP identifier) M created by NP processing system on the electronic device. In some embodiments, the biometric machine learning models (or NP identifier) can be Neural Networks (NNT), Support Vector Machine (SVM), or Ran-dom Decision Tree (RDF) models. Note that a P-cert's h(M) is the counterpart of the owner's name field in a standard End-entity Certificate (End-entity Certificate (EeC)); the first is a statement of trust in the person whose physiological models are represented by h(M), while the second is a statement of trust in the person whose identity is represented by that name. Note also that the models (or NP identifier) are hashed because most bio-authentication techniques expect those models can be preserved as private.

The I-marked subject field can contain h(m)*G, where m is m (end-entity) taken from the End-entity Certificate (EeC) of the co-ICoT, G can be the elliptic curve base point, and h( ) is a cryptographic hash function. The abovementioned elliptic-curve multiplication implements better obfuscation than achieved by hashing m alone. With hashing alone, a malicious party with access to stolen identities (and their corresponding certificates) can apply a dictionary attack on the P-cert to discover the underlying identity. Note that the End-entity Certificate (EeC) node contains the owners pub-lic key, whereas the P-cert of FIG. 29 does not. The reason is, again, that a dictionary attack can reveal the owner's identity from his or her public-key.

The function h(m)*G in the P-cert is the owners hidden identity. It is hidden because h(m) cannot be practically computed from h(m)*G, yet it can be used to assure the owner is trustable. All other fields of the P-cert can have no identity releasing information.

Note that the P-cert of FIG. 29 can contain two signatures, one for each chain. The identity-related "(I) Issuer's signa-ture" field is a signature of the two identity fields above it. The physiology-related "(P) Issuer's signature" is a signa-ture of four fields above it, namely: "(P) Issuer's name", "(P) Owner's public key", "(P) Owners h(M)", and "(I) Issuer's signature". By signing "(I) Issuer's signature", it effectively cements the P-cert tree as one securely un-separable object, rather than a chain-A that is not securely bound to a specific chain-B.

An Example of P-Cert Signatures in the Physiological Certificate System 2800

In some embodiments, a P-cert can contain two signature fields:

SIGNATURE 1 (hereafter referred to as S1): "(I) Issuer's signature", can contain the identity-based intermediate CA's signature of h(m). In other words, this field can contain the verbatim signature produced by the iden-tity-based intermediate Certificate Authority when signing the end-user's End-entity Certificate (EeC).

SIGNATURE 2 (hereafter referred to as S2): "(P) Issuer's (Durin's) signature", can contain the signature of the physiological-based intermediate Certificate Authority (Durin) of the fields above it in the P-cert. FIG. 29 refers to this signature as Chain-A signature.

In some embodiments, using this pair of signatures achieves several outcomes. It allows the verbatim use of the end-user's End-entity Certificate (EeC) signature. It fulfills the auditability goal: the end-user's identity-based End-entity Certificate (EeC) and P-cert can be irrefutably associable with each other by literally comparing the two signatures taken from the end-user's End-entity Certificate (EeC) and the "(I) Issuer's signature" field of the P-cert, respectively. It provides protection against adversarial attacks, as follows.

Since the P-Cert contains no discoverable identity related information, not even identity-based public key, an adversary (e.g., Adam,), might try to re-use a P-cert of some other individual (e.g., Bob). However, the P-cert is bound to Bob's physiological key-pair, and Adam does not have Bob's private key. In addition, the P-cert creator assures, as a precondition to the creation of SIGNATURE2 (S2), that Bob's hidden identity ("(I) h(m)*G" field of FIG. 29) indeed uses Bob's visible identity (h(m) taken from Bob's End-entity Certificate (EeC). The P-cert creator does so by first verifying the Intermediate Certificate Authority (CA)'s signature of Bob's End-entity Certificate (EeC), and then using that End-entity Certificate (EeC)'s h(m) when building the "(I) h(m)*G" field, all prior to the creation of the S2 signature. Since S2 encapsulates Bob's h(M) and Bob's physiological public-key as well, Bob's hidden-identity is thereafter bound to the physiological model (h(M)) and to Bob's physiological key-pair, and therefore cannot be re-used with any other physiological model.

Using his abovementioned P-cert, Bob can claim to be of some other identity (e.g., Alice). However, the private-entry use-case can be constructed so that Bob doesn't get to unilaterally declare that he is someone else. Rather, his sponsor (e.g., Acme), who knows Bob's identity, sends that identity (in hidden form) to the venue entrance system; Bob then needs to prove that he has that (hidden) identity, but cannot prove that he has some other identity.

Private-Entry Applications and Process

In some embodiments, the envisioned class of privacy-enhancing applications of the physiological certificates can be private entry in the Physiological Certificate System 2800. With private entry, a mobile electronic device holder-armed with a physiological certificate, is allowed entry-into a venue without revealing his or her identity to the venue when doing so.

More specifically, the use-case involves three actors:

Bob, the end-user.

The Venue, with an entrance system denoted as En

Acme, the authoring organization. This organization knows Bob's identity m and generates his hidden-identity (h(m)*G). Acme delegates Bob the right to enter the venue.

Some specific examples are the following, where the first two use Amazon.com as Acme, i.e., Acme knows Bob's identity and possibly also charges his credit-card:

The venue is a car rental company, Bob is a renter. Using his physiological certificate, Bob is allowed to enter and drive a car without the rental company knowing whether it is Bob or some other trustable renter.

The venue is a subway system, Bob is a rider. Using his physiological certificate, Bob is allowed to enter the subway system without the subway system knowing it is Bob.

Acme is an association of journalists; Bob is a journalist. Using his physiological certificate, Bob is allowed to enter the venue-a press-room in the department of justice (DOJ), without the DOJ knowing that it is Bob who entered the venue.

In some embodiments, several example of bio-authentication entry approaches for entering any such venue can be as follows:

a. Using an on-site bio-authenticator.

b. Using vetted and signed bio-authentication models.

c. Using identity-based authentication d. Using physiology-based authentication.

With approach (a), the entrance door is equipped with a dedicated biometric authentication system. It is either trained locally, or else models (or NP identifier) of authorized individuals need to be securely transferred to it. Hence, this could be an expensive and more rigid approach compared to the other two. Clearly also this approach does not preserve privacy; whenever Bob enters the venue that event is trackable to Bob.

FIG. 29 shows an example flow chart for using an on-site bio-authenticator in the Physiological Certificate System 2800. The a dedicated biometric authentication system can determine the user access to the entrance door in response to the numerical degree of the matching level, grant access to an authorized user with the associated numerical degree of the matching level greater than or equal to the access match level or deny access to unauthorized users with the associated numerical degree of the matching level less than the access match level, generate the signal of locking or unlocking the door lock in response to the access grant in some embodiments.

Figure 30A:
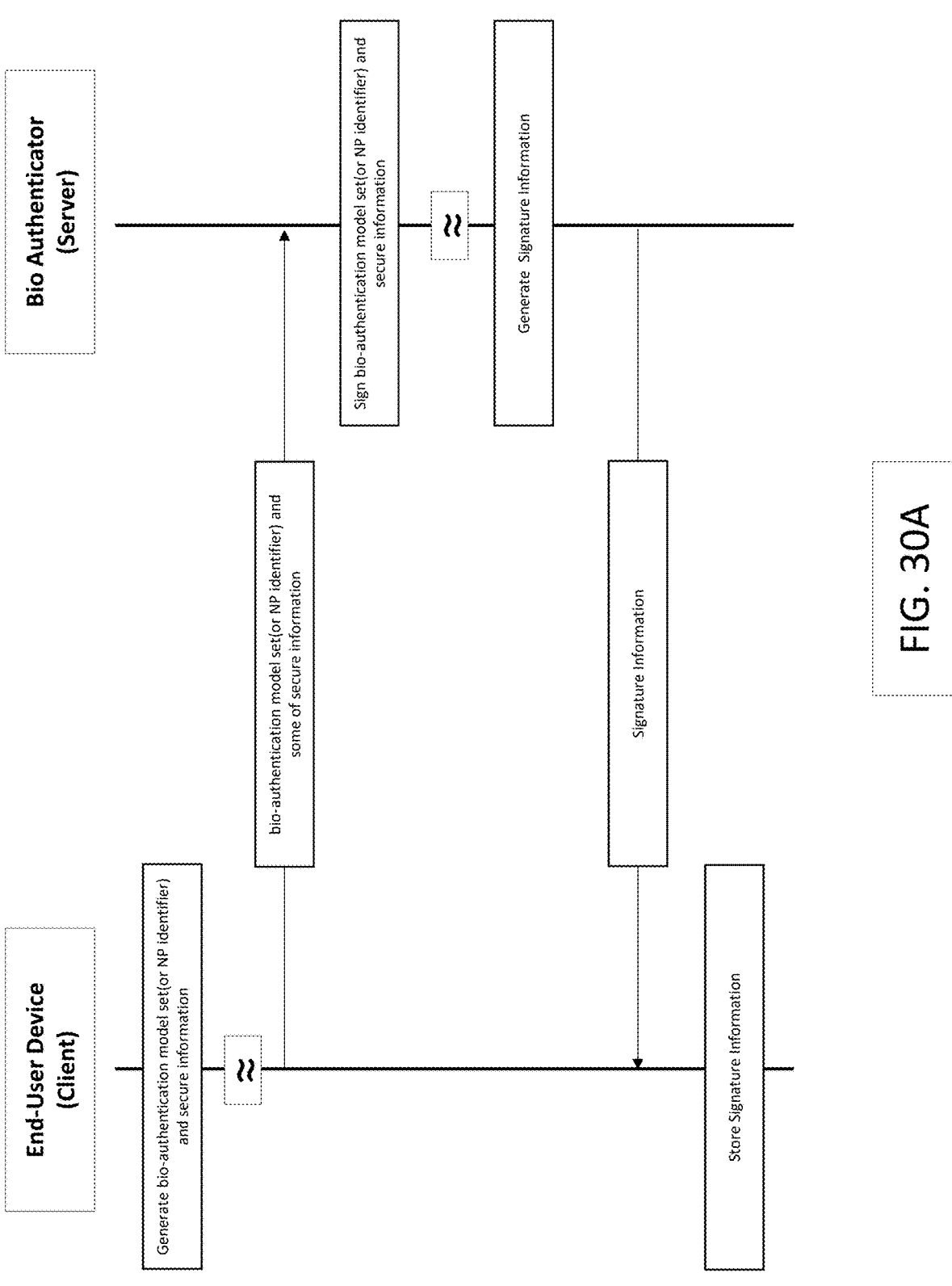
FIG. 30A shows an example of generating Signature Information according to one approach by the Physiological Certificate System.

FIG. 30A shows an example of generating Signature Information according to approach (b) in the Physiological Certificate System 2800. This approach (b) works as follows. Acme signs h(M), where M is Bob's bio-authentication model-set (or NP identifier) and h is a standard cryptographic hash.

Figure 30B:
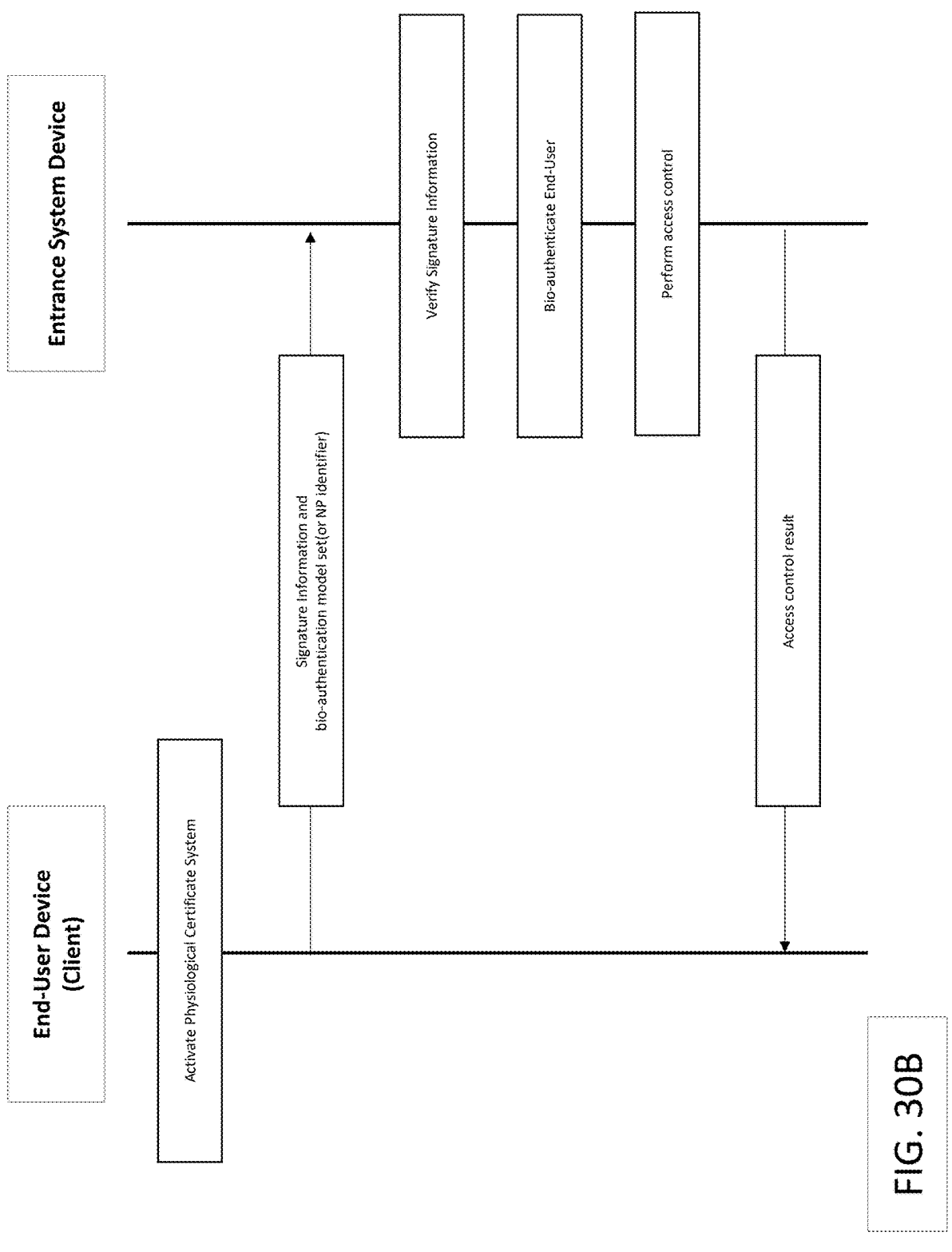
FIG. 30B shows an example of verifying Signature Information and access control according to one approach by the Physiological Certificate System.

FIG. 30B shows an example of verifying Signature Information and access control according to approach (b) in the Physiological Certificate System 2800. When Bob attempts to enter the venue, En verifies Acme's signature and asks the bio-authenticator (Durin, in our example) to bio-authenticate Bob and to verify that h(M)=h(M'), where M' is the model-set used for on-site bio-authentication. Note that this approach is essentially a bio-authentication variant of a password entry scheme, using Bob's (hashed) password instead of Bob's (hashed) model-set. In both cases this approach does not preserve privacy. This is because Bob needs to register his (hashed) model or password with the venue; then whenever En witnesses a usage of that model-set or password it can be associated with Bob.

In two other approaches (c and d), the entrance door can be equipped with Bluetooth, WIFI, or with some other proximity-based wireless communication capability enabling communication with individuals carrying mobile-devices. The entrance door can also be capable of verifying ECDSA signatures.

In the case of approach (c), Ci denotes Bob's identity certificate associated with a key-pair Ki. Ci contains an EeC with a signature from Acme (i.e., Acme is the intermediate CA node in Bob's ICOT). When Bob wants to enter the venue, Acme sends Bob's name to the venue, effectively telling the venue to "allow Bob in".

When Bob arrives, he first authenticates towards his mobile-device, using biometric authenticates. Bob then authenticates himself to the entrance system, En. After checking that Bob's name is the same as the name in Ci, En verifies the Ci's signature chain of trust, and then applies a challenge-response approach to verify that Bob's indeed owns Ki.private. Specifically, En sends Bob's mobile-device a challenge random number, Bob's device signs it (using Ki.private) and returns the signed number to En. En then checks the signature using Ki.public, Clearly, whenever Bob enters the venue, it is inherently trackable to Bob's identity. It is inherently trackable because the venue can deduce the relationship between Ki.public and Bob's identity by merely looking at Ci.

Figure 31:
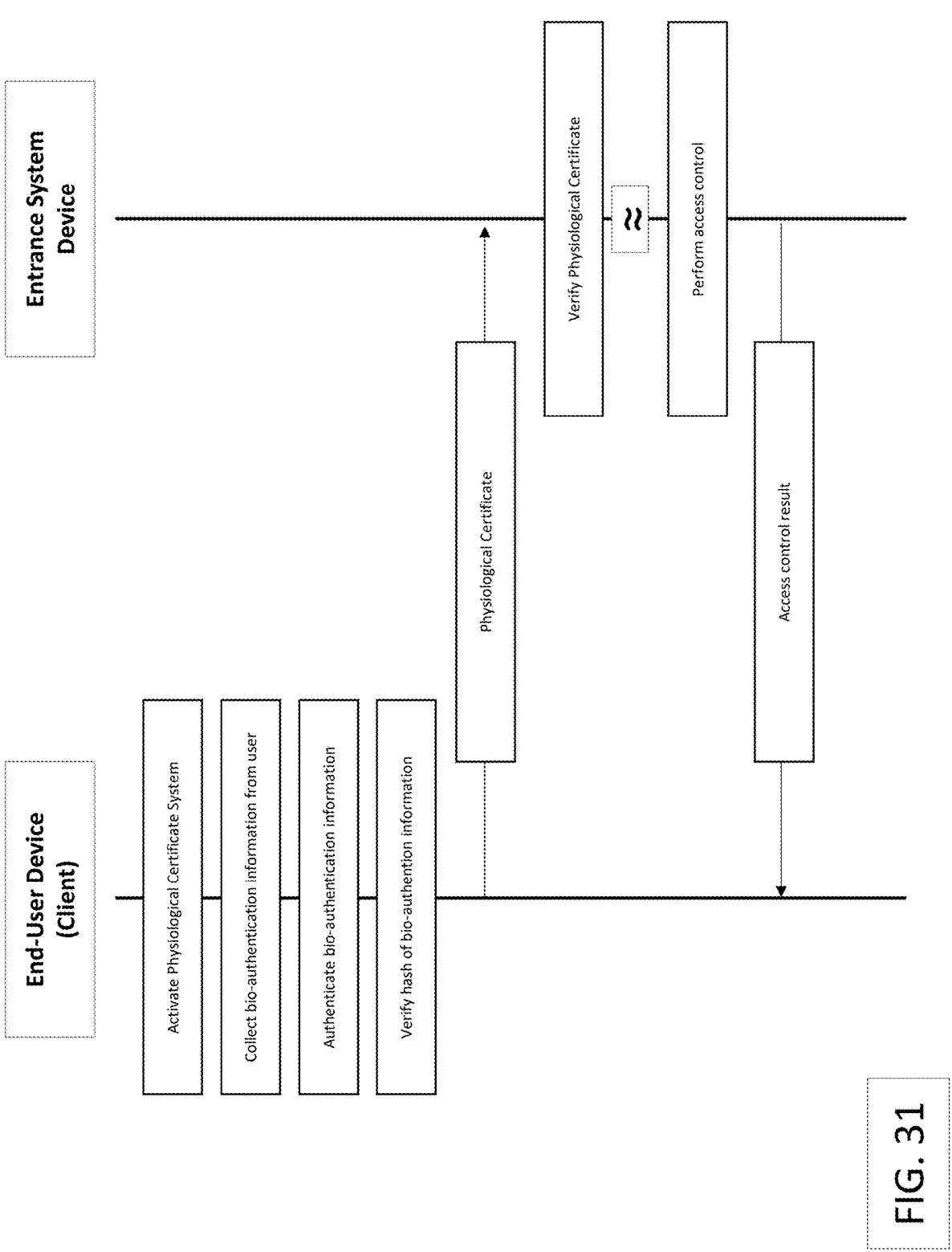
FIG. 31 shows an example of verifying Physiological Certificate and access control according to another approach with the Physiological Certificate System.

FIG. 31 shows an example of verifying Physiological Certificate and access control according to approach (d) in the Physiological Certificate System 2800. Cp denotes Bob's physiological certificate associated with a key-pair Kp.

When Bob wants to enter the venue, Acme sends Bob's hidden-identity (h(m)*G) to the venue. When Bob wants to enter the Acme venue, the following activities take place:

1. Bob Bio-authenticates using his bio-authentication models (or NP identifier): M.
2. Durin verifies that the cryptographic hash of M is identical to the value stored in "(P) Owners h(M)" field of the P-cert.
3. Bob sends En his P-cert Cp. Presumably, En already has Acme's certificate.
4. En uses Bob's physiology-based key-pair Kp to authenticate Bob, as follows:
   a. En verifies the Cp's signature chain of trust. To that end, En needs to validate the signature chain for two chains, chain-A and chain-B. For both chains the signature chain verification is a standard signature-chain verification process, with the following two exceptions:
      i. As described in step (2): for chain-A, the biometric-authenticator (e.g., Durin in FIG. 2), authenticates Bob and compares his biometric machine-learning models to the P-cert's: (P) Owners h(m) field.

much as Ci of approach (c). This is because the hidden-identity verification step assures that the hidden-identity h(m)*G uses Bob's identity h(m).

Note how step 2 assures that the key-pair used for authentication is bound to a person (Bob) that is physically holding the mobile device while trying to authenticate (e.g., Bob is trying to enter a secret conference room). This step is protecting against an attack where dishonest-Bob delegates steps 3 and 4 to some other, remote device that contains a key-pair Kp and certificate Cp trusted by En, while Bob is not trusted by En.

Signature Verification Using a Hidden-Identity in the Physiological Certificate System 2800

Recall that the "(I) Issuer's signature" field of the P-cert contains a verbatim copy of Bob "Issuer's signature" taken from his EeC; this signature signs Bob's identity h(m). However, in our use-case description Acme provides the venue with Bob's hidden identity, h(m)*G. Hence, instead of using standard ECDSA signature verification algorithm to verify the signature attribute of h(m), a variant of that ECDSA signature verification algorithm can be applied, as follows.

---

1. Let:
   - n be the integer order of G, i.e., n*G=0, where 0 is the underlying group's identity element.
   - m be the message to be signed.

m here represents a generic message; it corresponds to h(m)*G in the P-cert of Fig. 2, in which m is information marked as m(end-entity).
   - d be the private key of the signer; Q be the corresponding public key.
   - k is a random number.
   - <r,s> be the ECDSA signature, as described in [Wi2], where:
     - Using the point $(x, y) = k * G$, r is x mod n.
     - $s = k^{-1} * (h(m) + r*d) \bmod n$.
2. Calculate the curve point $U_1$:
   $U_1 = ((h(m)* s^{-1}) \bmod n) * G = ( (h(m) \bmod n) * G * )* ( s^{-1} \bmod n)$. Note that h(m)*G is the hidden-identity; it is stored in the top most field of the P-cert (Fig. 2).
   Calculate the number $u_2 = (r*s^{-1}) \bmod n$.
3. Calculate the curve point $(x_1,y_1) = U_1 + u_2*Q$. If $(x_1,y_1)=0$ then the signature is invalid.
4. The signature is valid if $r = x_1 \bmod n$, and invalid otherwise.
The verification algorithm is correct because:
   $(x_1,y_1) =$
   $U_1 + u_2*Q =$
   $((h(m)* s^{-1}) \bmod n) * G + ((r*s^{-1}) \bmod n) * G*d =$
   $G* ((s^{-1} \bmod n) * ((h(m)+d*r) \bmod n)) =$
   $G * k$
   In other words, $x_1 \bmod n = r$.

--- ii. For chain-B, the last signature verification checks that the hidden-identity (h(m)*G) is for an identity (h(m)) signed by the "(I) Issuer's signature" field of the P-cert; recall that when Bob's P-cert was created, this signature field was copied verbatim from Bob's EeC. Hence, this step requires a special signature verification algorithm, detailed in section 5.
   b. En applies a challenge-response approach to verify that Bob's indeed owns Kp.private. Specifically:
      i. En sends Bob's mobile-device a challenge random number
      ii. Bob's device signs it with his physiology-based private key (Kp.private) and returns the signed number to En.
      iii. En checks the signature using Kp.public,
With this approach, when Bob authenticates to En, although En knows Bob's Kp.public, the accompanying certificate Cp does not contain Bob's name or his identity public-key (Ki.public); therefore, En cannot track the venue entrance event to Bob. Nevertheless, Cp is as trustable as A class of privacy-preserving, yet trustable use cases are presented in the disclosure. Using P-certs can provide following benefits:

1. Private. Transactions performed with a P-cert should not be trackable to an identity.
2. Trustable. P-cert's should be as trustable as an identity based EeC.
3. Linkable. When an individual with a P-cert retrains his or her biometric authentication system, whether on the same device or on a different device, then the new P-cert and the older one should be irrefutably associable with each other. The association implies that the two P-cert's relate to the same identity, but does so without revealing that identity.
4. Auditable. An individual's identity-based EeC and P-cert can be irrefutably associable with each other.

Signature Verification Using a Hidden-Identity

Figure 32:
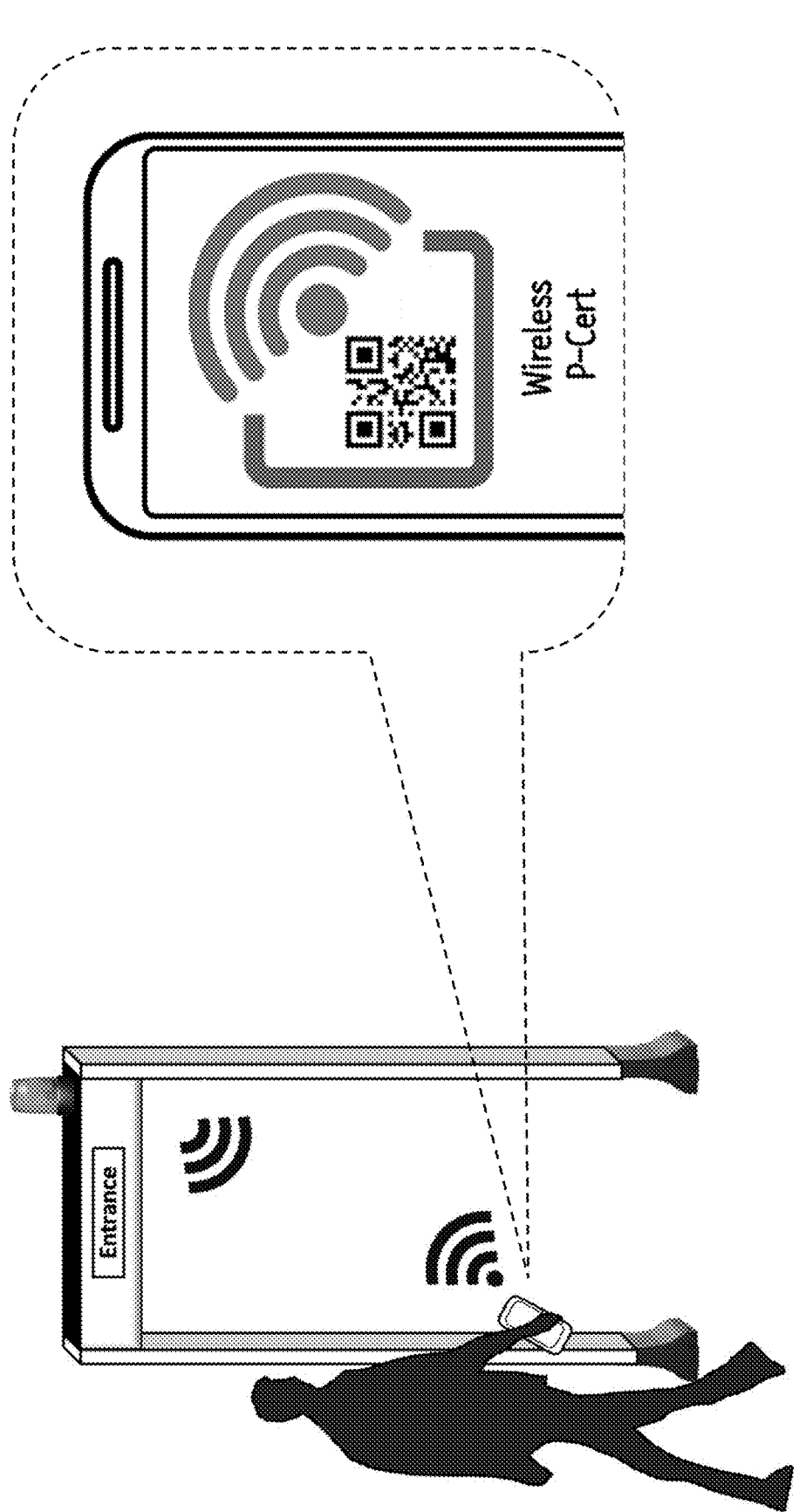
FIG. 32 shows an example of a user application for the Physiological Certificate in the Physiological Certificate System.

FIG. 32 shows an example of a user application for the Physiological Certificate in the Physiological Certificate System 2800. In some embodiments according to the present disclosure in FIG. 32, a user can attempt to access the entrance gate with a security system and the user's electronic device may include a Physiological Certificate already issued from a bio authenticator. The electronic device with the Physiological Certificate can communicate with an entrance control system of the gate via various types of wireless communication described in the electronic device 301, 400.

Access control of the entrance gate can be achieved by exchanging and receiving Physiological Certificate information as described in the example of FIG. 31 using various types of wireless communication medium including, for example, WIFI, BT (Bluetooth), BT BLE, NFC, Cellular radio communication system, Magnetic Induction (MI) based communication system, MST (Magnetic Secure Transmission) and so on. The access control methods disclosed herein do not require an additional hardware authentication component, such as RFID, NFC or ID chipsets. Accordingly, access control using a Physiological Certificate is very efficient in terms of both highly reliable security and hardware component cost.

In some embodiments, the initiation of exchange the information regarding the Physiological Certificate can be implemented using QR-code scanning. For example, if it is determined that the user wants to authenticate through a Physiological Certificate, the access system of the entrance gate can scan the QR code displayed on the screen of the user's electronic device and start authentication procedure of the Physiological Certificate.

When using the Physiological Certificate in this way, a malicious user obtained the electronic device of the original user can attempt to access the entrance system using the user's Physiological Certificate on the electronic device. In this example, the Physiological Certificate System 2800 of the electronic device extracts bio-authentication models (or NP identifier) from the malicious user and try to use extracted bio-authentication models (or NP identifier) in the Physiological Certificate processing. However, the authentication fails because the extracted bio-authentication models (or NP identifier) from the malicious user does not match the original user's Physiological. Therefore, it is possible to achieve higher security than the existing authentication method including RFID systems and the current authentication technology.

Figure 33:
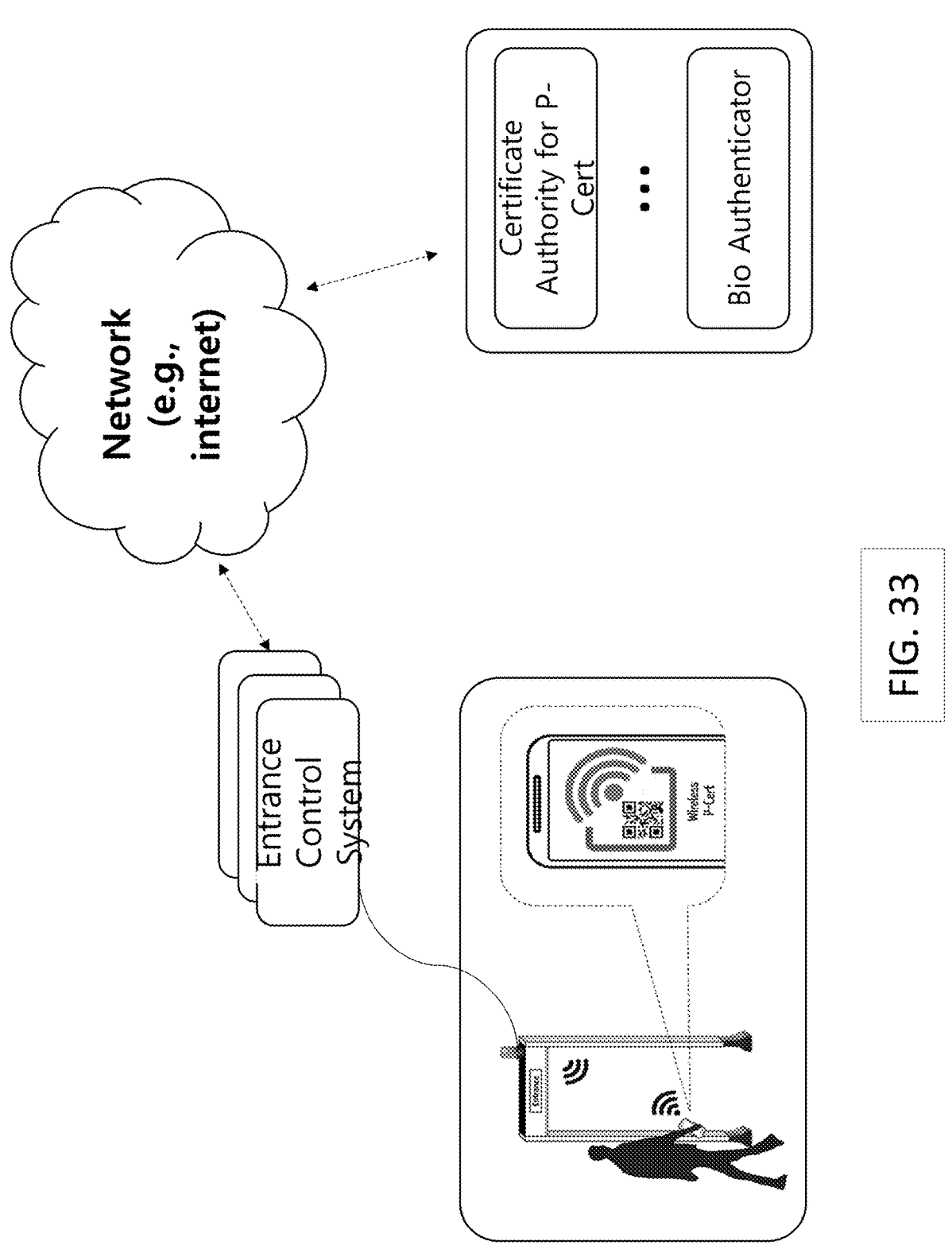
FIG. 33 shows an example of a user application system for the Physiological Certificate in the Physiological Certificate System.

FIG. 33 shows an example of a user application system for the Physiological Certificate in the Physiological Certificate System 2800. The entrance control system in FIG. 32 can receive the Physiological Certificate information from the user's electronic device, verify the user's Physiological Certificate through communication with the intermediate Certificate Authority for P-Cert or Bio Authenticator over the network, perform access control for the user and send access control result to the user's electronic device.

The present disclosure described a new type of certificate, a P-cert, ties a key-pair to an individual's bio-authentication models while also trying to that individual's (hidden) identity. This certificate can be used for privacy-based applications like private venue entry, all while preserving the same level of trust as when using an identity-based approach.

Besides being private and trustable the proposed P-cert can be also auditable and linkable. It can be auditable because a P-cert can be irrefutably audited to an individual's identity. It can be linkable because when an individual with as P-cert retrains his or her biometric authentication system, whether on the same device or on a different device, then the two P-certs are irrefutably associable with each other by comparing their respective hidden-identities.

CONCLUSION

When implemented in software, the elements of the embodiments are essentially the code segments of instructions that can be executed by one or more processors to perform and carry out tasks and provide functionality. The program or code segments can be stored in a processor readable medium or storage device that are coupled to or at least in communication with the one or more processors. The processor readable medium can include any medium or storage device that can store information. Examples of a processor readable medium include, but are not limited to, an electronic circuit, a semiconductor memory device, a read only memory (ROM), a flash memory, an erasable programmable read only memory (EPROM), a floppy diskette, a CD-ROM, an optical disk, a hard disk, or a solid-state drive. The program or code segments can be downloaded or transmitted between storage devices, for example, over computer networks such as the Internet, Intranet, etc.

While this specification includes many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations, separately or in sub-combination. Moreover, although features may be described above as acting in certain combinations and even initially claimed as such, one or more features from a claimed combination can in some cases be excised from the combination, and the claimed combination can be directed to a sub-combination or variations of a sub-combination.

Accordingly, while certain exemplary embodiments have been particularly described and shown in the accompanying drawings, they should not be construed as limited by such embodiments, but rather construed according to the claims that follow below.

What is claimed is:

1. A digital physiological certificate for securing user data, the digital physiological certificate comprising:
a processor readable media storing a digital file, the digital file including
an identity-based chain of trust of an owner of the digital physiological certificate; and
a physiological based chain of trust of the owner of the digital physiological certificate, wherein the physiological based chain of trust of the owner includes an owner's name;
an owner's physiological based public key;
a publisher's name for bioauthentication; and
a publisher's signature for the bioauthentication;
wherein the digital physiological certificate is coupled in communication with an access control system to authenticate the owner of the digital physiological certificate with bioauthentication to grant access to secured user data.

2. The digital physiological certificate of claim 1, wherein the owner's name is
a digitally hashed owner name.

3. The digital physiological certificate of claim 1, wherein the identity-based chain of trust of the owner includes an end user's name;

an end user's public key;

an intermediate certificate authenticator name; and an intermediate certificate authenticator signature.

4. The digital physiological certificate of claim 1, wherein the physiological based chain of trust of the owner further includes a root name;

a root public key; and a root signature.

5. The digital physiological certificate of claim 4, wherein the identity-based chain of trust of the owner includes an end user's name;

an end user's public key;

an intermediate certificate authenticator name; and an intermediate certificate authenticator signature.

6. A method of wireless authentication of an end user to an access control system, the method comprising:

with a portable electronic device, collecting bio-authentication information from the end user;

authenticating the bio-authentication information;

verifying the bio-authentication information with a digital physiological certificate having a physiological based chain of trust;

transferring information associated with the digital physiological certificate to an access control system; and receiving an access control result allowing access or denying access to a secure area associated with the access control system.

7. The method of claim 6, wherein the transferring of the information associated with the digital physiological certificate to the access control system is wirelessly performed using a radio transmitter.

8. The method of claim 7, wherein the information transferred that is associated with the digital physiological certificate is all or a part of the digital physiological certificate.

9. The method of claim 8, wherein the information transferred that is associated with the digital physiological certificate is at least one of signature information and user parameters for a bio-authentication model.

10. The method of claim 8, further comprising: receiving the digital physiological certificate; verifying the digital physiological certificate; generating the access control result; and granting access or denying access to the secure area based on the access control result.

11. The method of claim 8, wherein the authenticating of the bio-authentication information includes extracting a biometric print from the biometric information;

generating a secure key based on the biometric print;

generating a serial bit stream based on the digital physiological certificate using the secure key;

comparing the serial bit stream with a signature field in the digital physiological certificate; and generating an authentication result based on a match or not match result of the comparison.

12. The method of claim 11, further comprising: wirelessly sensing for the access control system; and activating a physiological certificate system to use the digital physiological certificate to gain access to the secure area protected by the access control system.

13. The method of claim 12, wherein the wirelessly sensing with the access control system is by a wireless system selected from the group consisting of a wireless local area network system (WIFI); a radio frequency identification system (RFID); a cellular radio communication system; a magnetic Induction (MI) based communication system; a near field communication system (NFC); and a blue-tooth communication system (BT or BLE).

14. The method of claim 11, further comprising: scanning a machine-readable label to activate an access control system; and activating a physiological certificate system to use the digital physiological certificate to gain access to the secure area protected by the access control system.

15. The method of claim 14, wherein the machine-readable label is a bar code or a quick response (QR) code.

16. The method of claim 11, wherein the collecting of the bio-authentication information from the end user includes physically contacting a biometric sensor of a digital biometric device.

17. The method of claim 16, wherein the biometric sensor is a motion sensor and the collecting of the bio-authentication information from the end user further includes:

collecting a movement signal using the motion sensor;

extracting features from the movement signal generating a feature vector set; and using a model to generate a numerical degree of a matching level based on the feature vector set and a model parameter set tuned to the user.

18. The method of claim 17, wherein the authenticating of the bio-authentication information includes:

comparing the numerical degree of the matching level with one or more match levels to authenticate the bio-authentication information.

19. The method of claim 18, wherein the one or more match levels are selected from the group consisting of an access match level equal to or above which to authenticate the end user, a deny match level equal to or below which to deny authentication of the end user, and a retry match range between the access match level and the deny match level to suggest the end user to retry and re-enter the bio-authentication information.

20. A method of wireless authentication of an end user to an access control system, the method comprising:

receiving, into an access control system, user information associated with a digital physiological certificate of a user stored in a processor readable media;

reading the stored digital physiological certificate of the user, wherein the stored digital physiological certificate has a physiological based chain of trust;

verifying signature information in the stored digital physiological certificate using the received user information;

performing bio-authentication of the user with the received user information and the stored digital physiological certificate; and sending an access control result allowing access or denying access to a secure area based on the bio-authentication of the user.

* * * * *